United States Patent [19]

Cardwell et al.

[11] 3,925,601

[45] Dec. 9, 1975

[54] DIGITAL REGISTER SENDER AND LINE CIRCUIT FOR DATA SWITCH

[75] Inventors: Robert Edward Cardwell, Fair Haven; David Emory Carlson; Robert Leon Davis, both of Holmdel; Edward Joseph McNamara, Manalapan Township, Monmouth County; Randolph John Pilc, Holmdel; Gabriel Gary Schlanger, West Orange; David Morris Tutelman, Ocean Township, Monmouth County; Peter Stephen Warwick, Middletown; Herbert Mortimer Zydney, Rumson, all of N.J.

[73] Assignee: Bell Telephone Laboratories, Incorporated, Murray Hill, N.J.

[22] Filed: Jan. 20, 1975

[21] Appl. No.: 542,583

[52] U.S. Cl. .................................. 178/3; 179/18 EB

[51] Int. Cl.² .......................................... H04L 11/00

[58] Field of Search .......... 178/2 R, 3, 4.1 B, 4.1 C; 179/18 AH, 18 E, 18 H, 18 EB, 18 BH, 19, 84 R, 84 SS, 84 T, 84 C

*Primary Examiner*—Thomas A. Robinson
*Attorney, Agent, or Firm*—Roy C. Lipton

[57] ABSTRACT

A switching office for line switching digital data messages includes a digital register sender for accepting inband digital address signals that control the switch and for sending inband digital data dial tone and call progress codes to the subscriber and digital line and trunk circuits for interchanging data between the line and trunk and intraoffice channels. The register sender also sends digital data signals to the line and trunk circuits to control the interchange of data and sends a "not ready" call progress code sequence to the calling subscriber when the called subscriber, although on-hook, is not ready to answer a call.

24 Claims, 30 Drawing Figures

FIG. 2
DIGITAL LINE CIRCUIT

| | | |
|---|---|---|
| FIG. 21 | FIG. 22 | FIG. 23 |
| FIG. 24 | FIG. 25 | FIG. 26 |

FIG. 3
DIGITAL TRUNK CIRCUIT

| | |
|---|---|
| FIG. 27 | FIG. 28 |
| FIG. 29 | FIG. 30 |

FIG. 4
DIGITAL REGISTER SENDER

| | | | |
|---|---|---|---|
| FIG. 5 | FIG. 6 | FIG. 7 | FIG. 8 |
| FIG. 9 | FIG. 10 | FIG. 11 | FIG. 12 |
| FIG. 13 | FIG. 14 | FIG. 15 | FIG. 16 |
| FIG. 17 | FIG. 18 | FIG. 19 | FIG. 20 |

DIGITAL REGISTER SENDER AND LINE CIRCUIT FOR DATA SWITCH

FIELD OF THE INVENTION

This invention relates to data switching systems and, more particularly, to switching offices which provide line switching for data transmission channels.

DESCRIPTION OF THE PRIOR ART

The term "line switching" is understood to be directed to the general class of office switching equipment which, in response to dial, address or header information, completes an intraoffice transmission channel which thereafter conveys signals received from an incoming line or trunk to an outgoing line or trunk. The intraoffice channel, thus completed, might constitute an actual physical path (called space switching) or a time slot in a frame of time (called time division switching) but, in any case, the channel is completed in response to the initial header information and the same channel is maintained for subsequently received signals from the line or trunk.

Line switching systems are well known in the telephone art. A subscriber initiates a call by removing the telephone handset to send an off-hook signal over the subscriber line to the switching office. In the switching office, common control equipment is requested and, if it is available, the common control equipment is connected to the subscriber line by way of an intraoffice channel and a line circuit interface between the channels and the line. Dial tone is now returned to the calling subscriber and the subscriber then dials the appropriate digits designating the desired remote subscriber. The common control equipment proceeds to operate switching equipment to connect the telephone lines of the calling and the called subscribers, ringing the called subscriber if the line is not busy. During these switching operations, the calling subscriber can monitor the signals on the intraoffice channel to follow the progress of the call setup. The called subscriber then completes the connection by going off-hook whereby the subscribers can thereafter communicate through the intraoffice telephone channel created by the switching equipment and, after communicating, either party can initiate disconnection by going back on-hook.

In recent years there has been a need for data subscribers to intercommunicate and the line switching office has been modified to accomodate data transmission lines. One type of data subscriber to be accommodated utilizes a data machine which uses only inband data signaling for communicating, for sending header information and for monitoring call progress information. For example, the data machine is arranged to send digital data address characters to designate the remote subscriber and to read digital data characters to define the call progress. The common control equipment has been modified to send appropriate inband digital data signals to indicate dial tone, busy, and other signal information, and to accept inband digital data signals from the subscribers, such as address data characters for header information. A line switching system thus arranged can provide the call initiation, call setup, message communication and call disconnection without human intervention at either end.

It is a broad object of this invention to provide an improved switching system for switching data subscriber lines, the equipment at the switching office advantageously arranged to communicate with and respond to inband digital data used by the subscriber data machine.

In common carrier systems which accommodate many different data subscribers desiring service, it is difficult to provide a fixed routine which is necessarily followed by all subscribers. For example, a subsciber machine may (intentionally or inadvertently) send data after the header and during a call setup. This data, on the subscriber line, is passed to the intraoffice channel by the interface circuit and thereby reaches the common control equipment. The common control equipment may confuse this data with supervisory or housekeeping data being interchanged by the switching office equipment on the intraoffice channel or, alternatively, this incoming data may garble intraoffice data. Alternatively, certain intraoffice supervisory data on the intraoffice channel, if monitored by the subscriber equipment during the call setup, may institute or initiate improper operations in the subscriber equipment.

Accordingly, it is an object of this invention to preclude the data subscriber from improperly interfering with the common control equipment and it is a further object of this invention to preclude the common control equipment from improperly operating the subscriber equipment.

It is conventional for data machines to send a plurality of messages over a short period of time, each message being short in duration. Call setup time is also reduced by the called machine which answers calls with little or no delay. Since the call duration is short, a busy called line may be recalled within a relatively small time. A data machine, however, may be involved in a function which renders it "not ready" to receive a call. The called line is not busy (since the called machine is on hook) but the data subscriber is applying a signal condition to the line to indicate that the machine is not ready. In such a situation it is desirable to advise the calling subscriber that the called line will not become available in a short time.

It is therefore another object of this invention to advise a calling subscriber of the condition of the called line.

SUMMARY OF THE INVENTION

In accordance with this invention, the common control circuit of the line switching equipment sends control data signals to the interface circuit to control interchange of signals between the subscriber (or trunk) line and the intraoffice channel. These control data signals are advantageously passed over the intraoffice channel connecting the common control circuit to the interface circuit. It is an aspect of this invention, that, in response to control data signals, the interface circuit does not apply data signals on the subscriber (or trunk) line to the interface channel to preclude improper interference with the common control equipment. It is another aspect of this invention that, in response to control data signals, the interface circuit does not apply data signals on the intraoffice channel to the subscriber line to preclude improper operation of the subscriber data machine.

It is a feature of this invention that, to preclude application of the data on the intraoffice channel to the subscriber line predetermined (non-information) code signals are applied to the line in place of the data signals on the intraoffice channel whereby the data machine reads a stream of data characters which, although not providing message information, indicate that the line has not failed and that the switch is setting up a call.

It is a further feature of this invention, that to insure against inadvertently precluding the interchanging of signals, in response to a transmission error, a plurality of successive ones of the data control signals must be counted before the interface circuit operates.

In accordance with the specific embodiment of this invention, disclosed herein, interchange of signals in each direction is provided by a data store for storing received data and for passing the stored data to the channel (or line). The interface circuit blocks the passage of the data or, if substitution of predetermined codes is to be provided, overwrites the stored data with the predetermined code characters. These predetermined code characters are therefore passed to the subscriber line whereby the data machine does not receive intraoffice supervisory signals presently on the intraoffice channel. Thereafter, when control or call progress codes are to be sent to the subscriber, they are preceeded by a control data signal which "unblinds" the interface circuit by terminating the overwriting to thereafter permit passage of the call progress code sequence to the subscriber.

When the switch connects to the called subscriber line, the common control circuit is arranged to send a call progress code sequence to the calling subscriber to advise him of the condition of the called subscriber line. Normally, the common control circuit sends a "ringback" call progress code sequence to advise the calling subscriber that the called subscriber is connected and being "rung." If the called machine is "not ready," however, this "not ready condition appears on the called subscriber line and is received by the common control circuit which is monitoring the intraoffice connection. The common control circuit thereupon sends a "not ready" call progress code sequence to the calling subscriber to advise the sending machine that the called party is in the "not ready" condition. Alternatively, if the called subscriber should attempt to initiate a call after being connected, the common control equipment reads the data characters (which may be random) on the line and thereupon modifies the content of the code sequence to produce a "busy" call progress code sequence.

The foregoing and other objects and features of this invention will be more fully understood from the following description of an illustrative embodiment taken in conjunction with the accompanying drawings.

DETAILED GENERAL DESCRIPTION

Figure 1:
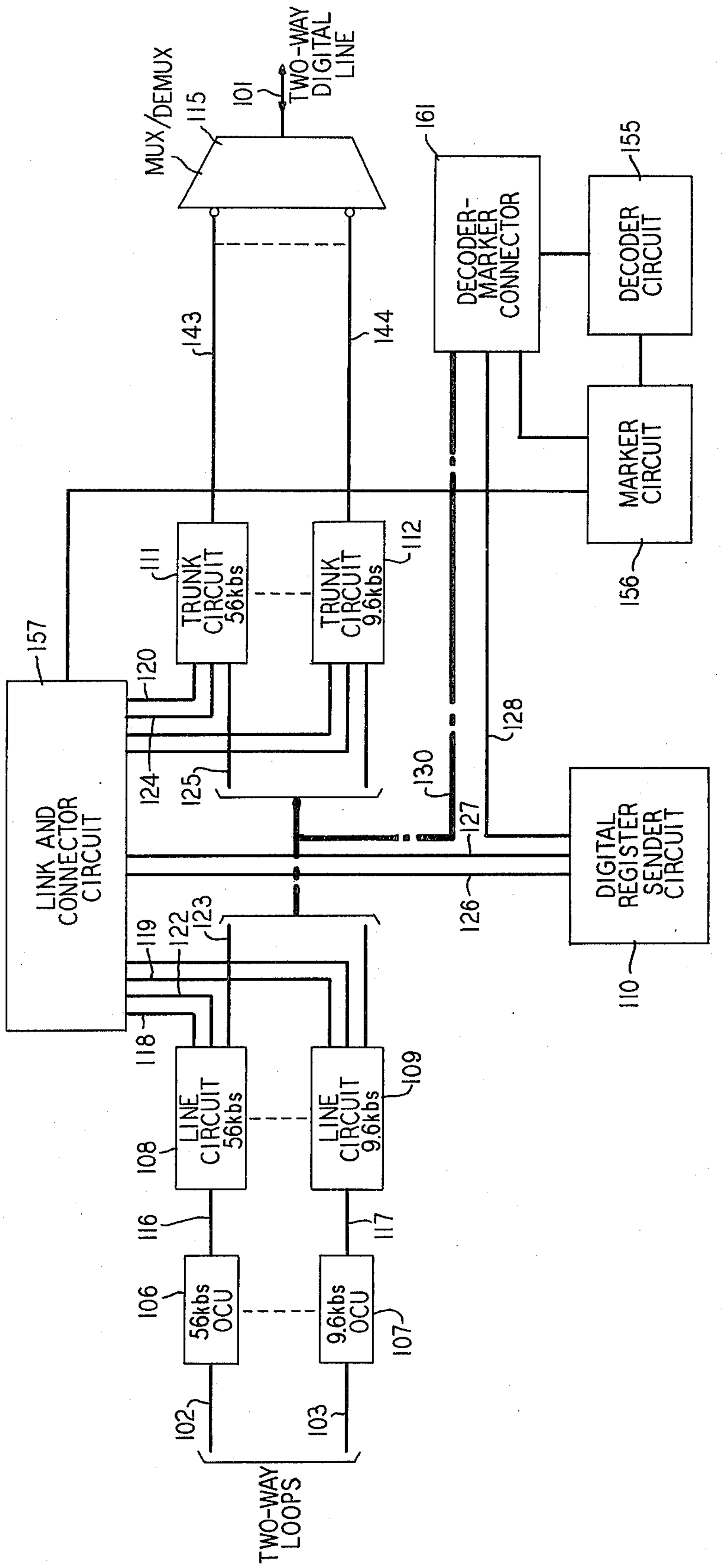
FIG. 1 discloses, in block form, a central office switching facility in accordance with this invention.

A typical switching office for line switching digital data messages is shown in FIG. 1. The switching office is connected by way of two-way loops, such as two-way loops 102 and 103 to digital data subscribers which have the capability of transmitting and receiving data characters. Each data subscriber (not shown) presents an "on-hook" signal to the two-way loop when not sending or receiving and presents an "off-hook" signal to the two-way loop when arranged to send and receive. A subscriber, such as a subscriber connected to two-way loop 102, may be arranged to signal at a signaling speed of 56 kbs (kilobits per second) or, if connected to a signal loop such as loop 103, may be arranged to signal at a signaling speed of 9.6 kbs. The switching office may also be connected to another switching office by way of a two-way digital transmission line such as line 101. Line 101 may be advantageously arranged to convey data streams of interleaving data at the speed of 1.54 megabits per second.

Two-way loop 102 which conveys data and data characters at 56 kbs per second is connected to an office channel unit, generally indicated by block 106, in the switching office. It is a function of the office channel unit to assemble the data and data characters into 8-bit bytes inserting a control bit in the 8-bit position. The office channel unit (OCU) is advantageously of the type disclosed in U.S. Pat. No. 3,794,768 issued to A. C. Carney, M. P. Cichetti, Jr., J. G. Kneuer and D. W. Rice on Feb. 26, 1974. Accordingly, the OCU inserts a 0 bit in the eighth bit position of the assembled byte when the data subscriber is "on-hook" to form a control mode byte and inserts a 1 bit in the eighth bit position when the subscriber is "off-hook" to form a data mode byte. A train of bytes are then passed to two-way transmission path 116 and with the additional insertion of the control bit the resulting signaling speed is at 64 kbs.

The OCU receives a stream of bytes from transmission path 116 at the 64 kbs speed, strips the control bit from the byte and passes the information bits as data characters on to two-way loop 102 to the data subscriber, the resulting speed being at 56 kbs. A 9.6 OCU, such as OCU 107, similarly assembles the data received from two-way loop 103 into 8-bit bytes inserting the appropriate control bit in the eighth bit position and additionally inserting a 0 bit in the first bit position to designate a subrate subscriber. The byte thus assembled is then repeated five times to achieve a signaling rate of 64 kbs and then passed on to lead 117. The data steam received by OCU 107 from two-way path 117 constitutes bytes repeated five times and the OCU, in addition to stripping the first and eighth bit, also selects one-out-of-five bytes and passes the information bits thus selected to two-way loop 103 whereby a data stream at the 9.6 kbs rate is transmitted to the data subscriber. The insertion and stripping of the bits and the repeating and selecting of the bytes are described in further detail in the A. C. Carney et al patent.

The 1.54 megabits per second data stream received on digital line 101 is applied to multiplexer/demultiplexer 115. The multiplexer/demultiplexer 115 distributes the interleaved bits to a plurality of two-way trunk lines, two of the trunk lines being represented by lines 143 and 144. The resultant stream of data on the trunk line, such as trunk line 143, is at the signaling speed of 64 kbs. A multiplexer/demultiplexer which advantageously provides this demultiplexing operation is shown in the A. C. Carney et al patent. 64 kbs data applied by a two-way trunk line, such as trunk line 143, is interleaved with data applied to multiplexer/demultiplexer 115 by other two-way trunk lines and passed on to two-way digital line 101 to provide a 1.54 megabit per second data stream which is then passed on to the remote office.

The switching function is generally provided by line circuits such as line circuit 108 (which is arranged for 56 kbs subscribers) and line circuit 109 (which is arranged for 9.6 kbs subscribers), the link and connector circuit 157, digital register sender circuit 110, marker circuit 156 and its associated decoder circuit 155 together with decoder marker connector 161 and trunk circuit 111 which is arranged for 56 kbs subscribers and trunk circuit 112 which is arranged for 9.6 kbs subscribers. It is understood that the switching office includes other line and trunk circuits as well as other register sender and marker/decoder circuits.

In general, link and connector circuit 157 includes a crossbar switch (not shown) to provide the switching interconnections, which switching interconnections are generally determined by the marker/decoder (shown as marker circuit 156 and decoder circuit 155), the marker/decoder being connectable to the rest of the switching equipment by way of decoder marker connector circuit 161. The link and connector circuit, the marker circuit, the decoder circuit and the decoder marker connector circuit are advantageously arranged in substantially the same manner as similarly identified circuits described in U.S. Pat. No. 3,394,232 which issued to R. J. Jaeger, Jr. and G. Riddell on July 23, 1968.

The digital line circuit 108, the digital trunk circuit, such as trunk circuit 111, and the digital register sender circuit, such as digital register sender circuit 110, are arranged, in accordance with this invention, to send, receive, generate and interpret the digital data signals being conveyed by the two-way transmission lines such as line 116, and the two-way trunk lines, such as trunk line 143. The digital line circuit, the trunk circuit and the register sender are further arranged to cooperate with other equipment of the line switch such as link and connector circuit 157 and the decoder marker (155 and 156).

The digital line circuit 108, digital trunk circuit 111 and digital register sender circuit 110 are principally composed of electronic circuits, as described hereinafter while the link and connector circuit, and the marker decoder are principally composed of electromagnetic circuits. The duration of time required for the operation of electromagnetic circuits is generally a magnitude or more greater than the duration required for the operation of electronic circuits. It is therefore to be understood that, when these operations occur simultaneously, the electronic circuits complete their operation, or series of operations, before completion of any electromagnetics operation.

General Operation Sequence

Assume now that the line circuit and the trunk circuit are in the initial idle condition and the digital register sender circuit 110 is disconnected from the link and connector circuit 157. In this idle condition the line circuit, such as line circuit 108, is receiving control mode "Idle" bytes from line 116 (that is a byte designating the "on-hook" condition of the subscriber and having inserted therein a 0 bit in the eighth bit position). At the same time link and connector circuit 157 is sending over line 118 a stream of 0 bits to the line circuit 108, simulating the transmission of a stream of control mode "NUL" bytes or characters. The line circuit monitors the incoming bytes or characters from OCU 106 and link and connector circuit 157 and, with the "Idle" and "NUL" characters being received, sets itself in an idle mode. In this mode, line circuit 108 overwrites the "Idle" characters being received from line 116 with "NUL" characters, sending the "NUL" characters over line 118 to link and connector circuit 157, and overwrites the "NUL" characters being received from line 118 with control mode "Idle" characters, passing the "Idle" characters on to transmission path 116. In this idle (on-hook) condition, line circuit 108 also provides an idle signal indication by way of control leads 122 for purposes described hereinafter.

The line circuit is also arranged to recognize an "on-hook" condition of the subscriber other than the idle " on-hook" condition. This condition is defined as a "not ready" condition wherein the subscriber, although "on-hook", sends a "not ready" signal to indicate that he is not ready to receive or answer a call. The line circuit under this condition receives a stream of "not ready" control mode bytes from the OCU. These repeated bytes are not overwritten but passed on by way of transmission line 118 to link and connector circuit 157. All other operations of the line circuit are the same for the idle "on-hook" condition.

Assume now that the subscriber goes "off-hook" to initiate a call. In this off-hook condition a stream of data mode characters are received by line circuit 108 from the OCU. Advantageously, the subscriber sends "SYN" data characters which are assembled by the OCU into data mode bytes. The line circuit monitors and counts the data mode bytes or characters (line circuit 108 counts successive ones of the characters while line circuit 109, since it is connected to a subrate subscriber wherein each character is repeated five times counts every fifth character). In the event that the appropriate count is satisfied by the reception of a sufficient number of data mode characters, the line circuit, such as line circuit 108 proceeds to go "off-hook." In going "off-hook," line circuit 108 makes a bid for a marker by providing a bidding signal by way of control leads 123 and decoder marker connector circuit 161. At the same time the line circuit 108 now signals by way of control leads 122 that it is "busy" to preclude being connected to another subscriber attempting to call. Finally, line circuit 108 terminates the blocking or overwriting of the characters being received from the OCU thereby passing the data mode characters to line 118.

When a marker is obtained and connected to line circuit 108 by way of link and connector circuit 157, the line circuit supplies its class mark to the marker by way of control leads 122, grounds its sleeve lead (of two-way transmission path 118) and supplies hold ground by way of control leads 122 for the hold magnets of the crossbar switch of link and connector circuit 157. The marker circuit thereupon obtains register sender, such as digital register sender circuit 110, connects the register sender to the line circuit by way of link and connector circuit 157, informs the register sender that a call is originating from a line circuit connected to a 56 kbs subscriber; and thereafter the marker releases. The register sender thereupon obtains from the line circuit, by way of link and connector circuit 157 and control leads 127, the class mark of the originating line circuit and obtains from link and connector circuit 157 the horizontal group and link number of the connection of the line circuit.

At this time two-way transmission path 126, extending from digital register sender 110, is connected to two-way transmission path 118 of line circuit 108 by way of the crossbar switch connection provided by link and connector circuit 157. Digital register sender circuit 110 thereafter sends control mode "NUL" characters to line circuit 108 and line circuit 108, as previously described, is sending data mode characters which are now being received by digital register sender circuit 110. Digital register sender circuit 110 aligns itself with the original "SYN" data characters transmitted by the subscriber by stripping the bits inserted by the OCU and detecting the "SYN" data character originally transmitted. The register sender thereupon counts (or flywheels) the "SYN" data character and, if a sufficient number of "SYN" data characters are received, the flywheel is satisfied and the digital register sender returns successive control mode "CSA" (dial tone) characters to line 126 and thus back to line circuit 108.

Line circuit 108, monitoring transmission line 118, recognizes that the characters being received have changed from "NUL" to "CSA" (dial tone) characters. Line circuit 108 thereupon flywheels the "CSA" characters and, when the flywheel has been satisfied, the line circuit becomes fully transparent, passing the "CSA" characters to the OCU and passing the "SYN" characters from the OCU to link and connector circuit 157.

The "CSA" characters from line circuit 108 are passed by OCU 106 to the data subscriber. The subscriber, recognizing dial tone characters, proceeds to send address digits which, in this particular embodiment, constitutes seven digits and after the seven digits sends the character "ETB" to designate the termination of the digits and follows with packets of "SYN" characters. The OCU repeats these characters, inserting a 1 bit in the eighth bit position since the subscriber is "off-hook." The datamode characters, thus assembled from digital data followed by "ETB" data characters and "SYN" data characters are passed to line circuit 108 which, being transparent, repeats the character sequence to transmission line 118 and these sequences are thereby passed to digital register sender circuit 110.

Digital register sender circuit 110 converts the received address digital characters to the conventional two-out-of-five code which is recognizable by the marker decoder and checks the address digit characters for proper format and parity.

If the format or parity is incorrect, the register sender returns a "NAK" character and several non-valid call progress code sequences, sends an "Idle" character and releases whereby "NUL" characters are sent to the line circuit. The line circuit passes the "NAK" character and non-valid sequences to the subscriber and also recognizes "Idle" and "NUL" characters, overwriting them with "CSA" characters for transmission back to the line subscriber. At the same time the line circuit flywheels the "Idle" and "NUL" characters and, if a sufficient number are received from link and connector circuit 157, the line circuit restores to the idle condition described above and the "NUL" characters are overwritten with "Idle" characters which are passed back to the subscriber. The subscriber presumably "hangs up" to initiate a new call.

In the event that the format and parity of the address digit characters are correct, the register sender returns an "ACK" call progress code sequence to acknowledge the correct reception followed by a succession of "SO" characters and requests the services of a decoder marker by way of control leads 128 extending to decoder marker connector circuit 161. Line circuit 108 passes the "ACK" call progress code sequence back to the line subscriber and, upon the detection of the first "SO" character, overwrites the character (and succeeding characters) with "CSA" 0 characters for passage back to the line subscriber.

The "SO" characters are counted or flywheeled by the line circuit and if the flywheel is satisfied, the line circuit proceeds to overwrite subsequent characters from the switch with "CSA" characters which are sent to the subscriber and to block the data mode characters received from the OCU, thereby sending "NUL" characters to transmission line 118. The application of the "NUL" characters to transmission line 118 precludes any interference with characters to be hereafter received by digital register sender circuit 110 from the terminating circuit since link and connector circuit 157 will connect the terminator circuit to digital register sender circuit 110 by way of two-way line 126 which is connected, in common with line circuit 108, the common connection being described in detail in the R. J. Jaeger, Jr. et al patent.

When digital register sender circuit 110 obtains a decoder marker, it sends the 2/5 address digits and the class mark of the line circuit to the decoder marker connector circuit 161 by way of control leads 128. The decoder marker thereupon locates the terminating line circuit or trunk circuit and determines if it is idle or busy. In the event that the terminating circuit is busy, the decoder marker returns a busy indication by way of control leads 128 and releases. The register sender generates and transmits a "busy" call progress code sequence which is passed by way of link and connector circuit 157 to line circuit 108. Line circuit 108 recognizes the first character of the call progress code sequence and becomes transparent to characters from the switch to send the sequence back to the originating data subscriber. The register sender thereafter releases and link and connector circuit 157 sends "NUL" characters to the line circuit. The line circuit flywheels the "NUL" characters and, if satisfied, returns the line circuit to the idle condition. It is, of course, presumed that the subscriber also restores to the "on-hook" condition upon receiving the busy indication.

Assume now that the terminating line or trunk is available (not busy). The decoder marker thereupon connects the terminating line or trunk to the crosspoint in the link and connector circuit which is in turn connected to the digital register sender and to the line circuit thereby interconnecting the originator, the terminator and the digital register sender. In addition, the decoder marker informs the register sender by way of control leads 128 that a terminating line or trunk is now connected and, if the terminator is a trunk circuit, the route control digit is supplied to the register sender by way of control leads 128. The digital register sender circuit is also advantageously arranged to supply the called number to an associated billing system (not shown).

Assume now that the call is destined for a remote office and the terminator is a trunk circuit. Each of the trunk circuits, such as trunk circuit 111, normally receives, in the initial idle condition, "NUL" characters or bytes from link and connector circuit 157 via a transmission path, such as path 120, and receives "Idle" characters from two-way trunk 143. Trunk circuit 111 in turn blocks (or overwrites) these received characters, sending "NUL" characters to link and connector circuit 157 via two-way path 120 and sending "Idle" characters to two-way trunk 143. At the same time trunk circuit 111 applies a "not busy" indication to control leads 124, which leads extends to link and connector circuit 157. It is to be appreciated that trunk circuit 111 is arranged to handle 56 kbs subscribers and monitors each of the characters being received from either the switch or the trunk line. Other trunk circuits such as trunk circuit 112, may be arranged to handle 9.6 kbs subscribers and monitor and/or count every fifth character taking into consideration that the OCU for a 9.6 kbs subscriber repeats each character five times.

Returning now to trunk circuit 11, it is recalled that the trunk circuit has been connected to digital register sender 110 and to originating line circuit 108 and the trunk circuit in turn now sends a busy indication over control leads 124. Upon being advised by the decoder marker of the connection the register sender transmits "ENQ" characters to two-way transmission path 126. The line circuit ignores the "ENQ" characters and continues to overwrite the characters from the digital register sender with the byte character "CSA." Trunk circuit 111 also receives the "ENQ" characters and after it flywheels the character and is satisfied that an appropriate number is received, the trunk circuit becomes transparent in the downstream direction, passing the "ENQ" characters downstream to two-way trunk 143. The downstream "ENQ" characters are therefore applied to multiplexer/demultiplexer 115, inserted in a time slot in two-way digital line 111, demultiplexed by the downstream multiplexer/demultiplexer in the downstream office and applied by the two-way trunk line corresponding to trunk line 143 to a trunk circuit in the downstream office.

The trunk circuit in the downstream office, which corresponds to trunk circuit 111 and is described hereinafter as the downstream originating or incoming trunk is initially in the same idle condition described above for trunk circuit 111. The downstream originating trunk now flywheels the incoming "ENQ" characters and, upon becoming satisfied, becomes transparent to the "ENQ" characters, makes a request by way of its control leads 125 for a decoder marker and supplies a busy indication by way of its control leads 124 to the downstream link and connector circuit. When the decoder marker is obtained, the downstream originating trunk supplies its classmark to the decoder marker, provides a hold ground for the hold magnets in the link and connector circuit and provides ground to its sleeve lead. The downstream marker obtains a digital register sender circuit and connects the digital register sender to the crosspoint in the link that is in turn connected to the trunk circuit, informs the register sender that the originator is a trunk circuit and further informs the register sender of the signaling speed handled by the trunk circuit and thereafter releases. The register sender now obtains by way of control leads 127 the classmark of the trunk circuit and the horizontal group and link number connection.

With the downstream digital register sender circuit now connected to the downstream trunk circuit the "ENQ" characters transmitted from the upstream digital register sender circuit are received by the downstream digital register sender circuit. The downstream digital register sender circuit receives the "ENQ" characters and proceeds to return "CSA" (dial tone) characters. The originating trunk in the downstream office receives the "CSA" characters, flywheels the characters and upon being satisfied that a sufficient number of "CSA" characters are received, becomes transparent to data transmission in the upstream direction. This passes the "CSA" characters on upstream to the terminating trunk circuit in the upstream office and this trunk circuit, also being transparent, passes the "CSA" characters to the digital register sender circuit.

The upstream originating line circuit in the upstream office is still sending "NUL" characters so as to not interfere with the "CSA" characters coming upstream. The upstream register sender now receives the incoming "CSA" characters and proceeds to send back downstream a sequence of code characters which define the route digit, the originating line circuit classmark, the address digits (in their original code character form) terminating these with the code character "ETB" and calculates a block check digit which is also sent downstream. This sequence is passed on downstream and received by the downstream register sender. The downstream register sender now converts the address digits to the 2/5 code format, calculates the block check digit from the received address digits and compares the calculated block check digit with the received block check digits.

In the event that there is a failure in comparison of the block check digits, the downstream register sender returns a packet of "NAK" call progress codes and releases. The upstream register sender thereupon makes a second try, initially sending a packet of "SI" characters.

The "SI" characters are detected by the upstream trunk circuit to disconnect the trunk circuit and restore it to the initial idle condition. Accordingly, the upstream trunk circuit overwrites characters from the link and connector circuit by sending "Idle" characters downstream by way of two-way trunk line 143. The downstream trunk circuit therefore now receives "Idle" characters from the upstream office. The downstream trunk 111 flywheels the downstream "Idle" characters and, upon being satisfied that an appropriate number of these characters are being received, restores to the idle condition. Accordingly, it is to be appreciated that the upstream trunk circuit returns to the idle condition in the event that its associated register sender sends the appropriate "SI" code packet or in the event that it is receiving "NUL" characters from the link and concurrently receiving "Idle" characters from the trunk line. This is to assure that the upstream trunk circuit, having become transparent in both directions, will not inadvertently disconnect a trunk connection if momentary static or interruptions simulate "NUL" or "Idle" characters in one direction. Thereafter, the upstream register sender again requests a marker decoder, a trunk circuit is again connected and the process is again repeated wherein a downstream register sender is obtained and the address digits transmitted thereto.

Assuming a second check fails, the "NAK" character packet is again returned, the downstream register sender releases and "NUL" characters are again sent by the switch to the downstream trunk circuit. The upstream register sender transmits a "time out" call progress code sequence to advise the originating subscriber that a connection to the terminator could not be obtained. The upstream register sender then releases and the originating line circuits returns to idle upon the release, as previously described. With the release of the upstream register sender the upstream trunk circuit receives "NUL" characters from link and connector circuit 157 and "Idle" characters from the downstream office (since the downstream trunk circuit is receiving "NUL" characters from its link circuit and converting these "NUL" characters to "Idle" characters for transmission upstream). The upstream trunk circuit thereupon sends "Idle" characters downstream and since it is concurrently receiving "NUL" characters from the link and "IDLE" characters from the trunk it is restored to the idle condition; the downstream trunk circuit now receiving "Idle" characters from upstream office also restores to the idle condition.

Assume now that the downstream register sender finds the comparison of the address digits to be correct and returns the packet of "ACK" characters. The downstream register sender now requests a decoder marker via control leads 128 and sends "SO" characters to the originating trunk which thereafter overwrites upstream data witht "CSA" characters and blocks downstream data. The upstream register sender, upon reading the "ACK" code packet, sends "UOD" (unblind) and "REV" (reverse) characters and thereafter tops sending to the switch. The originating line circuit receives the "UOD" characters and becomes transparent toward the switch and overwrites characters from the switch with "CSA" characters. The upstream trunk circuit receives the "REV" characters and reverses the transmission line connections. This now connects the transmitting side of the originating line circuit through the link and trunk circuit to the downstream side of the trunk line and connects the upstream side of the trunk line through the trunk line circuit and the link to the receive side of the line circuit. Data from the originating subscriber now passes downstream while upstream data is overwritten by the line circuit with "CSA" characters which are sent to the originating subscriber.

When the decoder marker is obtained by the downstream register sender, the route digit, the address digits, the classmark of the originating trunk circuit together with the link and horizontal group numbers are passed to the marker. The marker thereupon will determine if the terminating circuit is idle or busy. In the event that the terminating circuit is busy, the marker provides a busy indication by way of control leads 128 to the digital register sender circuit. The downstream register sender circuit in turn returns a "busy" call progress code sequence upstream to the originating subscriber and releases. "NUL" characters are sent by the downstream switch to the trunk circuit which overwrites "Idle" characters and sends them to the originator. The originating line circuit sends "NUL" characters to the switch and disconnects and the switch sends "NUL" characters to the upstream trunk circuit which overwrites "Idle" characters for transmission downstream. The upstream trunk circuit is now receiving "NUL" characters from the link and "Idle" characters from the trunk line and returns to the idle condition.

The downstream trunk circuit, which is not yet fully transparent, returns to the idle condition in response to the "Idle" characters from the trunk line. Finally, it is presumed that the originator restores to the "on-hook" condition upon receiving the "busy" call progress code sequence.

Assume now that the marker determines that the terminating line circuit is idle. It is recalled that an idle line circuit initially overwrites "NUL" characters from the switch with "Idle" characters, sending them on to the OCU, and overwrites "Idle" characters from the OCU with "NUL" characters which are sent to the switch. With the terminating line circuit in this condition, the marker proceeds to connect the terminating circuit to the crosspoints in the link which presently interconnects the downstream trunk circuit and the downstream register sender. The marker thereupon signals the register sender by way of control leads 128 that the terminating line circuit is connected to the link.

Upon being advised that the terminating line circuit is idle and connected, the register sender initiates the generation of packets of "BEL" characters, sending these characters by way of the link and connector circuit to the terminating line circuit and thereafter generating a "ringing" call progress code sequence for transmission, through the link and connector circuit, back to the trunk circuit. At the same time the register sender monitors the characters sent by the terminating line circuit.

It is recalled that the terminating line circuit may be in the "not ready" condition wherein, as previously described, the line circuit appears idle but is sending "not ready" characters to the link. The register sender, upon detecting the "not ready" characters, precludes or terminates the generation of the "BEL" characters (or the "ringing" call progress call sequence) and generates instead a "not ready" call progress code sequence which is sent back to the originating trunk circuit in the downstream office. Thereafter the register sender sends the "Idle" character and releases; the switch thereafter sending "NUL" characters.

The first character of the "not ready" call progress code sequence is monitored by the originating trunk circuit and the trunk circuit is thereupon rendered transparent to upstream data. Accordingly, the "not ready" call progress code sequence passes through the originating trunk circuit in the downstream office and through the upstream office terminating trunk circuit, which is presently transparent, and on through the link to the originating line circuit. The originating line circuit, in turn, becomes transparent upon the detection of the first character of the call progress code sequence and the "not ready" sequence is thereupon passed on to the originating subscriber. The originating subscriber thereupon presumably hangs up and the originating line circuit in response to the "NUL" characters following the call progress sequence returns "NUL" characters to he switch and disconnects. "NUL" characters transmitted by the originating line circuit are converted to "Idle" characters by the terminating trunk circuit and transmitted to the originating trunk circuit in the downstream office. The downstream trunk circuit flywheels the "Idle" characters and upon being satisfied that an appropriate number of these characters have been received disconnects from the switch and restores to the idle condition.

The originating trunk circuit now sends the "Idle" characters to the trunk line and "NUL" characters to the terminating line circuit. The terminating line circuit now disconnects in response to the "NUL" characters. With the "NUL" and "Idle" characters being transmitted in both directions, the upstream trunk circuit now disconnects and restores to the idle condition.

Assume now that when the terminating line circuit is connected to the downstream register sender the terminating subscriber is attempting to initiate a call and is presently "off-hook." In this event the terminating line circuit is sending data mode characters and these data mode characters are monitored and flywheeled by the digital register sender. When the flywheel is satisfied, the generation of the "BEL" characters or "ringing" call progress code is terminateed and a "busy line" call progress code is generated and sent to the originating trunk circuit. The originating trunk circuit recognizes the first character of the call progress code sequence and becomes transparent to upstream traffic sending the call progress code sequence to the originating line circuit, which upon recognizing the first character also becomes transparent to pass the "busy line" call progress code sequence to the originator. The originator presumably "hangs up," disconnecting the line and trunk circuits in the same manner as previously described for the "not ready" sequence.

Assume now that the terminator is idle and sending "NUL" characters to the switch. The register sender, as previously described, proceeds to send the packet of "BEL" characters to the terminating line circuit and the "ringing" call progress code sequence to the originating trunk circuit. The terminating line circuit flywheels the "BEL" characters and, when satisfied, the terminating line circuit proceeds to terminate the sending of "NUL" characters and overwrites the characters from the subscriber with "CSA" characters for transmission to the switch and, in addition, terminates the sending of "Idle" characters to the OCU and overwrites the "BEL" characters from the switch with "CME" characters for transmission to the subscriber to advise him that he is being rung. At the same time the terminating line circuit becomes busy providing a busy indication to the link.

The originating trunk circuit, recognizing the initial character of the "ringing" call progress code sequence, becomes transparent to upstream data. The "ringing" call progress code sequence is thereupon transmitted upstream to the terinating trunk circuit and then through the link to the originating line circuit. The originating line circuit, in turn, becomes transparent and the originator thus receives the "ringing" call progress code sequence.

After the transmission of the "ringing" call progress code sequence, the register sender sends packets of "UOD" (unblind) and "REV" (reverse) charcters and thereafter sends "NUL" characters to terminate its signaling to the link. The originating trunk circuit in response to the packet of "UOD" charcters becomes transparent to the downstream data and resumes overwriting upstream data with "CSA" characters after sending the packet of "UOD" characters on upstream. The originating line circuit resumes overwriting characters from the switch with "CSA" characters in response to the upstream UOD character. The terminating line circuit, in response to the "REV" characters, reverses its transmission connections to connect its transmitting side to the receive side of the originating trunk circuit and to connect the transmitting side of the transmitting trunk circuit to its receive side. This completes the alignment of the connections through the two offices connecting the transmitting side of the originating line circuit to the receive side of the terminating line circuit and connecting the transmitting side of the terminating line circuit to the receive side of the originating line circuit.

Assume now that the terminating subscriber fails to answer the call. The originator continues to receive the "CSA" characters being generated by the originating line circuit. Realizing that the call is not being answered, the originator presumably "hangs up." The originating line circuit thereupon disconnects, sending "NUL" characters to the switch. Thereafter, in response to the "NUL" characters the terminating line circuit disconnects and with the "NUL" and "Idle" characters being transmitted in both directions the terminating trunk disconnects and restore to idle both trunk circuits.

Assume now that the terminator answers the call. Advantageously the call is answered by the transmission of an answer packet which constitutes a plurality of data mode ("ANS") characters. This answer packet of data mode characters is flywheel by the terminating line circuit which generates a predetermined number of data mode "ANS" characters, and a "CTC" (cut-through) character which are sent on upstream. Thereafter the terminating line circuit becomes fully transparent in both directions.

The originating trunk circuit in the downstream office flywheels the data mode characters and, upon being satisfied, it also becomes transparent in both directions. Finally, the originating line circuit monitors the answer packet, and also becomes fully transparent. The connection between the two subscribers is thereby cut-through and the originator and terminator can then proceed to communicate with each other.

Assume that the call is local and the terminating line circuit is in the same office as the originating register sender. The register sender operates in a manner similar to the operation of the register sender in the downstream office when responding to the marker's obtaining of the terminating line circuit. More specifically, if the marker advises the register sender that the terminating line circuit is busy, the register sender generates the "busy" call progress code sequence which is returned to the originating line circuit and the originating line circuit, as previously described, passes the "busy" call progress code sequence to the originating subscriber. The register sender thereafter disconnects followed by the disconnection of the originating line circuit.

If the terminating line circuit is available, the marker connects the terminating line circuit to the link presently connected to the register sender and the originating line circuit. The digital register sender circuit now generates the packet of "BEL" characters followed by the "ringing" call progress code sequence. If the terminating line circuit is in the "not ready" condition or if the terminator has gone "off-hook" to initiate a call, the register sender recognizes the "not ready" or data mode characters and terminates the generation of the packet of "BEL" characters (or the "ringing" call progress code sequence) to generate the "not ready" or "busy line" call progress code sequence which is then returned to the originating subscriber. The register sender thereafter disconnects and the originating and terminating line circuits in turn disconnect.

In the event that the terminating line circuit is available and idle, the register sender completes the generation of the packet of "BEL" characters and the "ringing" call progress code sequence. The packet of "BEL" characters are monitored by the terminating line circuit which, as previously described, overwrites the "BEL" characters with "CME" characters to advise the terminating subscriber that he is being rung and overwrites characters from the subscriber with "CSA" characters. The originating line circuit in response to the "ringing" call progress code sequence becomes transparent to the characters from the switch to pass the sequence to the originating subscriber.

After the generation of the ringing call progress code sequence, the register sender sends the "UOD" and "REV" characters and thereafter sends "NUL" characters so as to not interfere with any communication between the subscribers. The originating line circuit, as previously described, becomes transparent towards the switch and overwrites characters from the switch with the "CSA" characters in response to the "UOD" character. The terminating line circuit reverses its connections in response to the "REV" character. Accordingly, the terminating line circuit is sending "CSA" characters to the switch and "CME" characters to the terminating subscriber. The terminating subscriber now answers the call by sending the answer packet and the terminating line circuit in response to the answer packet inserts the "ANS" and "CTC" characters and becomes transparent in both directions. The originating line circuit in turn becomes transparent in both directions in response to the answer packet. The transmission line from the originating subscriber is thus cut-through to the terminating subscriber and they may proceed to communicate.

At the termination of a call one or the other of the subscribers "hangs up." The line circuit of this subscriber then disconnects, sending "NUL" characters to the switch. The other line circuit, in response to the "NUL" characters, also disconnects, sending "NUL" characters back through the switch to the first subscriber. If the call is a trunk call, "NUL" and "Idle" characters are being transmitted in both directions and the trunk circuits restore to idle and also disconnect. Accordingly, all of the circuits involved in the call disconnect and restore to idle in response to one or the other of the subscribers "hanging up."

LINE CIRCUIT

In the idle state, the line circuit (such as line circuit 108) normally receives "idle" characters from OCU 106 and receives "NUL" characters from the link and connector circuit 157. The line circuit in turn sends "idle" characters to the OCU and "NUL" characters to the link and connector circuit. In the event that the subscriber is not ready to receive calls, the OCU sends "not ready" characters to the line circuit. The line circuit is receiving "NUL" characters from the link and connector circuit since it is presently in the idle state. Under this condition the line circuit sends "idle" characters to the OCU and sends "not ready" characters to the link and connector circuit.

Figure 26:
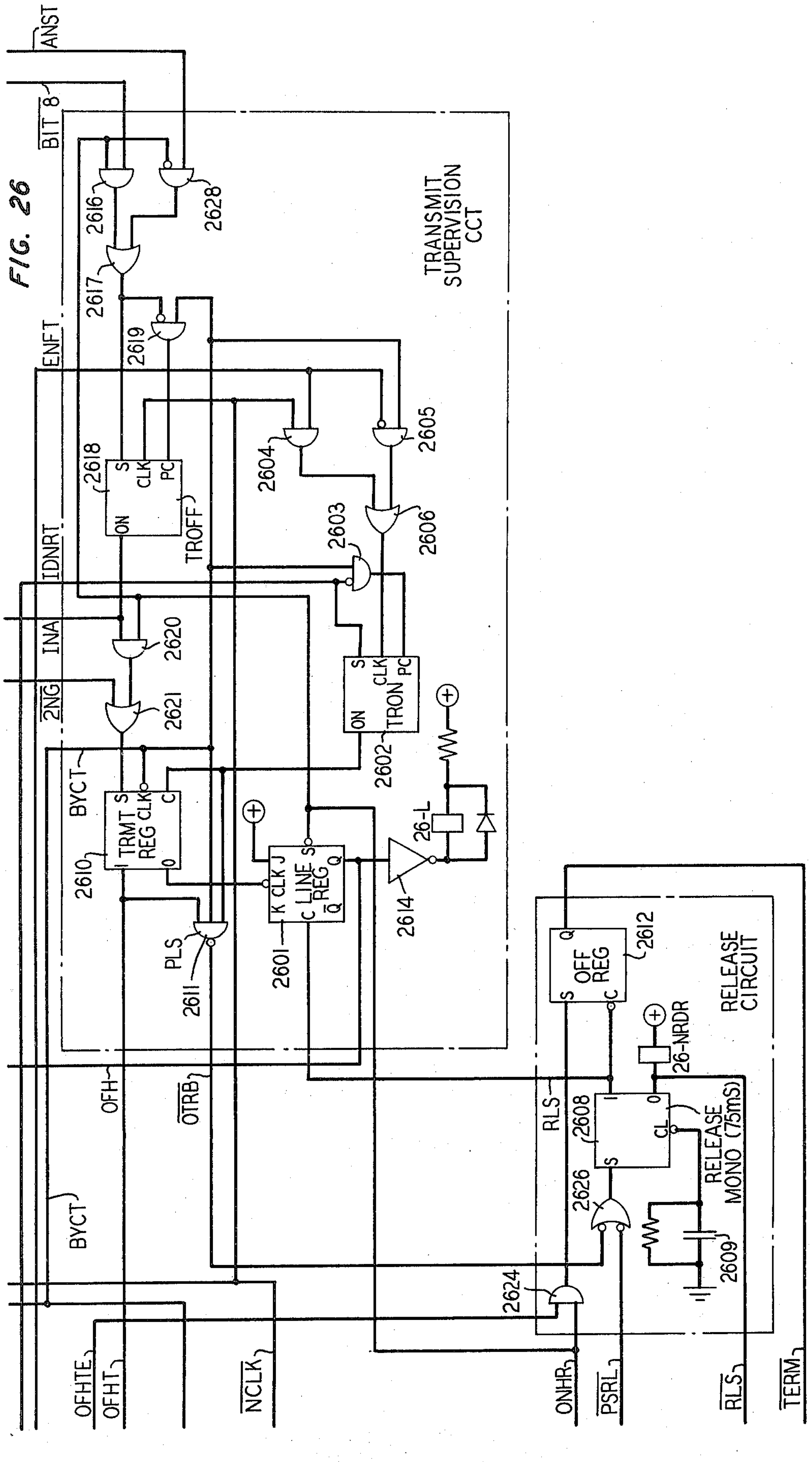

When the line circuit is initialized, that is when power is initially applied, ground is passed to capacitor 2609 in the release circuit (FIG. 26). This results in the application of a negative transition to input terminal CL of release monopulser 2608 firing the monopulser. A negative pulse is thereby developed at the 0 output terminal of the monopulser momentarily operating relay 26-NRDR. The momentary operation of relay 26-NRDR opens operating paths of various relays in the relay control logic (FIG. 21), releasing those relays which are operated, such as relays 21SL and 21MC. In addition, the negative output pulse derived from monopulser 2608 also clears various flip-flops in the line circuit as described hereinafter.

The firing of monopulser 2608 provides a positive pulse to output terminal 1 of the monopulser. This positive pulse clears line register 2601. The clearing of register 2601 lowers the potential on output terminal Q and this low potential is passed to lead OFH. In addition, the low potential is inverted by inverter 2614 and the consequent high potential output of the inverter assures the release of relay 26-L. This condition comprises the initial condition for the idle state.

In the above-identified idle state, all of the relays in the line circuit relay control logic (FIG. 21) are released. At this time, the marker circuit is presenting a high-resistance ground through the link and connector circuit to lead BT. At the same time, the line circuit is presenting battery to lead BT, which battery is passed through break contacts of relay 26-NRDR, the coil of relay 21-MC, break contacts of relay 21-SL and break contacts of relay 21-L1. Lead BT (which corresponds to lead BTO in FIG. 4 of the Jaeger et al patent), advises the marker circuit by way of the link and connector circuit that the line circuit is idle as described in detail in the Jaeger et al patent. The high-resistance ground is such that the resultant current through lead BT is insufficient to operate relay 21-MC.

As noted above, "idle" signals are received by the line circuit from the OCU in the idle state. These incoming signals are bipolar signals received across leads T1 and R1 (FIG. 21) and converted to binary signals by the terminator circuit 2101. The binary code signals are then passed to the D input of transmit shift register 2102 and clocked in by the clock pulses on lead BIC connected to input terminal CLS. As described hereinafter, the clock signals are obtained from the office 64 kbs bit clock.

Figure 22:
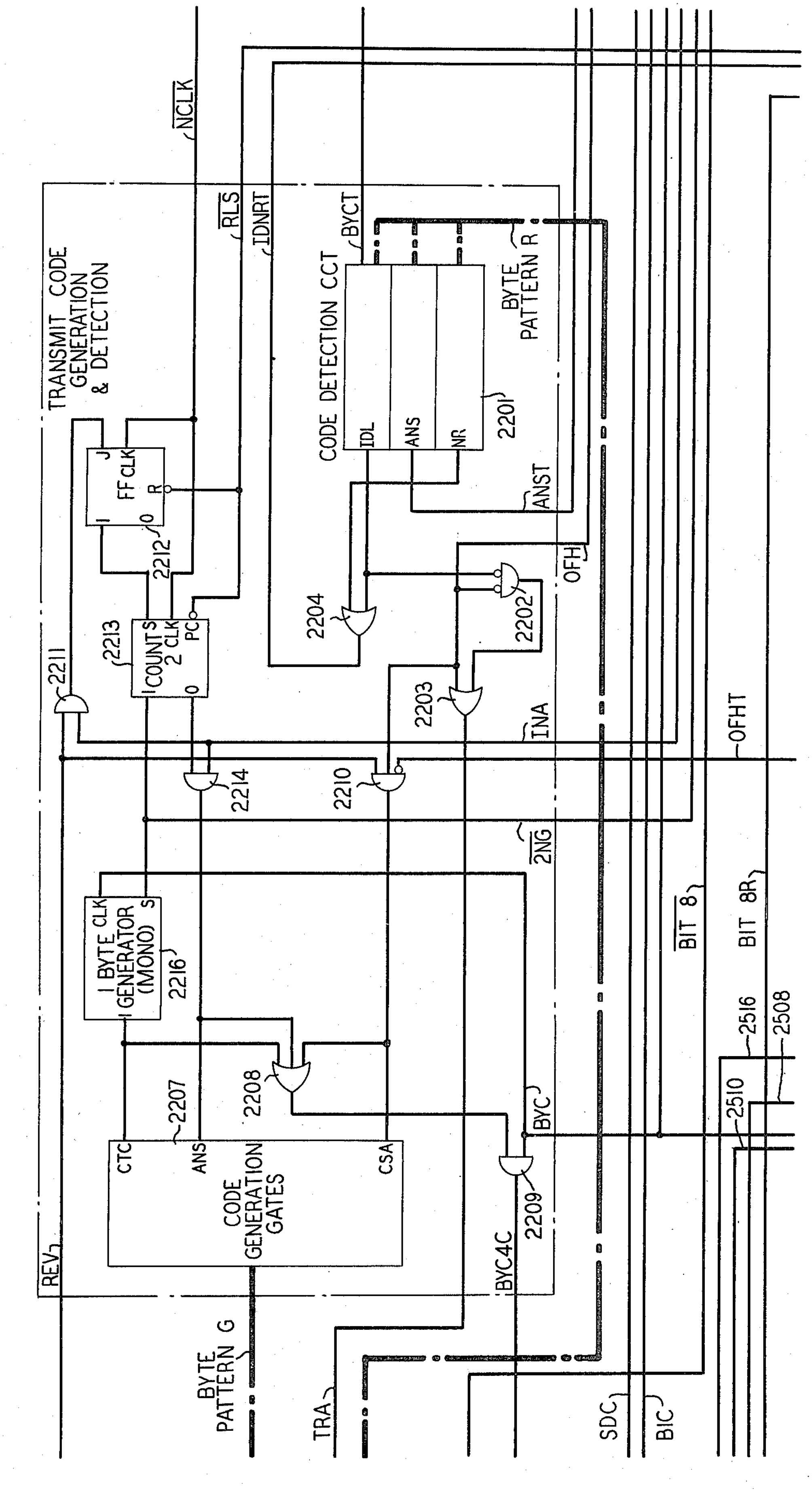
Figure 24:
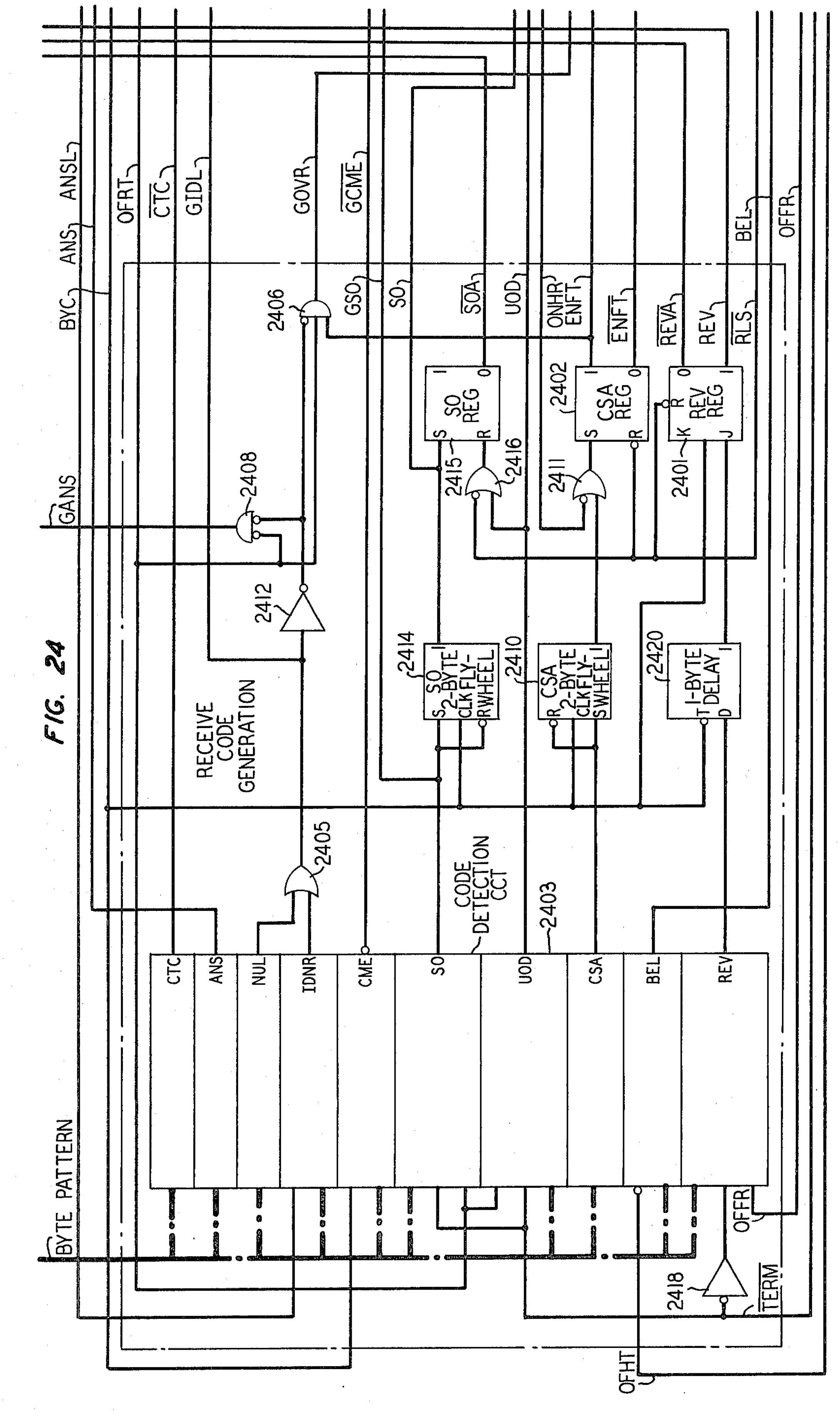

The output of the eight stages of transmit shift register 2102 is obtained from output terminals 1 to 8 and applied in parallel via cable BYTE PATTERN R to the code detection circuit 2201 (FIG. 22). As previously noted, the OCU sends either the "idle" (on-hook) charactr, the "ANS" (off-hook) character, the "not ready" character or data characters from the subscriber. All of the characters are assembled by the OCU into eight bit bytes, the control characters being aligned in the byte and otherwise identified by a 0 bit in the eighth bit position. After the eight bits of the incoming byte are received and shifted into transmit shift register 2102, code detection circuit 2201 is enabled to sample the bit pattern by the pulse derived from the clock pulse on lead BYCT, which pulse, as described hereinafter, occurs once per byte for high rate subscribers and once-per-five bytes for subrate subscribers. Since transmit shift register 2102 is receiving the "idle" code byte, code detection circuit 2201 recognizes the pattern and applies a positive pulse to gage 2202, disabling the gate. This provides one low input to OR gate 2203. The other input or OR gate 2203 is connected to lead OFH. Lead OFH is connected the Q output of line register flip-flop 2601 (FIG. 26). As previously described, line register flip-flop 2601 is normally "cleared" after the termination of a call. Lead OFH, being connected to the Q output of line register flip-flop 2601 is therefore low. Since both inputs to OR gate 2203 are low, a low condition is applied to lead TRA to disable TRA gate 2103. The serial output of stage 8 of transmit shift register 2102 extends to gate 2103 and this output is thereby blocked. The output of gate 2103 is connected to gates 2104 and 2105. The other input of gate 2104 is connected to lead $\overline{REVA}$ and the other input of gate 2105 is inversely connected to lead $\overline{REVA}$. Lead $\overline{REVA}$, in turn, is connected to the 0 output of reverse register flip-flop 2401 in the receive code detection circuit (FIG. 24). In the normal idle condition, reverse register flip-flop 2401 is "cleared," as described hereinafter. The flip-flop therefore applies a high potential to lead $\overline{REVA}$. This disables NAND gate 2105 and enables NAND gate 2104. Since gate 2103 is blocked, a constant high potential is applied by gate 2104 to driver circuit 2106 and a consequent "NUL" character in a bipolar signal format is passed to leads TT and TR and then on to the link and connector circuit; the latter leads being correspondingly identified in FIG. 2 of the Jaeger et al patent.

The pulse derived from the detection of the "idle" code by code detection circuit 2201 is also passed via OR gage 2204 to lead IDNRT. This pulse is thus applied to the "set" input of TRON "count-2" counter 2602 of the transmit supervision circuit (FIG. 26). The positive pulse is also applied, inverted, to AND gate 2603, disabling the gate to preclude the "clearing" of counter 2602. TRON counter 2602 constitutes the counter or "flywheel" which monitors the "idle" and "not ready" characters to determine whether an excess of eight successive ones of these code characters are received from the OCU.

Assume now that successive "idle" code characters are being received from the OCU, a positive pulse being therefore applied to the "set" input of TRON counter 2602 and a disabling pulse being applied to gate 2603 when each BYCT pulse is applied to detection circuit 2201. So long as "idle" codes are being received, this condition is maintained. During this condition the BYCT pulse is applied to the other input of gage 2603. Therefore, if a code character other than the above mentioned characters is received, the gate 2603 is enabled and the BYCT pulse thereupon is passed to the "PC" input terminal of TRON counter 2602 to "clear" the counter. Thus it can be seen that the clearing of counter 2602 is precluded so long as "idle" characters are received from the OCU.

Clocking for TRON counter 2602 is provided by a pair of clocking gates 2604 and 2605 which are controlled by lead ENFT. Lead ENFT is connected to the 1 output terminal of CSA flip-flop 2402 in the receive code detection circuit. As described hereinafter, the flip-flop 2402 has been "cleared" at the termination of the previous call and in this idle state remains in the "clear" condition. A low potential is thereby passed to lead ENFT disabling clock gate 2604 and enabling clock gate 2605. The enabling of gate 2605 passes the BYCT clock pulse through OR gate 2606 to input terminal CLK TRON counter 2602. Since an "idle" byte is being received and a positive pulse being applied to the "set" terminal, a count of one is inserted into the counter.

It is noted that, with the line circuit in the idle state (and the subscriber in the on-hook condition) the enabling of gate 2605 provides a "fast" count for TRON counter 2602 whereby the counter examines successive bytes. This is due to the passage of the BYCT clock pulse to the counter, the BYCT pulse occurring once per byte (or 1-of-5 bytes for subrate subscribers).

When the next BYCT pulse is generated (and with "idle" characters still being received) the pulse is passed through AND gate 2605 to advance TRON counter 2602 to the count of two. With the TRON counter advanced to the count of two, the "ON" output terminal goes high. This high output is passed to the "clear" input of TRMT flip-flop 2610. The termination of the BYCT clock pulse now toggles flip-flop 2610 to the "clear" condition, if it is not already in the "clear" condition. The 1 output of flip-flop 2610 is thereby low to disable gate 2611 and apply a low condition to lead OFHT. At the same time, the 0 output is high to preclude clocking for line register flip-flop 2601. The line register flip-flop is in the "clear" condition due to the termination of the previous call as described hereinafter or the initialization of the circuit as previously described.

With flip-flop 2610 in the "clear" condition, the transmit supervision circuit now indicates that the subscriber is "on-hook" and the supervision circuit is maintained in this state so long as these conditions prevail.

As previously noted, "NUL" characters are received from the link and connector circuit during the idle state. These characters are applied to the line circuit by way of the link and connector circuit leads RT and RR (FIG. 21) to terminator 2108 which converts the bipolar signals from the link and connector circuit to binary code signals. The code signals are then passed to input gates 2109 and 2110. Input gate 2109 is disabled and input gate 2110 is enabled by a previously described high potential on lead $\overline{REVA}$. Accordingly, the incoming code signals from the switch are passed through the enabled gate 2110 and through NOR gate 2111 and to the D input of receive shift register 2112. The signals are then clocked in to receive shift register 2112 by the bit clock pulse on lead BIC which is connected to input terminal CLK.

The parallel bit output of the various stages of receive shift register 2112 is passed to eight output terminals shown as terminals 1-8, applied to parallel leads and cabled by way of cable BYTE PATTERN to code detection circuit 2403 in the receive code detection circuit (FIG. 24). Since the line circuit is receiving "NUL" characters from the switch, the detection circuit 2403 is enabled by the BYC clock pulse (derived from the office byte clock, as described hereinafter) to pass a high potential through the NUL detection gates and then by way of OR gate 2405 to lead GIDL.

The high potential pulse on lead GIDL is applied to the "set" input of RECON counter flywheel 2502 applied, inverted, to gate 2503 to preclude the gating therethrough of the BYCT pulse to clear the counter flywheel. Counter 2502 is thereupon arranged, in the absence of characters other than "NUL," to advance to a count of two in response to the next clock pulse from lead $\overline{NCLK}$, which clock pulse is derived, as described hereinafter, from the byte clock via a 8 circuit to provide one pulse for each 8 bytes (or for each 8 × 5 or 40 bytes for subrate subscribers). Thus, if after the 1 bit is clocked into counter 2502 following reception of the "NUL" character eight more NUL characters are received repetitively without the reception of another intervening character, the clock pulse on lead $\overline{NCLK}$ clocks another bit into the counter and counter 2502 advances to the count of two. Output terminal "ON" of the counter thereupon goes high partially enabling NAND gate 2504 and applying a high potential to the K input of REV flip-flop 2505.

When the next byte clock pulse appears on lead BYCT and is applied to the CLK (clock) input of RCV flip-flop 2505, the RCV flip-flop is toggled to the "clear" condition and, in this condition the line circuit is "on-hook" with respect to the switch. The receive supervision circuit is now maintained in this state so long as these conditions prevail.

Figure 25:
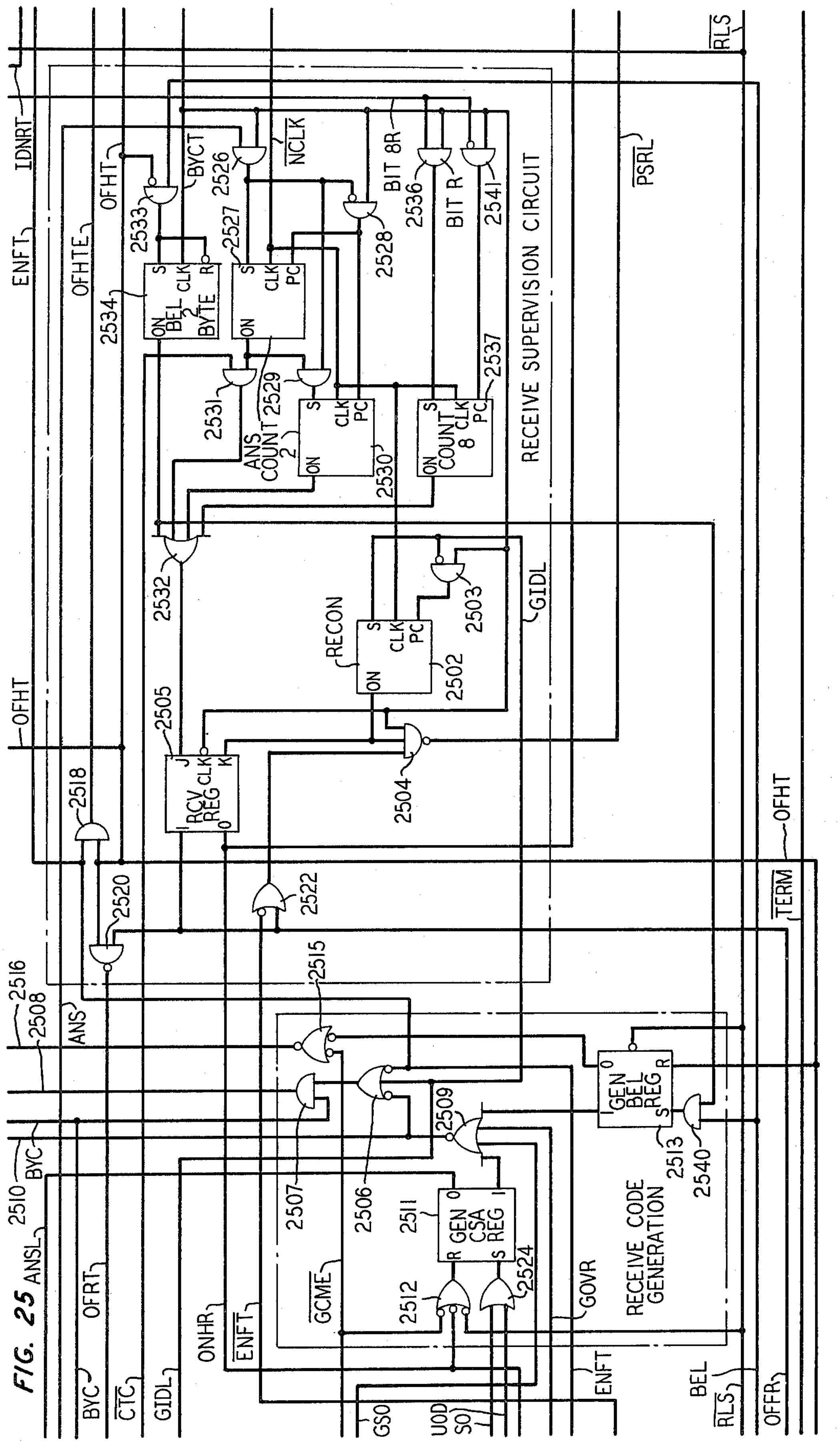

As previously described, code detection circuit 2403, on detecting the reception of the "NUL" character, applies a high potential to lead GIDL. Lead GIDL also extends to OR GATE 2506 in the received code generation circuit (FIG. 25). The high potential on lead GIDL is thereby passed therethrough to enable clock gate 2507 for receive shift register 2112. The clock gate thereupon passes byte clock pulse BYC. This clock pulse is thereupon passed via lead 2508 to the parallel load input CLP of receive shift register 2112, inserting into the register the conditions applied in parallel to its parallel inputs.

Figure 21:
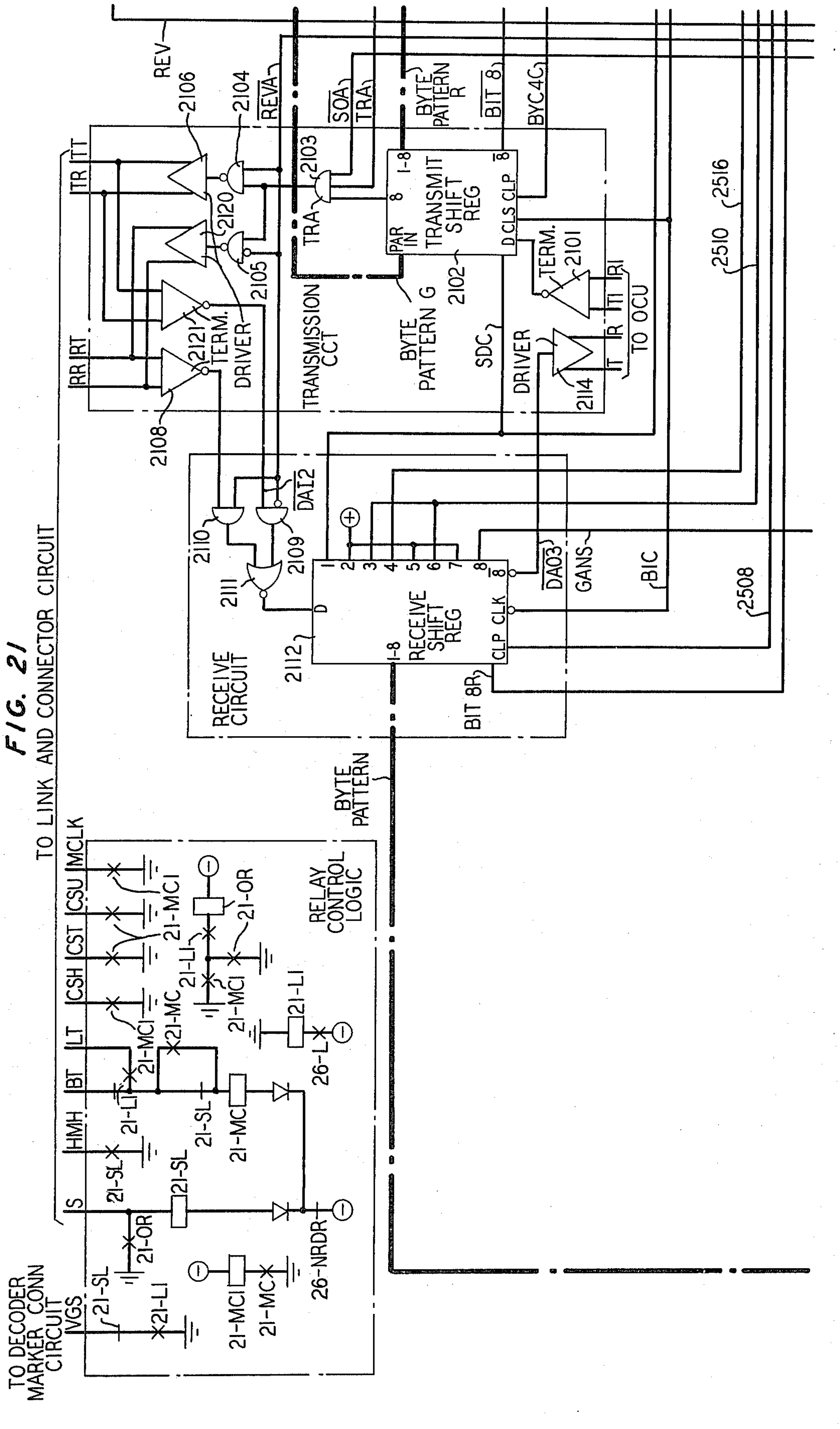
FIGS. 21 through 26, when arranged as shown in FIG. 2, show in schematic form the various circuits which form a digital line interface circuit which comprises part of the central office switching facility.

As seen in FIG. 21, a high potential is always applied to the input of stages 2, 5 and 7 to insert 1 bits in these stages. Stages 3 and 6 of receive shift register 2112 are connected to the output of NOR gate 2509 via lead 2510. One of the inputs to NOR gate 2509 extends to the 1 output of the GEN CSA flip-flop 2511 which was "cleared" by the termination of the previous call as described hereinafter, or by the initialization circuit potential from lead $\overline{RLS}$ applied via OR gate 2512. The second input is connected to the 1 output of the GEN BEL flip-flop 2513 which was also "cleared" by the initialization circuit potential on lead OFHT or by the termination of the previous call, as described hereinafter. The final two inputs extend to leads GSO and GOVR. Lead GSO, which is derived from code detection circuit 2403, is low when the "NUL" character is being received. Lead GOVR is derived from gate 2406 which is presently disabled by the low condition of lead ENFT (as previously noted). Accordingly, all the inputs to NOR gate 2509 are low and the gate applies a high condition via lead 2510 to the input of stages 3 and 6 of receive shift register 2112 to insert 1 bits in these stages.

The input to the first stage of shift register 2112 is derived from lead SDC and is always high for the high-rate subscriber and low for the subrate subscriber, as described hereinafter. The input to the eighth stage extends via lead GANS to AND gate 2408. Gate 2408 is disabled by gate 2520 via lead OFRT and gate 2520 is, in turn, disabled by flip-flops 2505 and 2610, as described hereinafter. Lead GANS is therefore low to insert a 0 bit into the eighth stage. The input to the fourth stage extends via lead 2516 from the output of NOR gate 2515. One input of this gate is lead $\overline{GCME}$ and this lead, which is derived from code detection circuit 2403 is normally high as described hereinafter, except when the code character CME is being received from the switch. Since this is not occurring at this time, lead $\overline{GCME}$ is thereby high. The second input to gate 2515 is high due to a high on the 0 output lead on the GEN BEL REG 2513. This register has been "cleared" by the termination of the previous call as described hereinafter, or the initialization circuit by the pulse on lead $\overline{RLS}$ inverted, or by the answering of an incoming call described hereinafter. With both input leads to gate 2515 higher, the output of gate 2515 goes high to apply a 1 bit to the fourth stage of the receive shift register 2112.

Accordingly, 1 bits are applied to stages 2 through 7 and a 0 bit is applied to stage 8 whereby the elements of the "idle" character are applied in parallel to the stages of receive shift register 2112. The application of the clock pulse on lead 2508 to input terminal CLP therefore overwrites the "NUL" character being received by register 2112 with the "idle" character and this character is shifted out by the BIC clock pulse to output lead $\overline{DA03}$, converted to bipolar pulses by driver 2114 and passed to the OCU by way of lead T and R.

Assume now that the line circuit is in the idle condition receiving "NUL" characters from the switch. The subscriber, however, decides to go to the "not ready" condition and thereupon proceeds to send "not ready" code characters. The OCU, in turn, passes the "not ready" characters on to the line circuit. The "not ready" code character is thereby received by transmit shift register 2102, and, as previously described, the parallel output of the shift register on cable BYTE PATTERN R is monitored by code detection circuit Accordingly, The clock pulse on lead BYCT now enables code detection circuit 2201 to apply a positive pulse to output terminal NR. This high pulse is passed through the OR gate 2204 to lead IDNRT. As previously described, the positive pulse on lead IDNRT maintains the transmit supervision circuit in the idle or "on-hook" condition.

Since the "idle" code character is not being received at this time, output terminal IDL of code detection circuit 2201 is low. This low potential is passed to AND gate 2202, inverted, thereby partially enabling the gate. The other input to the gate is provided by lead OFH which is normally low, as previously described, when the transmit supervision circuit is maintained in the idle "on-hook" condition. This lead's low condition, inverted, is applied to the other input of gate 2202, fully enabling the gate. The gate thereupon generates a high potential which is passed through OR gate 2203 to lead TRA.

The high potential on lead TRA now enables TRA gate 2103 permitting the output of transmit shift register 2102 to pass to gate 2104 which is enabled as previously described. Since, as previously described, transmit shift register 2102 is receiving the "not ready" code and is being clocked by the bit clock on lead BICT, the "not ready" code is thereby passed on through transmit shift register 2102 and through gates 2103 and 2104. This code is then converted to the bipolar code format by driver 2106 and passed on to the link and connector circuit by way of leads TT and TR.

Assume now that the subscriber decides to originate a call. Since the switch continues to send NUL characters to the line circuit, the receive supervision circuit remains in the idle "on-hook" condition. The subscriber now off-hook sends the "data mode" character "SYN." The line circuit now receives these "data mode" characters from the OCU rather than "control mode" characters. Accordingly, each eighth bit of the incoming character from the OCU is a 1 bit rather than a 0 bit.

The code characters, as previously described, are clocked into transmit shift register 2102. The 1 bit in the eighth bit position is now passed from the eighth stage to output lead $\overline{\text{BIT 8}}$ and, therefore, during the eighth bit interval, the pulse on lead $\overline{\text{BIT 8}}$ is high. Lead $\overline{\text{BIT 8}}$ is connected to AND gate 2616 in the transmit supervision circuit. The other input to the gate is connected to lead ONHR. Lead ONHR is connected to the 0 output of REC REG flip-flop 2505 which is "cleared" and lead ONHR is high when the receive supervision circuit is in the idle condition. Gate 2616 is therefore enabled passing the positive pulse on lead $\overline{\text{BIT 8}}$ through OR gate 2617 to the input "set" terminal of TROFF counter 2618. This positive pulse, inverted, also disables gate 2619 which is connected to the preclear PC input for the counter 2618.

TROFF counter 2618 comprises a count-of-two counter which functions as a flywheel for counting the "data mode" characters and arranged in substantially the same manner as other flywheels previously described. TROFF center 2618 is clocked by the NCLK pulse, which as previously described provides a clock pulse once for each eight bytes (or each 40 bytes for subrate subscribers). The preclear gate 2619 is clocked by the byte clock pulse on lead BYCT. Accordingly, in the event that there is an interruption of "data mode" characters during the count, lead $\overline{\text{BIT 8}}$ goes low to enable preclear gate 2619 when the BYCT pulse is applied to the gate, passing the BYCT pulse to the preclear input of counter 2618, "clearing" the counter back to its initial condition. Assuming, however, that there are continuous "data mode" characters, the NCLK pulse on lead NCLK clocks a 1 bit into TROFF counter 2618 and eight bytes thereafter, clocks a second 1 bit into the counter to advance the counter to the count of two.

When TROFF counter 2618 achieves the count of two, a high potential is applied to output terminal ON. This high potential is pased to lead INA and applied to AND gate 2620, partially enabling the gate. The other input to gate 2620 is connected to lead ONHR, which, with the receive supervision circuit in the "on-hook" condition, is in the high condition, as previously described. Gate 2620 is therefore fully enabled generating a high condition which is passed through OR gate 2621 to the "set"[input of TRMT flip-flop 2610. The next byte clock on lead BYCT thereupon clocks TRMT flip-flop 2610 to the "set" condition. With flip-flop 2610 going to the "set" condition, its 0 output terminal provides a negative transition. This negative transition inverted is passed to the clock input of LINE REG flip-flop 2601. Since the J input of flip-flop 2601 is connected to a high potential, the flip-flop is clocked to the "set" condition. Its Q output terminal thereupon goes high and this high condition is inverted, by inverter 2614, and applied to relay 26-L, operating the relay. The operation of relay 26-L applies a negative potential to relay 21-L1 in the relay control logic, operating relay 21-L1. Relay 21-L1 operated opens the busy test lead BT and connects relay 21MC to lead LT. Relay 21-L1 also passes ground via break contacts of relay 21-SL to lead VGS which extends to the decoder marker connector circuit and corresponds to lead VGSO in FIG. 4 of the Jaeger et al patent.

As described in the Jaeger et al patent, the ground on lead VGSO advises the switch that the line circuit is asking for service. As further described in the Jaeger et al patent, the marker circuit now passes a drive ground through the link and connector circuit to lead LT corresponding to lead LTO in FIG. 4 of the Jaeger et al patent. This ground on lead LT passes by way of make contacts of relay 21-L1 to relay 21-MC. Relay 21-MC operates, operating in turn relay 21-MC1. The operation of relay 21-MC1 now applies ground to leads CSU and CST corresponding to similarly identified leads in FIG. 4 of the Jaeger et al patent. This designates the units and tens digits of the line circuit. In addition, ground is also passed to lead CSH by the operation of relay 21-MC1 to supply the hundreds digits. Relay 21-MC1 also passes ground to lead MCLK which is similarly identified in FIG. 4 of the Jaeger et al patent. This identifies the particular vertical number in the crossbar to which the line circuit is attached. Similarly, the operation of relay 21-MC1 completes an operating path via make contacts of relay 21-L1 for relay 21-OR. A holding path via the operated relay 21-L1 will lock relay 21-OR operated.

The operation of relay 21-OR completes an operating path for relay 21-SL and provides ground to the sleeve lead S which extends back to the link and connector circuit as shown in FIG. 2 of the Jaeger et al patent. The operation of relay 21-SL passes ground to lead HMH corresponding to lead HMHO in FIG. 2 of the Jaeger et al patent. As described in detail in the Jaeger et al patent, this latter ground provides hold ground for the hold magnets in the crossbar switch. Relay 21-SL also removes the ground from lead VGS.

After obtaining the class mark information from leads CSU, CST and CSH, the marker removes the drive ground fron lead LT in the operating path of relay 21-MC and the relay releases, releasing in turn relay 21-MC1. The marker also connects the line circuit to horizontal and vertical groups in the link and connector circuit and connects the register sender to the link, all described in the Jaeger et al patent.

The previously described high condition on the Q output terminal of LINE flip-flop 2601 in the transmit supervision circuit is also passed to lead OFH. This high condition on lead OFH passes through the OR gate 2203 in the transmit code generation circuit to lead TRA. With the high condition on lead TRA, TRA gate 2103 in the transmission circuit is enabled. The "data mode" characters which conventionally are "SYN" characters from the subscriber precessed into bytes by the OCU (as described by the Carney et al patent) are therefore passed through the line circuit via transmit shift register 2101, TRA gate 2103 and gate 2104 to driver 2106 where they are converted to the bipolar pulse format to be sent on to the switch. Accordingly, at this time the line circuit is waiting for a register sender to be connected and is now sending "SYN" characters to the link while receiving "NUL" character control mode bytes from the switch.

Assume now that, prior to connection of the register sender, the subscriber goes back "on-hook." Accordingly, control mode "idle" character bytes are again received from the OCU and passed into transmit shift register 2102. The eighth bit of the byte is a 0 to enabled preclear gate 2619 of TROFF counter 2618 via lead $\overline{\text{BIT 8}}$. The counter is therefore cleared by the byte pulse on lead BYCT. In addition, the "idle" character in the transmit shift register is detected by the code detection circuit 2201 in the transmit code generation and detection circuit and when code detection circuit 2201 is enabled by the byte pulse on lead BYCT, a positive pulse is passed to lead IDNRT as previously described. The positive pulse on lead IDNRT starts TRON flywheel counter 2602 and since the flywheel is in the previously described quick count it will advance to the count of two after two "idle" bytes are received, as previously described. Its output ON terminal will thereupon go high to partially enable NAND gate 2611. The second input to gate 2611 is connected to the 1 output of TRMT flip-flop 2610 and the gate is therefore fully enabled since flip-flop 2610 is in the "set" condition as previously described. The gate therefore passes byte clock BYCT pulse inverted to lead $\overline{OTRB}$.

The negative pulse on lead $\overline{OTRB}$ is inverted and passed through OR gate to the "set" input of release monopulser 2608 in the release circuit. The consequent positive transition applied to release monopulser 2608 operates the monopulser to pass a positive pulse to lead RLS and a negative pulse to lead $\overline{RLS}$ and to momentarily operate relay 26-NRDR. The positive pulse on lead RLS "clears" LINE flip-flop 2601 and the transmit supervision circuit restores to the "on-hook" condition as previously described. In addition relay 26-L releases, releasing relay 21-L1 and relay 26-NRDR releases relay 21-SL to release the hold magnets in the link and connector circuit; released relay 21-L1 also releases relay 21-OR and momentarily interrupts the busy test lead BT to preclude seizure by the marker. The relays in the relay control logic are thus restored to the initial idle condition. In addition, the restoring of LINE flip-flop 2601 to the "clear" condition lowers the potential on lead OFH lowering in turn the potential on lead TRA to disable TRA gate 2103 thus blocking the output of transmit shift register 2102. With TRON counter 2602 at the two count, a positive condition is applied to the "clear" input of TRMT flip-flop 2610. The negative transition of the BYCT clock toggles the flip-flop to the "clear" condition restoring the transmit supervision circuit to the idle "on-hook" condition. Accordingly, if the subscriber should go back "on-hook," the line circuit is restored to the idle condition and is released from the link and connector circuit.

Assume now that the subscriber does not hang up, that a register sender is obtained and connected and that, as described hereinafter, the register sender indicates that it is connected by sending "CSA" character bytes. These character bytes are received by way of the link and connector circuit and are then passed by way of leads RT and RR through terminator 2108, terminator AND gate 2110 and OR gate 2111 to receive shift register 2112, as previously described. It is recalled, however, that the characters that are received are not transmitted on to the subscriber but, at this time, are overwritten with the "idle" characters, which "idle" characters are then transmitted to the OCU. The "CSA" characters, however, are shifted into receive shift register 2112, and, prior to being overwritten, the bits of the character (when fully received) are applied in parallel by way of cable BYTE PATTERN to code detection circuit 2403 in the receive code detection circuit. Accordingly, when the BYC pulse is applied, the "CSA" code detection gate passes a pulse to output terminal CSA, which pulse is passed to the "set" input and inverted to the "clear" or R input of a 2-byte flywheel generally indicated by blocks 2410.

CSA flywheel 2410 comprises a two-stage counter clocked by the byte pulse on lead BYC and arranged somewhat differently than the previously described flywheels. Flywheel 2410 is advanced by the BYC pulse to the count of one in response to the reception of the "CSA" character and is "cleared" by the BYC pulse in the absence of the "CSA" pulse. The register sender however continues to transmit the "CSA" characters and the next "CSA" character again advances CSA flywheel 2410 to the count of two. This provides a high condition on the 1 output of CSA flywheel 2410 which is passed via OR gate 2411 to the "set" input of flip-flop 2402. The flip-flop is thereupon "set,"applying a high condition to lead ENFT and a low condition to lead $\overline{ENFT}$.

The high condition on lead ENFT is passed to the OR gate 2506 in the receive code generation circuit. This high condition is inverted by the gate to disable clock gate 2507. The disabling of the clock gate terminates the parallel loading of receive shift register 2112. The overwriting of codes into register 2112 is thus terminating and the register now becomes transparent, passing the code characters received from the register sender to lead $\overline{DA03}$ and then by way of driver circuit 2114 and lead T and R to the OCU. The high condition on lead ENFT also partially enables AND gate 2518. The AND gate is fully enabled by the high condition applied to lead OFHT by flip-flop 2610. A high condition is thus applied to lead OFHTE to partially enable AND gate 2624 in the release circuit. AND gate 2624 is fully enabled by the high potential applied to lead ONHR by flip-flop 2505, resulting in the "setting" of "ORIG" flip-flop 2612. The high potential on lead ENFT also enables AND gate 2604 and disables AND gate 2605. This precludes the passage of the BYCT clock to the CLK input of TRON counter flywheel 2602 and enables the passage of the NCLK clock to the clock input by way of enabled AND gate 2604 and OR gate 2606. Accordingly, TRON counter 2602 is clocked every eighth byte. The effect of this is to terminate the fast count of the flywheel and provide a slower (eighth byte) flywheel count whereby the counter can only complete its count if the subscriber sends at least nine successive "idle" characters.

It is recalled at this time that the register sender is sending the "CSA" characters and these "dial tone" characters when transmitted to the subscriber, indicate to him that a register sender has been connected and he may initiate the sending of address digits. If the subscriber, however, goes back "on-hook" and sends the required number (nine or more) of "idle" characters, TRON flywheel 2602 achieves the count of two and the line circuit is restored to the initial "idle" condition, as previously described. At this time, the pulse generated by release monopulser 2608 and passed to lead $\overline{RLS}$ "clears" CSA flip-flop 2402, restoring the circuitry previously operated by the incoming "CSA" character. In addition, a positive pulse is applied inverted to the "clear" input of the ORIG flip-flop 2612, thereby clearing the flip-flop.

Assume now that the subscriber stays "off-hook" and now proceeds to send the address digits. Since transmit shift register 2102 is transparent, the address digits are relayed to the register sender which, as described herainafter, stores the digits and checks them for appropriate format and errors. In the event that there is an error in the format or in the parity of the digits, the register sender, as described hereinafter, returns "NAK" character sequences followed by "idle" characters. In the event that the subscriber fails to send the digits or does not send the appropriate number of address digits, the register sender as described in detail hereinafter, sends "invalid" character sequences followed by "idle" characters. In either event, the register sender thereafter drops off the connection and the switch then sends NUL characters to the line circuit. The line circuit, being transparent passes the "NAK" or "invalid" sequence through shift regiser 2112 to the subscriber.

When the "idle" and/or "NUL" characters are received from the register or switch, they are passed to receive shift register 2112 and detected by code detection circuit 2403 in the receive code detection circuit, as previously described. The "NUL" or "idle" detection gates thereupon gate the BYC pulse through OR gate 2405 to lead GIDL. In addition, the pulse is inverted by inverter 2412 to partially enable AND gate 2406. Gate 2406 is further enabled by the high potential on lead ENFT provided by CSA flip-flop 2402. The third input to gate 2406 is connected to lead OFRT. Lead OFRT is connected to the output of NAND gate 2520 in the receive supervision circuit. One input to gate 2520 is connected to the 1 output of RCV flip-flop 2505. This flip-flop, as previously described, has been "cleared" when the receive supervision circuit went "on-hook." This applies a low condition to gate 2520 to disable the gate and to pass a high condition to lead OFRT. This now fully enables gate 2406 passing a high condition to lead GOVR.

The high condition on lead GOVR is applied to NOR gate 2509 which in turn enables OR gate 2506 to partially enable AND gate 2507. The BYC clock is now passed through gate 2507 to lead 2508 to parallel load receive shift register 2112. In addition, the negative condition provided by OR gate 2909 inserts 0 bits in stages 3 and 6 of the receive shift register. Since 1 bits will be inserted in stages 1, 2, 4, 5 and 7, as previously described, with a 0 bit being inserted in stage 8, the "CSA" character is thereby parallel loaded into the receive shift register overwriting the incoming "NUL" character and sent to the line subscriber.

The high condition applied to lead GIDL by the detection of the incoming "NUL" character is also passed to the "set" input of RECON counter flywheel 2502 in the line supervision circuit. RECON counter 2502 is clocked by the $\overline{\text{NCLK}}$ pulse, as previously described. Thus, assuming that a repetitive sequence of "NUL" characters exceeding eight are received from the switch, RECON counter 2502 will advance to the count of two. It is noted, however, if there is an interruption of the incoming "NUL" characters, preclear gate 2503 is enabled and the BYCT clock pulse clears RECON counter 2502 requiring a reinitialization of the count.

Assume, however, a count in excess of eight "NUL" characters is received. A count of two is achieved and RECON counter 2502 applies a high potential to its 1 output. This high condition partially enables the NAND gate 2504. The gate is further enabled by the low condition on the $\overline{\text{ENFT}}$ lead, inverted by OR gate 2522 which low condition, as previously described was provided by the setting of CSA flip-flop 2402. PSRL NAND gate 2504 being enabled passes the BYCT clock pulse to lead $\overline{\text{PSRL}}$. This pulse is passed through OR gate 2626 to fire release monopulser 2608 thereby initiating the release sequence previously described. Upon the line circuit returning to the initial idle condition, the "idle" characters are again overwritten into receive shift register 2112 as previously described and transmitted to the subscriber and the line circuit is otherwise restored to the initial idle condition.

Assume now that the originating subscriber has sent the appropriate digits to the register sender without error. The register sender thereupon returns the acknowledgement sequence comprising the code characters "CME," "ACK," "CSA," kids for marker and transfers the dialed number digits to the marker. Thereafter, the register sender sends "SO" control mode characters to the originating line circuit.

The "ACK" sequence from the register sender is received on leads RT and RR which extend from the link and connector circuit and, since the line circuit is now transparent, the "ACK" sequence is passed on to the originating subscriber by receive shift register 2112. When the "SO" character is received, it is sensed by code detection circuit 2403 in the receive code detection circuit. At this time the SO code detection gates of code detection circuit 2403 are enabled by the high conditions on leads $\overline{\text{TERM}}$ and OFRT. The potential on lead $\overline{\text{TERM}}$ is presently high due to the previously described "setting" of ORIG flip-flop 2612, and the potential on lead OFRT is high since gate 2520 is disabled, as previously described. Accordingly, the detection of the "SO" character passes the BYC pulse to lead GSO and to the "set" input of 2-byte flywheel 2414.

The pulse on the GSO lead is inverted by NOR gate 2509 to apply, via lead 2510, the 0 bits of the "CSA" code to stages 3 and 6 of receive shift register 2112. NOR gate 2509 also applies an enabling potential by way of OR gate 2506 to gate 2507. The enabling of gate 2507 permits the passage of the BYC clock pulse to parallel load the "CSA" character into receive shift register 2112 overwriting the incoming "SO" character. Accordingly, the BIC clock pulse clocks the "CSA" character to the originating subscriber.

The high potential applied to the "set" input of 2-byte SO flywheel 2414 is now clocked into the flywheel by the BYC clock. Assuming that the next successive received character from the register sender is another "SO" character (precluding the resetting of the flywheel), another bit is clocked into the flywheel by the next successive BYC clock pulse. The flywheel thereupon advances to the count of two and a high potential is generated at its output and passed to the "set" input of the SO flip-flop 2415 and to the SO lead. The SO flip-flop is thereupon placed in the "set" condition applying a low condition to the SOA lead.

The high condition on the SO lead is passed through OR gate 2524 to the "set" input of flip-flop 2511 in the receive code generation circuit. This "sets" the generate CSA flip-flop 2511 which applies a high condition to NOR gate 2509 and a low condition to lead ANSL. The high condition applied to gate 2509, as previously described, applies the bits of the "CSA" code character in parallel to receive shift register 2112 and enables gate 2507 to load the "CSA" character into the receive shift register upon the application of the BYC clock pulse. A continuous train of "CSA" characters is thereupon passed to the originating subscriber. The low condition on lead ANSL disables the "idle" and "not ready" code detection gates in code detection circuit 2403. The line receive circuit is thereupon precluded from looking for the "idle" and "not ready" code characters. The low condition on the $\overline{\text{SOA}}$ lead disables TRA gate 2103 in the transmission circuit and the line circuit now sends only "NUL" characters to the switch, as previously described.

At this time the line circuit is awaiting the connection of the terminating line circuit. The decoder marker during this period attempts to connect the terminating line circuit and advises the register sender of the terminating line circuit condition. The register sender in turn sends a call progress sequence to the originating line circuit as determined by the condition of the terminating line circuit.

Assume now that the terminating line circuit is busy. The call progress sequence sent by the register sender comprises the sequence of the code character "CME," two digits indicating a busy condition, and the code character "ETB." Thereafter, the register sender sends the "idle" character and releases, whereupon the switch sends "NUL" characters.

When the "CME" character is received by the line circuit and passed to receive shift register 2112, it is detected by the "CME" code detection gates of code detection circuit 2403. The enabled "CME" code detection gates thereupon pass the BYC clock, inverted, applying a negative pulse to lead $\overline{GCME}$.

The low pulse on lead $\overline{GCME}$ is inverted and passed through OR gate 2512 to the "reset" input of flip-flop 2511, "clearing" the flip-flop. The "clearing" of flip-flop 2511 disables gate 2509. The "clearing" of flip-flop 2511 and the consequent high condition output of gate 2509 is inverted to apply a high condition to OR gate 2506. Accordingly, AND gate 2507 is disabled to preclude parallel loading of receive shift register 2112. Accordingly, the receive leg of the line circuit is now transparent to the call progress code sequence being received from the register sender. This sequence, including the 2-digit code indicating the busy condition of the terminating line circuit, is thus passed to the originating subscriber and the originating subscriber presumably will thereafter hang up.

After the register sender disconnects, "NUL" characters are received from the switch. This is detected by code detection circuit 2403 and the BYC pulse is applied to lead GIDL, pulsing gate 2406 and passing through OR gate 2506. The pulsing of gate 2406, which is enabled, as previously described, applies a pulse to lead GOVR. This pulse is passed to OR gate 2509 to apply 0 bits to stages 3 and 6 of shift register 2112, as previously described. The pulse passed through the OR gate 2506 enables gate 2507 to load the "CSA" character into the receive shift register, thereby overwriting the received NUL character, as previously described. Finally, the high pulse on lead GIDL is applied to the "set" input of RECON counter 2502. This permits the counting of the incoming "NUL" characters. Since the RECON counter flywheel is driven by the $\overline{NCLK}$ pulse, at least eight more successive "NUL" characters are required and, in the event they are received, the counter flywheel goes to the count of two, partially enabling gate 2504. At this time the CSA flip-flop 2402 is "set," as previously described, and the consequent low condition on lead $\overline{ENFT}$, inverted by OR gate 2522, is applied to a second input of gate 2504. NAND gate 2504 is therefore fully enabled passing the BYCT clock pulse to produce a negative pulse on lead $\overline{PSRL}$. This negative pulse is passed through OR gate 2626 to fire release monopulser 2608 in the release circuit to initiate the release sequence. The line circuit thereupon returns to the initial idle condition.

In the event that the terminating line circuit is not ready, the register sender sends the "not ready" call progress sequence which is substantially identical to the busy code sequence with the exception that the 2-digit code in the "not ready" sequence indicates that the terminating line circuit is not ready rather than busy. This call progress code sequence is passed on through the line circuit, as previously described, to the originating subscriber advising him of the "not ready" condition of the terminating subscriber and presumably the originating line subscriber hangs up. At the end of the call progress code sequence, the register sender releases, sending "NUL" characters from the switch to the line circuit. The line circuit therefore goes through the same release sequence previously described for the "busy" call progress code sequence.

If the call has been made to another office and a trunk circuit is unavailable, the register sender returns an "all trunk busy" code sequence. This call progress code sequence is handled in the exact same manner as the "busy" code sequence. The line circuit recognizes the "CME" character to render it transparent and recognizes the "NUL" characters to initiate the release sequence. Similarly, the line circuit responds to other "non-complete" call progress code sequences in substantially the same manner, passing on to the line subscriber the call sequence and releasing after the release of the register sender.

Assume now that the terminating line circuit is available. The decoder marker connects the terminating line circuit and tells the register sender that the terminating line circuit is connected. The register sender thereupon sends "BEL" characters to the terminating line circuit and the terminating line circuit, as described hereinafter, returns "IDL" control mode characters to indicate that it is ready to receive. The register sender being told by the decoder marker that the terminating line circuit is connected sends the "ringing" call progress code sequence to the originating line circuit. The "ringing" call progress sequence comprises the preamble "CME" character, the 2-digit code designated ringing and the "ETB" character. Thereafter, the register sender sends the unblinding character UOD.

As previously described, the "CME" character causes the originating line circuit to become transparent to pass the call progess code sequence to the originating station. The "UOD" character is received by receive shift register 2112 in the receive circuit and monitored by code detection circuit 2403. The UOD detection gate, at this time, is enabled by the high potentials on leads OFRT and $\overline{TERM}$, the high potentials being applied to these leads at this time as previously described. Accordingly, upon the reception of the "UOD" character, the UOD code detection gate passes the BYC pulse to lead UOD and this pulse is passed through OR gate 2416 to the "reset" input of flip-flop 2415, whereupon this flip-flop is now "cleared." The reestablishment of the high potential on lead $\overline{SOA}$ due to the "clearing" of flip-flop 2415 enables TRA gate 2103 unblocking the output of transmit shift register 2102. The line circuit is now transparent to data signals from the originating subscriber to the switch.

The positive pulse applied to the UOD lead also is passed through OR gate 2524 to the "set" input of flip-flop 2511, whereby the flip-flop is again "set." The "setting" of the flip-flop again applies a high potential to gate 2509 whereupon, as previously described, the "CSA" character bits are applied in parallel to receive shift register 2112 and loaded therein by the BYC pulse. Accordingly, a sequence of "CSA" characters are forwarded to the originating subscriber. The originating line circuit is now maintained in this condition awaiting the answer of the terminating subscriber.

Assume now that the terminating station answers the call. As described hereinafter, the terminating line circuit generates an answer packet consisting of data-mode, all- 1 bit, bytes and a "cut-through" byte.

In the originating line circuit the all-1 -bit character is received by the receive shift register and monitored by the character detection circuit 2403. When eight successive bits are 1 bits, the ANS gate in the character detection circuit is enabled to pass the BYC pulse to lead ANS.

The pulse on lead ANS momentarily enables AND gate 2526 in the receive supervision circuit. Accordingly, the BYCT clock pulse is passed through the gate and applied to the "set" input of answer flywheel 2527. The answer flywheel is a count-of-2 circuit which is clocked by the pulse on lead $\overline{\text{NCLK}}$. Accordingly the $\overline{\text{NCLK}}$ pulse will set a 1 bit into the flywheel. In the event, however, that any succeeding byte of the next eight bytes is other than the all-1 -bit "ANS" character, the pulse does not appear on lead ANS, gate 2526 remains disabled, enabling gate 2528. The enabling of gate 2528 passes the BYCT pulse to the PC input of ANS flywheel 2527 to clear the flywheel.

Assume that the next eight bytes are all "ANS" code bytes. The answer flywheel is therefore not precleared and upon the generation of the next $\overline{\text{NCLK}}$ pulse, flywheel 2527 advances to the count of two. Output terminal ON of the flywheel thereupon goes high enabling AND gate 2531. If we now assume that the "ANS" bytes are followed by a "cut- through" byte, the reception of this "cut-through" byte is monitored by code detection circuit 2403 and the CTC gate is enabled to apply the BYC pulse to lead $\overline{\text{CTC}}$. This pulse is passed through gate 2531 and through OR gate 2532 to the J input of RCV flip-flop 2505. The trailing edge of the BYCT clock thereupon toggles the RCV flip-flop to the "set" condition. This passes a high potential to lead OFFR and passes a low potential to lead ONHR.

Assume now that the "ANS" characters are continuously received without the reception of the "cut-through" character. In this event gate 2531 is not enabled. Answer flywheel 2527, being satisfied, applies a high potential to AND gate 2529 and the gate passes the BYCT pulse derived from gate 2526 to the "set" input of flywheel 2530. The $\overline{\text{NCLK}}$ pulse thereupon advances the latter flywheel to the count of one. Thereafter, if any characters other than the "ANS" character is received, gate 2528 is enabled by the low output of gate 2526 and the BYCT clock preclears flywheels 2527 and 2530.

Assume that eight more "ANS" code characters are received. The next $\overline{\text{NCLK}}$ pulse advances flywheel 2530 to the count of two and the ON output goes high and this high potential is passed through OR gate 2532 to the J input of flip-flop 2505, whereupon the flip-flop is clocked to the "set" condition by the terminal edge of the BYCT clock as previously described.

A third condition which might occur, instead of the reception of the "cut-through" character or continued reception of the "ANS" code characters, comprises the reception of a string of data mode characters. When a data mode character is received, a high potential is applied to lead BIT8R by receive shift register 2122, since the eighth bit of every data mode character is a 1 bit. This high potential on lead BIT8R enables gate 2537 and the gate thereupon passes the BYCT clock pulse to the "set" input of 8-count flywheel 2537. Thereafter, if data mode characters are continuously being received, each $\overline{\text{NCLK}}$ pulse advances the flywheel count and, conversely, if any received character is other than a data mode character, the low potential of lead BIT8R is inversely applied to enable gate 2541 to pass the BYCT pulse to the preclear input of flywheel 2537 to "clear" the flywheel. Assuming, however, that eight successive packets of eight data mode bytes are received, the flywheel advances to the count of eight, applying a high potential to output ON which is passed through OR gate 2532 to the J input of the flip-flop 2505. Accordingly, under three conditions, the RCV flip-flop 2532 is "set." The first or normal condition is where the terminating line circuit sends the packet of "ANS" code characters followed by the "cut-through" character; the second condition is where a continuous stream of "ANS" code characters are received; and the third condition is where a continuous stream of data mode characters are received. In any one of these events a high potential is applied to the J input of flip-flop 2505 and the flip-flop is thereafter toggled to the "set" condition as previously described.

The high condition applied to lead OFFR by the "setting" of flip-flop 2505 partially enables NAND gate 2520. NAND gate 2520 is fully enabled by the high potential applied to lead OFHT by flip-flop 2610. Accordingly, gate 2520 applies a low condition to lead OFRT to disable the UOD and SO detection gates in code detection circuit 2403. In addition, the low potential on lead OFRT partially enables gate 2408 in anticipation of the termination of the call or the hang up by the subscriber as described hereinafter. The high potential on lead OFFR enables the REV detection gate of code detection circuit 2403 for purposes described hereinafter. The low potential provided to lead ONHR is inverted and applied via OR gate 2512 to the "reset" input of flip-flop 2511. The flip-flop is thereupon "reset," terminating the parallel loading of "CSA" characters into receive shift register 2112. The shift register is now transparent to incoming data characters received from the terminating line circuit by way of the switch and passes these characters on to the originating line subscriber. The originating line circuit is now transparent both ways permitting the originating subscriber to communicate with the terminating subscriber. Thus, assuming that the terminating line call set up sequences are completed as described hereinafter, the call is completed and the two subscribers can proceed to communicate with each other. At this time the line circuit is only monitoring for "on-hook" signals from either the terminating or originating subscriber.

Assume that the originator terminates the call by going "on-hook." When he goes "on-hook," he normally sends "idle" signals or alternately may send "not ready" signals. The "idle" or "not ready" characters are received by transmit shift register 2102 and monitored by code detection circuit 2201. The IDL code gate or the NR code gate, upon detecting the code character, applies a high potential to its output. This high potential is passed through OR gate 2204 to lead IDNRT as previously described. The characters are now counted by TRON flywheel 2602. Since flip-flop 2402 is presently "set," lead ENFT is high and gate 2604 is presently enabled. The $\overline{\text{NCLK}}$ pulse therefore clocks the flywheel which is therefore satisfied only when eight additional "idle" or "not ready" characters are received.

Assuming that flywheel 2602 is satisfied, gate 2611 is enabled, pulsing lead $\overline{OTRB}$. This toggles release monopulser 2608 to initiate the release cycle which restores the line circuit to the initial idle condition, as previously described.

In the event that the terminating line subscriber goes back "on-hook," the terminating line circuit sends "idle" characters, "NUL" characters or "not ready" characters or a combination thereof to the originating line circuit by way of the switch. The incoming code characters are monitored by code detection circuit 2403 in the receive code detection circuit. As previously described, the reception of the NUL, "idle" or "not ready" characters enables the NUL gate or the IDNR gate. The enabled one of the gates passes the BYC pulse to its output and this pulse is passed through OR gate 2405 and inverter 2412 to lead GIDL and applied to gate 2408. Gate 2408, enabled by the low potential, monitored on lead OFRT applied by gate 2520, passes the pulse to lead GANS to pass a 1 bit to the eighth stage of receive shift register 2112. Stages 2 through 7, at this time, all have 1 bits applied to them as previously described. Accordingly, an all-1 bit ANS code character is applied to shift register 2112.

The high potential on lead GIDL now enables gate 2507 via OR gate 2506, as previously described. Accordingly, the all-1 bit ANS code character is loaded into the receive shift register and sent on to the originating subscriber. These "ANS" code characters will be continued to be sent to the line subscriber until the line circuit goes through its release function and returns to its initial idle condition.

The pulse on lead GIDL is also passed to the "set" input of RECON flywheel 2502. Accordingly, as previously described, if eight additional "NUL" or "idle" code characters are received, the flywheel is satisfied and partially enables gate 2504 which is fully enabled by flip-flop 2505 passing a high potential through OR gate 2552. In addition, flywheel 2502 applies a high potential to the K input of flip-flop 2505. The next BYCT clock 2522. now passes through gate 2504 to lead $\overline{PSRL}$ to fire release monopulser 2608. The release sequence is thereby initiated to return the line circuit to the idle condition. The BYCT clock pulse also clocks flip-flop 2505 back to the "clear" condition.

With the line circuit back in the idle condition, "idle" characters are sent to the subscriber who presumably hangs up, sending IDL characters to the line circuit. This is detected by code detection gates 2201 and, with the line circuit restored to idle, the detection of the "idle" characters disables gate 2103 and NUL characters are thereby sent to the switch.

When the line circuit is the terminating line circuit (being called by another subscriber), it can be in one of three conditions; namely, the "busy" condition, wherein the subscriber is involved in another call; the "not ready" condition, wherein the subscriber has decided to withdraw from any switch connections without appearing "busy"; and the "idle" condition.

Assume now that, when the subscriber is called, he is involved in a prior call. Under this situation, relay 21-L1 in his line circuit is operated, as previously described. This opens the path to the link and connector circuit by way of lead BT. The opening of lead BT advises the marker circuit that the line circuit is busy as described in detail in the Jaeger et al patent. Under this situation, the marker circuit does not attempt to connect the line circuit and the call to the subscriber is not completed.

If the subscriber is idle and the line circuit is in the idle condition, "NUL"characters are being transmitted to the switch by the line circuit and "idle" characters are being transmitted to the subscriber. In the idle condition, relay 21-L1 is released completing the path from the link and connector circuit through lead BT, break contacts of relay 21-SL, the core of relay 21-MC and break contacts of relay 26-NRDR to negative battery. Accordingly, when the line circuit is called, the marker circuit finds this path closed indicating that the line circuit is idle. The marker circuit thereupon momentarily applies driving ground to the lead momentarily operating relay 21-MC. Relay 21-MC operates in turn relay 21-MC1 and relay 21-MC1 applies ground to lead MCLK, which lead corresponds to the similarly identified lead in FIG. 4 of the Jaeger et al patent, indicating to the marker that it has connected to a line circuit (as opposed to a trunk circuit). The marker circuit now connects the register sender to this terminating line circuit by way of the link and connector circuit and grounds lead S by way of the link and connector circuit and withdraws. The ground on lead S operates relay 21-SL which in turn passes ground back to lead HMH to provide locking ground for the hold magnets in the switch.

As described in detail hereinafter, the register sender initially monitors the codes being generated by the line circuit. We have assumed that the line circuit is idle and therefore sending the "NUL" code characters to the switch. The register sender upon reading the "NUL" characters sends "BEL" characters back to this terminating line circuit by way of the link and connector circuit.

The "BEL" character is received from the switch by receive shift register 2112, as previously described. The character is received and monitored by code detection circuit 2403. At this time the BEL detection gate in code detection circuit 2403 is enabled by the low potential on lead OFHT, this potential being low at this time since TRMT flip-flop 2610 is "cleared" and the lead is connected to the 1 output of the flip-flop. Accordingly, the BEL detection gate being enabled and detecting the "BEL" character in receive shift register 2112, passes the BYC pulse to lead BEL.

Lead BEL extends to AND gate 2533 in the receive supervision circuit. Since the other input to the gate is connected, inverted, to lead OFHT, the low potential on this latter lead enables gate 2533 and the gate in turn passes the pulse on lead BEL to the "set" input of the BEL character flywheel 2534. This pulse is also applied to the preclear input, inverted, of the BEL character flywheel.

The BEL character flywheel comprises a count-of-2 counter, clocked by the BYCT clock pulse. Accordingly, a count of 1 is clocked into the flywheel and, in the event that the next successive character is also a BEL character, the counter is advanced to the count of two. At this count the ON output of BEL character flywheel 2534 goes high. This high condition is passed through OR gate 2532 to the J input of RCV flip-flop 2505. The terminating portion of the BYCT clock pulse thereupon toggles flip-flop 2505 to the "set" condition placing the line circuit "off-hook" to the switch.

The high potential of the ON output of flywheel 2534 also enables AND gate 2540 in the receive code generation circuit. Gate 2540 thereupon passes the pulse on lead BEL to the "set" input of GEN BEL flip-flop 2513, placing the flip-flop in the "set" condition. In the "set" condition the flip-flop applies a high potential to OR gate 2509. At the same time the "setting" of flip-flop 2513 provides a low condition, at its 0 output terminal, which low condition is inverted, and applied to OR gate 2515. As previously described, the application of these potentials to gates 2509 and 2515 applies the character "CME" to receive shift register 2112 and loads the character into the shift register to overwrite the BEL character. The character "CME" thus is overwritten into the receive shift register and sent to the line subscriber to advise the subscriber that he is being rung.

Return now to the "setting" of flip-flop 2505. As previously described, flip-flop 2505 now "sets" LINE REG flip-flop 2601 and this in turn applies a high condition to lead OFH to enable TRA gate 2103 and operates relay 26-L. The setting of flip-flop 2505 and the consequent low condition on lead ONHR also disables gate 2616 and enables gate 2628. The disabling of gate 2616 precludes the previously described counting of data mode characters received from the line subscriber and enables, as described in detail hereinafter, the counting of "ANS" characters from the line subscriber. The low potential on lead ONHR is also inverted and passed through OR gate 2411 to the "set" input of CSA flip-flop, setting the flip-flop, and with the flip-flop "set," as previously described, gate 2604 is enabled and gate 2605 is disabled and TRON flywheel 2602 goes from the quick count mode to the slow count mode. The "setting" of flip-flop 2505 also partially enables NAND gate 2504 via OR gate 2522, as previously described, to provide for monitoring whether or not the register sender releases. Finally, the high potential on lead OFFR provided by the "setting" of flip-flop 2505 together with the normally low potential on lead $\overline{\text{TERM}}$, inverted by inverter 2418, enables the "REV" character detection gate in code detection circuit 2403.

The operation of the relay 26-L operates relay 21-L1. The operation of relay 26-L1 provides the previously described busy detection to the switch by way of lead BT. Accordingly, the "setting" of flip-flop 2505 has taken the receive portion of the line circuit "off-hook."

After sending the "BEL" character, the register sender sends the "ringing" call progress code sequence to the originating line circuit and follows by sending the "unblind" characters (UOD) to the originating line circuit and the "reversing" characters (REV) to the terminating line circuit. The "REV" characters are received by receive shift register 2112 and monitored by the code detection circuit 2403. At this time the REV code detection gate is enabled, as previously described. The detection of the "REV" code character thereupon passes the BYC pulse to the D input of byte delay flip-flop 2420. The BYC clock pulse which normally clears the flip-flop when a low condition is applied to input terminal D now "sets" the flip-flop applying a high pottential to the J input of REV flipflop 2401. This flip-flop is thereupon "set" by the next successive BYC clock pulse applying a high potential to lead REV and a low potential to lead $\overline{\text{REVA}}$.

The low potential applied to lead $\overline{\text{REVA}}$ enables gates 2105 and 2109 and disables gates 2104 and 2110. This reverses the interconnection with the switch, connecting the output of transmit shift register 2102 through gate 2103, gate 2105, and driver 2120 to leads RT and RR and connecting leads TT and TR to receive shift register 2112 by way of terminator 2121, gate 2109, and gate 2111. As described in the R. J. Jaeger et al patent, the reversing of the connections directly connects the transmit side of the originating line circuit to the receive side of the terminating line circuit and connects the transmit side of the terminating line circuit to the receive side of originating line circuit.

The high potential on lead REV is passed to AND gate 2210. AND gate 2210 is enabled by the high potential on lead OFH provided by the setting of flip-flop 2601 and the low potential, inverted, on lead OFHT provided by TRMT REG 2601 which initially is in the "clear" condition, as previously described. Accordingly, gate 2210 is fully enabled passing a high condition to the "CSA" input terminal of code generation gates 2207. The parallel bits of the "CSA" code character are thereby provided by code generation gates 2207 and applied to the various stages of the transmit shift register by cable BYTE PATTERN G. At the same time the high condition output of gate 2210 is passed through OR gate 2208 to enable one input of AND gate 2209. The BYC pulse is thereupon passed through the enabled gate 2209 and lead BYC4C to the CLP input of transmit shift register 2102 to load the "CSA" character into the transmit shift register to overwrite the character in the shift register and the "CSA" character is thereupon shifted out to the switch.

When the called party answers, he initially sends the all-1 bit "ANS" code. This code is received by transmit shift register 2102 and monitored by code detection circuit 2201. The detection of the "ANS" code character enables the ANS code detection gate, passing the BYCT pulse to lead ANST The BYCT pulse applied by the ANS code detection gate to lead ANST passes through gate 2628, previously enabled by the low condition of lead ONHR and through OR gate 2617 to this "set" input of TROFF flywheel 2618. The flywheel thereupon monitors for the successive reception of "ANS" code characters in the same manner as the flywheel previously monitored for data mode characters when the line circuit was an originating line circuit. Therefore, assuming that eight additional "ANS" code characters are received, the flywheel is satisfied and the output goes high partially enabling AND gate 2620 and passing a high potential to lead INA. The high potential on lead INA disables gate 2210 to stop loading the "CSA" codes in shift register 2102.

The high potential on lead INA together with the previously described high potential on lead REV enables AND gate 2211. This passes a high condition to the J input of flip-flop 2212 and the flip-flop is toggled to the "set" condition by the NCLK pulse. At this time the high potential on lead INA, together with the high potential derived from the 0 output of count 2 counter 2213 in its initial "clear" condition, enables AND gate 2214. Gate 2214 passes a high condition to the "ANS" input terminal of code generation gate 2207 and passes a high condition through OR gate 2208 to enable the BYC pulse to load the ANS code into the transmit shift register; the application of the high potential to the "ANS" input terminal having resulted in the generation of the parallel bits of the ANS code. The ANS code is thereupon shifted out through gate 2103 and gate 2105 and on to leads RT and RR to be forwarded to the originating register.

During the generation of the answer code packets, the input "set" terminal of counter 2213 is maintained high by the setting of flip-flop 2212 and as a consequence, a 1 bit is shifted therein by the NCLK pulse and after eight additional "ANS" code characters are transmitted a second bit is shifted in to advance the counter to the count of two. The 1 output of counter 2212 thereupon goes high applying a high potential to lead $\overline{2NG}$ and the 0 terminal goes low disabling gate 2214 and thus terminating the loading of the ANS code in the transmit shift register.

The high potential on lead $\overline{2NG}$ is applied to the "set" input of one byte generator monopulser 2216. The monopulser is thereupon fired by the BYC pulse, operating for one byte interval and, during this interval, providing a high potential to its 1 output. This high potential is passed to the "CTC" terminal of code detection gates 2207 and is passed through OR gate 2208 to enable gate 2209. The code generation gates accordingly apply the bits of the code character "CTC" to the various stages of transmit shift register 2102 and the BYC clock pulse is passed through the enabled load gate 2209 to load the character into the various stages permitting the "CTC" (cut-through) character to be sent on to the originating register.

The high potential on lead $\overline{2NG}$ is passed through OR gate 2621 to the "set" input of TRMT flip-flop 2610 and the flip-flop is toggled to the "set" condition by the BYCT clock pulse. The setting of the TRMT flip-flop raises the potential on lead OFHT resetting GEN BEL flip-flop 2513 to cancel the generation and transmission of the "CME" characters to the line subscriber. In addition, the high potential on lead OFHT enables NAND gate 2520. The enabled NAND gate thereby applies a low potential to lead OFRT to disable the UOD and SO code detection gates in code detection circuit 2403 (since the line circuit is going into the "transparent mode," and the positive detection, in error, of these codes would overwrite the date being interchanged). In addition, the low potential on lead OFRT disables gate 2406 and partially enables gate 2408. The disabling of gate 2406 now precludes overwriting of the characters received by receive shift register 2112.

At this time if an "idle," "not ready" or "NUL" is received from the originator or the switch, the output of the NUL or IDNR code detection gates of code detecting gates 2403 goes high and this high condition is passed through OR gate 2405 to lead GIDL. The high condition, twice inverted, also fully enables gate 2408. The enabling of gate 2408 applies a high potential to lead GANS which high potential is passed to the eighth stage of the receive shift register. Accordingly, in the event that an "idle," "not ready" or "NUL" code is detected, the high potential on lead GIDL passes through gate 2506 to initiate the parallel load into the receive shift register as previously described, and an all 1 bit code is overwritten into the received shift register and sent on to the line subscriber. Thus, the line circuit precludes the retransmission of the various "control mode" bytes to the line subscriber until it has had an opportunity to act upon these bytes, converting these bytes to data mode byte which presumably the line subscriber will not react to.

At this point the originating line circuit having received the answer packet has become transparent. The originating subscriber having received data mode characters initiates transmission. The terminating line circuit having become transparent, as previously described, interconnects the originating subscriber with the terminating subscriber and the two subscribers now communicate with each other.

Termination of the call is provided by either party hanging up. If the terminating subscriber hangs up, "idle" characters are received by the transmit shift register and detected by the IDL code detection gate in code detection circuit 2201, as previously described. The potential on lead INDRT goes high, whereupon the "idle" code characters are counted by TRON flywheel 2602. When the flywheel is satisfied (by nine characters or more), PLS gate 2611 is enabled, as previously described, and a BYCT clock pulse is passed to pulse release monopulser 2608 to initiate the release sequence in the terminating line circuit, in the same manner as previously described, and the line circuit accordingly returns to the initial idle condition.

In the event that the originating subscriber hangs up, "idle" or "NUL" characters are received from the switch and passed on to the received shift register and detected by the IDNR code detection gate in code detection circuit 2403. This raises the potential on lead GIDL, as previously described, to start the operation of RECON flywheel 2502. Assuming nine or more "idle" (or "NUL" or "not ready") characters are received, the flywheel is satisfied enabling gate 2504. A BYCT clock pulse is thereby applied to the $\overline{PSRL}$ lead operating release monopulser 2608 and restoring the line circuit to the initial idle condition.

Assume now that the terminating line is in the "not ready" mode. It is recalled that when the line circuit is in the "not ready" mode, the line circuit appears idle to the marker. However, gate 1203 is enabled at this time, as previously described, and the "not ready" code is being transmitted from the subscriber through the transmit shift register and gate 2104 to the link and connector circuit. Since the line circuit appears idle, the marker terminates the call in the usual manner by operating relay 21-MC and assigns the line circuit to a link, operating relay 21-SL in the same manner as the connection is made to an idle terminating line circuit. When the register sender is connected to the link and connector circuit, it will receive the "not ready" codes from the terminating line circuit. It will thereupon send the "not ready" cell progress code to the originating line circuit, as previously described, and drop off. "NUL" characters will thereupon return to the originating line circuit. Thereafter, the originating line circuit drops off the connection and operating ground is removed from relay 21-SL. The relay thereupon releases and the terminating line circuit returns to its initial "not ready" mode.

Figure 23:
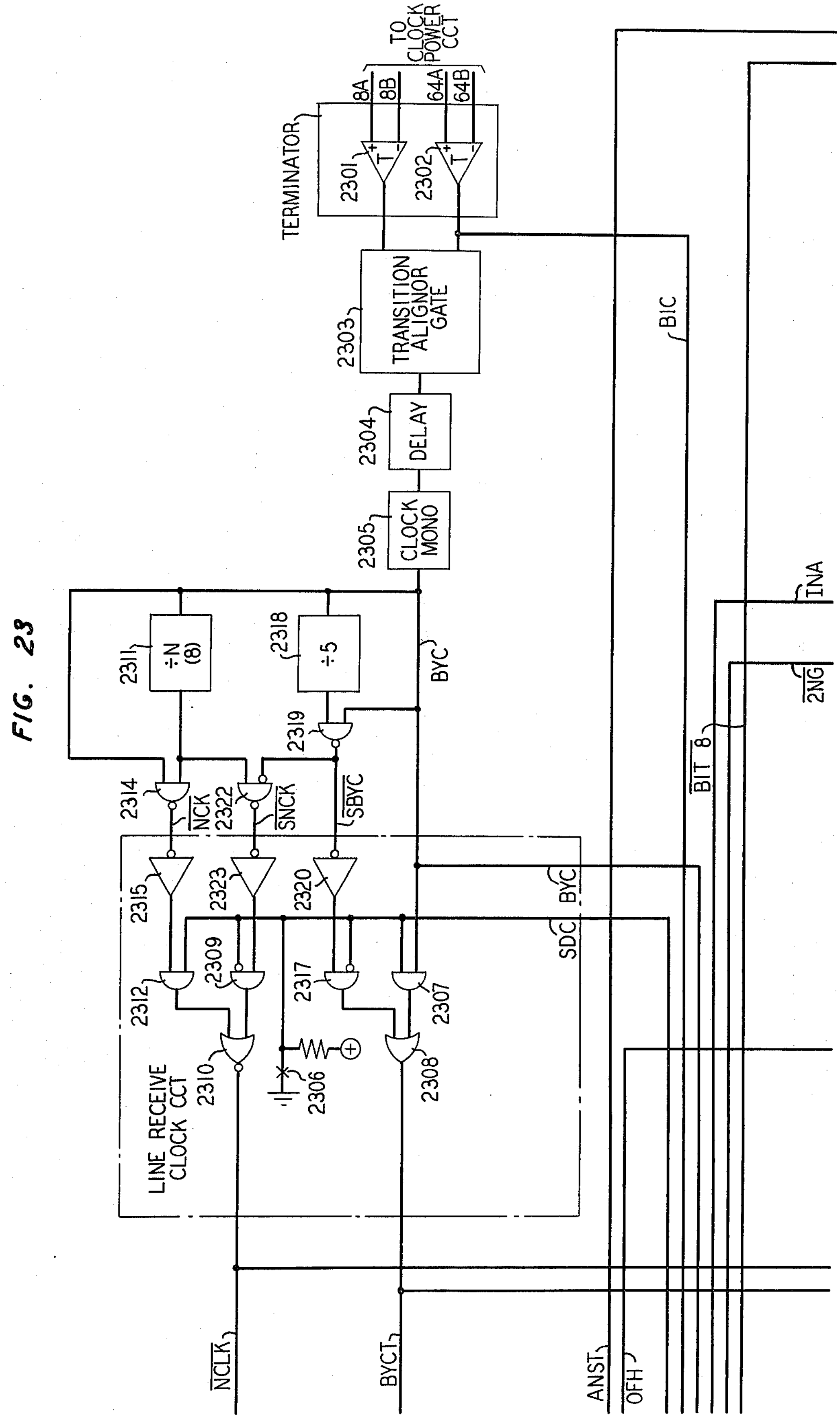

The clock distribution circuit for distributing the various clock pulses in the line circuit previously described is shown in FIG. 23. The bit clock pulse is obtained from the office bit clock which, as described, in the A.C. Carney et al patent is a 64 kilohertz clock. This clock is applied across leads 64A and 64B and passed to terminator 2302, which converts the clock signals from bipolar to binary and passes the binary clock signals to lead BIC. The office byte clock, which is disclosed in the A. C. Carney et al patent as an 8 kilohertz office clock, is applied across leads 8A and 8B and passed to terminator 2301, which converts the bipolar clock pulses to binary pulses. The outputs of terminators 2301 and 2302 are passed to transition alignor gate 2303. Transition alignor gate 2303 aligns the byte clock output of terminator 2301 with the bit clock output of terminator 2302 and the transitions of the byte clock pulse thus aligned is delayed by delay circuit 2304 and the delayed transitions fire clock monopulser 2305. The monopulser output therefore comprises byte clock pulses delayed with respect to the 8 kilohertz office byte clock signal. The output of monopulser 2305 is passed to lead BYC for distribution throughout the line circuit.

If the line circuit is serving a high-rate subscriber, switch 2306 is unoperated and a high potential is passed to lead SDC. This high potential enables gates 2307 and 2312 and disables gates 2309 and 2317. The BYC pulse is thereupon passed through gate 2307 and OR gate 2308 to lead BYCT. The BYCT thereupon corresponds to the BYC pulse for high-rate subscribers.

The BYC pulse is also applied to 8 circuit 2311. The coincidence of the output of divider circuit 2311 and the byte clock pulse on lead BYCT is passed by gate 2314 through inverter 2315, gate 2312 and NOR gate 2310 to lead $\overline{\text{NCLK}}$. Accordingly, for high-rate subscribers, the $\overline{\text{NCLK}}$ clock pulse comprises 1-out-of-8 of the BYC byte clock pulses.

If the line circuit is connected to a subrate subscriber, switch contact 2306 is operated and ground is applied therethrough to disable gates 2307 and 2312 and enable gates 2309 and 2317. The BYC pulse is also applied to 5 circuit 2318 and the coincidence of the output of this circuit together with the BYC pulse is passed through gate 2319, inverter 2320, gate 2317 and OR gate 2308 to lead BYCT. Accordingly, for subrate subscribers the BYCT pulse constitutes 1-out-of-5 of the BYC byte clock pulses.

The output of gate 2319 is also applied to gate 2322 and this gate passes the coincidence of the gate 2319 output and the 8 circuit 2311 output passing this coincident output through inverter 2323, gate 2309 and NOR gate 2310 to lead $\overline{\text{NCLK}}$. Accordingly, for subrate subscribers, the $\overline{\text{NCLK}}$ clock pulse constitutes 1-out-of-40 of the BYC byte clock pulses or 1-out-of-5 of the pulses applied to lead $\overline{\text{NCLK}}$ when the line circuit is attached to a high-rate subscriber.

Trunk Circuit

As previously described, each trunk circuit, such as trunk circuit 111, provides an intercommunication path between the link and connector circuit 157 and a trunk line, such as trunk line 143. Initially, in the idle condition, the trunk circuit is receiving "NUL" characters from link and connector circuit 157 and is receiving "Idle" characters from trunk line 143. In the event, however, that there is a failure of the trunk line, such as a break in the line, no signaling will be received, simulating the reception of "NUL" characters from the trunk line.

Figure 27:
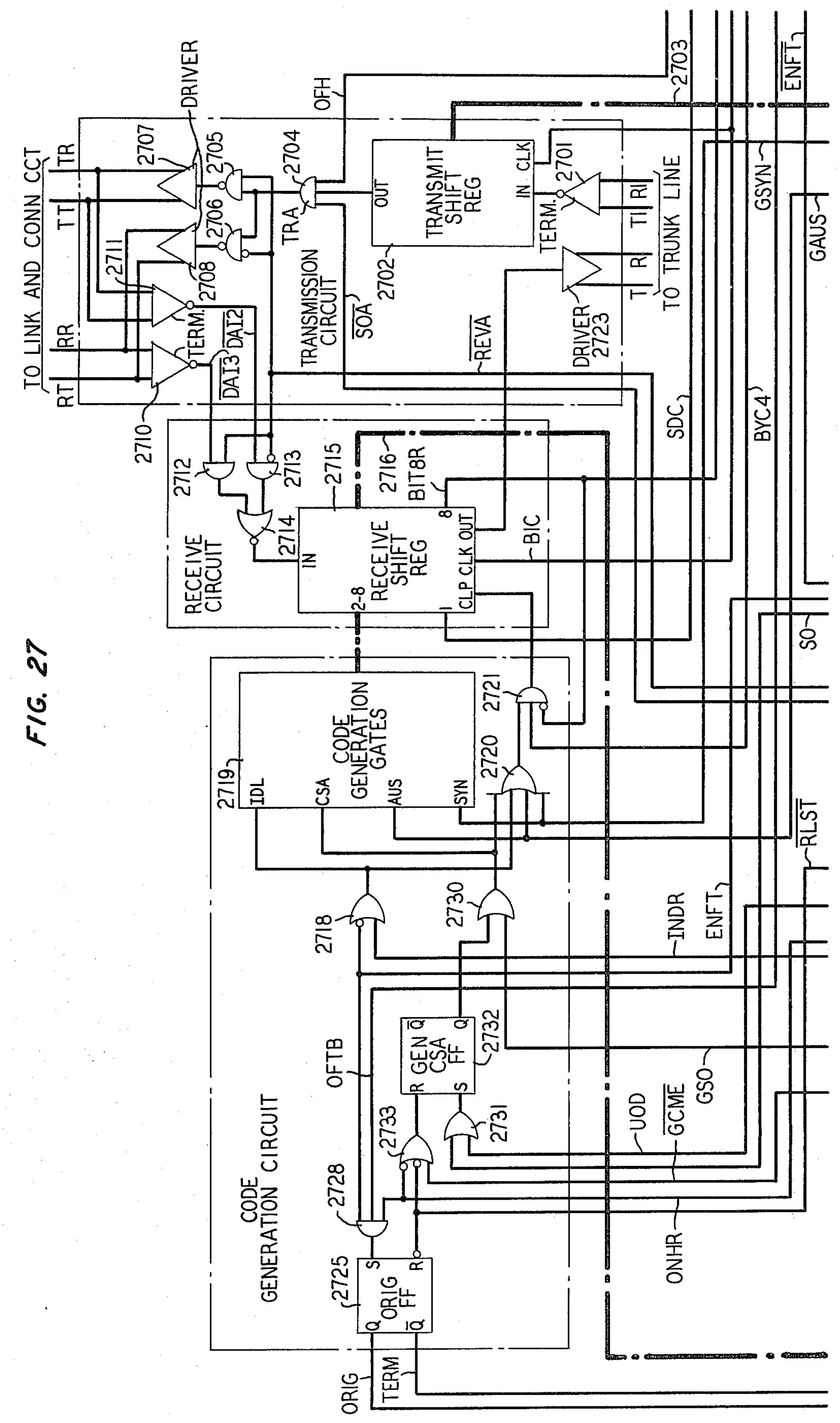
FIGS. 27 through 30, when arranged as shown in FIG. 3, show in schematic form the various circuits which form a digital trunk interface circuit which comprises part of the central office switching facility.
Figure 29:
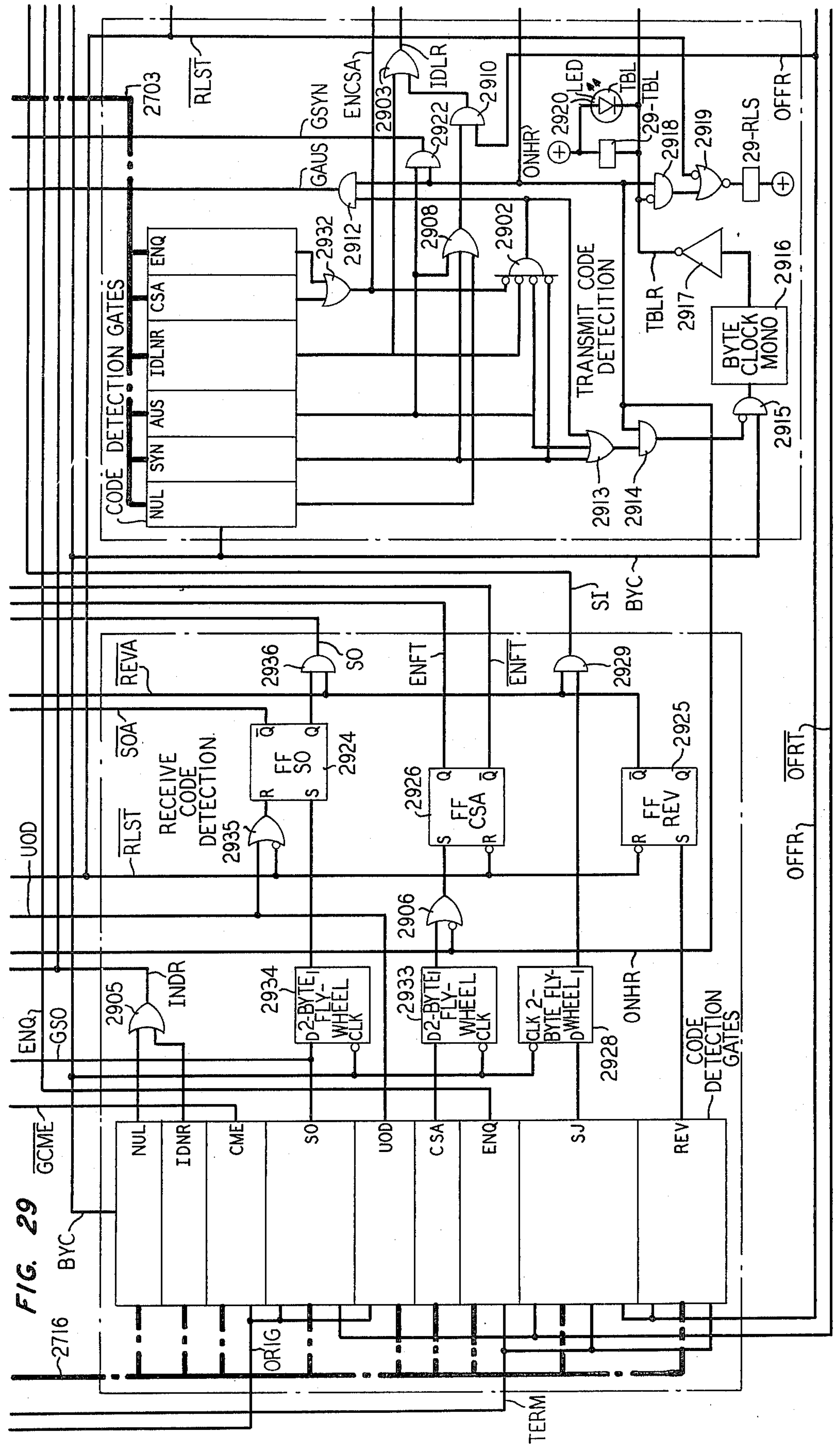

In the initial idle condition all of the relays in the trunk circuit are in the released condition. The "idle" characters normally received from the trunk line are applied across leads T1 and R1 (FIG. 27) and are converted from bipolar to binary by terminator circuit 2701 and passed to transmit shift register 2702. The bits of the incoming code characters received by transmit shift register 2702 are shifted through the several stages of the shift register by the BIC clock pulse which, as described hereinafter, has a repetition rate of 64 kbs. The outputs of the several stages are passed, in parallel, to cable lead 2703 which extends to detection gates including the IDLNR code detection gate in the transmit code detection circuit (FIG. 29). The IDLNR gate is enabled by the incoming "idle" character and passes the BYC clock pulse through its output terminal to disable the AND gate 2902. The pulse also passes through OR gate 2903 to lead IDLR.

Lead IDLR is connected to the "set" input of TRON flywheel 3001 which is a count-of-2 counter flywheel. The flywheel is clocked by the $\overline{\text{NCLK}}$ clock pulse connected to input terminal CLK and can be cleared at any time by the application of a pulse to input terminal PC. Input terminal PC is connected to the output of preclear gate 3002 which is controlled by the coincidence of the BYC clock pulse and the condition on lead IDLR, inverted. As described hereinafter, the BYC pulse occurs at the end of each character byte. Accordingly, TRON flywheel 3001 is cleared in the event that the BYC pulse is applied to preclear gate 3002 and a pulse does not appear on lead IDLR to indicate the failure to detect an incoming "Idle" (or not ready) character.

As described hereinafter, the $\overline{\text{NCLK}}$ pulse is provided for one-out-of-eight bytes for high-rate subscribers and one-out-of-forty bytes (one-out-of-five for every eight bytes) for subrate subscribers. Accordingly, assuming that the "Idle" character is being repeatedly received from the trunk line, the $\overline{\text{NCLK}}$ clock pulse advances the flywheel to the count of one and then, eight bytes later, advances the flywheel to the count of two.

TRON flywheel 3001 upon being advanced to the count of two applies a positive condition to its 1 output terminal. The positive output condition of TRON flywheel 3001 partially enables AND gate 3003 and is also passed through OR gate 3004 to partially enable AND gate 3005 in the receive supervision circuit.

In the idle trunk circuit condition, TRK flip flip 3012 is in the "clear" condition, having been placed in this condition by the termination of the prior call. This applies a low condition to lead OFH. Lead OFH is connected to TRA gate 2704 and this AND gate is disabled by the low condition. The serial output of transmit shift register 2702 is blocked by the disabled gate which passes a low condition to gates 2705 and 2706. AND gate 2705 is enabled and AND gate 2706 is disabled by a high condition applied to lead $\overline{\text{REVA}}$, as described hereinafter, passing the output of gate 2704 to driver 2707. Since the steady low output of gate 2704 simulates "NUL" characters, driver 2707 applies "NUL" characters across leads TT and TR, sending the "NUL" characters to the link and connector circuit.

At this time the trunk circuit is also receiving "NUL" characters from the link and connector circuit by way of leads RT and RR. The "NUL" characters are passed to terminator 2710 which converts the bipolar signals to binary signals and applies the binary signals via lead $\overline{\text{DAI3}}$ to AND gate 2712 in the receive circuit. In this initial idle trunk circuit condition, lead $\overline{\text{REVA}}$ is in the high condition, as described hereinafter, enabling AND gate 2712. The enabled AND gate 2712 thereby passes the "NUL" characters on lead $\overline{\text{DAI3}}$ through NOR gate 2714 to receive shift register 2715. The "NUL" characters are then shifted through the stages of shift register 2715 by the BIC clock pulse.

The bits of the incoming characters received by receive shift register 2715 passed from the several stages of the shift register to parallel leads in cable 2716 to various code detection gates in the receive code detection circuit (FIG. 29). The incoming "NUL" character enables the NUL code detection gate and the enabled gate passes the BYC clock pulse through OR gate 2905 to lead INDR. The pulse on lead INDR is passed through OR gate 2718 in the code generation circuit (FIG. 27) to input terminal IDL of code generation gates 2719 and to OR gate 2720. At the same time a low condition is applied to lead ENFT by CSA flip-flop 2926 (FIG. 29) which was "cleared" at the termination of the previous call, as described hereinafter. This low condition, inverted, is applied to OR gate 2718, to apply a high condition to input terminal IDL of code generation gates 2719 and to OR gate 2720. The application of either one of these high conditions to input terminal IDL enables code generation gates 2719 to apply a permutation of bits to its output leads, which leads extend to the inputs of stages two through eight of receive shift register 2715 and which permutation of bits correspond to bits two through eight of the "Idle" code character. The first stage input of receive shift register 2715 is connected to lead SDC, which as described hereinafter, is normally high for high-rate subscriber trunk circuits and low for subrate subscriber trunk circuits. the "Idle" character, appropriate for full-rate or subrate subscribers, is there applied, in parallel, to the inputs of the several stages of receive shift register 2715.

A high condition applied to OR gate 2720 is passed therethrough to partially enable AND gate 2721. Another input of gate 2721 is connected to lead BIT 8R which extends from the eighth stage output of register 2715. BIT 8R reads a 1 bit from the stage when a data mode character is received from the link and a 0 bit when a control mode character is received. The "NUL" character being received is a control mode character and the 0 bit on lead BIT 8R, inverted, fully enables gate 2721. The BYC4 clock pulse is thereupon passed through gate 2721 to parallel load the "Idle" code character into receive shift register 2715. The "NUL" character being received by the receive shift register is thereby overwritten with the "Idle" character. The BIC clock pulse applied to the CLK input of receive shift register 2715 now clocks the "Idle" character out to driver circuit 2723, which converts the bits to bipolar pulses and passes the character over leads T and R to the trunk line.

The pulse on lead INDR is also passed to the "set" input of RECON flywheel 3007. RECON flywheel 3007 is a count-of-2 counter flywheel which is advanced by the $\overline{\text{NCLK}}$ clock pulse and is "cleared" by a pulse applied to input terminal PC. Input terminal PC, in turn, is connected to the output of preclear gate 3008 which is disabled upon the application of the positive pulse to lead INDR. In the event, however, that any code character other than the "Idle" (or "not ready") character is received, the pulse does not appear on lead INDR, preclear gate 3008 is enabled and passes the BYC clock pulse to "clear" RECON flywheel 3007.

Assume now that the "NUL" characters are continuously received from the link and connector circuit. In this event, lead INDR is repetitively pulsed to disable preclear gate 3008 and to preclude the "clearing" of the RECON flywheel. The $\overline{\text{NCLK}}$ clock pulse inserts a 1 bit into the RECON flywheel in response to the pulse on lead INDR and eight bytes later (or 40 bytes later for subrate subscriber trunk circuits) the NCLK clock pulse further advances the RECON flywheel to the count of two. The 1 output of RECON flywheel 3007 thereupon goes high and this high condition partially enables output AND gate 3005 and is passed through OR gate 3010 to lead ONRD, which lead extends to the other input of AND gate 3003 in the transmit supervision circuit.

The high potential on lead ONRD now fully enables AND gate 3003 in the transmit supervision circuit. The enabling of AND gate 3003 assures that TRMT flip-flop 3006 is "cleared." The enabling of AND gate 3005 in the receive supervision circuit by the high condition provided by TRON flywheel 3001 via OR gate 3004 and the high condition output of RECON flywheel 3007 assures the "clearance" of RCV flip-flop 3022 in the receive supervision circuit. The "clearing" of TRMT and RCV flip-flops 3006 and 3022 designate that the transmit circuit and the receive circuit are "on-hook."

As previously noted, all relays in the trunk circuit are released when the circuit is in the idle condition. In the relay control circuit (FIG. 28), ground is passed by way of break contacts of relays 29-TBL, 28-L1 and 28-SL to lead IL, which lead is correspondingly identified in FIG. 10 of the R. J. Jaegar, Jr. et al patent. This ground which extends to the decoder circuit indicates that one or more trunks in the trunk group of this trunk circuit is idle to enable hunting operation, as described in detail in the R. J. Jaeger Jr. et al patent. Negative battery is also applied through break contacts of relay 29-RLS, the core of relay 28-MC and break contacts of relays 28-SL and 28-L1 to lead BT, which extends by way of the link and connector circuit to the marker circuit (lead BT corresponding to lead BT16 in FIG. 10 of the R. J. Jaeger, Jr. et al patent). This indicates to the marker circuit, when connected thereto, that the trunk circuit is idle as described in the Jaeger et al patent.

Assume now that the trunk line has a failure condition such as an open line. In this event "NUL" characters are received from the trunk line, inserted in receive shift register 2715 and detected by the code detection gates in the transmit code detection circuit. The NUL code detection gate is now enabled to pass the BYC clock pulse through OR gate 2908 to partially enable AND gate 2910. The other input lead to AND gate 2910 is connected to lead OFFR. Lead OFFR is connected to the 1 output of RCV flip-flop 3022. The flip-flop is presently in the "clear" condition, as previously described, and gae 2910 is now blocked.

Since none of the characters (other than the "NUL" character) detectable by the code detection gates is being received, all input leads to AND gate 2902 and low and these low conditions, inverted, enable AND gate 2902 which applies a high condition to AND gate 2912 and also applies a high condition through OR gate 2913. The high condition through OR gate 2913 is applied to AND gate 2914. The other input to AND gate 2914 is connected to lead ONHR. Lead ONHR is connected to the 0 output of RCV flip-flop 3022. Since this flip-flop is in the "clear" condition with the receive supervision circuit "off-hook" the 0 output is high and the ONHR lead is therefore high. This high condition enables AND gate 2914 and AND gate 2912. And gate 2914 thereupon passes the high condition output of OR gate 2913 to disable AND gate 2915 which passes a low condition to byte clock monopulser 2916.

Under normal conditions, when "Idle" characters are being received, for example, the output of gate 2902 is low and the output of gate 2914 is also low and the low condition, inverted, enables AND gate 2915. AND gate 2915 thereupon passes the BYC clock pulse to operate byte clock monopulser 2916. The timing period of the monopulser is greater than the byte clock interval and, as a consequence, the monopulser is maintained operated providing the BYC pulse is provided thereto. In the event of trouble, however, (such as an open trunk line), AND gate 2915 is disabled, the BYC clock pulse is blocked and byte clock monpulser 2916 times out. Its output condition thereupon rises and this high condition is inverted by inverter 2917 to provide a low condition to lead TBLR.

The low condition on lead TBLR lights TBL light emitting diode 2920 to indicate a trouble condition and provides current through relay 29-TBL. The operation of relay 29-TBL opens the previously described ground path to lead IL and extends ground to TBL lamp 2824 to display the trouble condition. The low condition, inverted, on lead TBLR also enables AND gate 2918. AND gate 2918 is fully enabled by the high condition on lead ONHR and the enabled gate applies a high condition to the NOR gate 2919. The consequent low output condition of the NOR gate 2919 operates relay 29-RLS. Relay 29-RLS, operated, removes the battery from lead BT so that the trunk no longer appears idle. Finally, the low condition on lead TBLR is passed, inverted, through OR gate 3016 to insure that TRK flip-flop 3012 is "clear."

The enabling of AND gate 2912 passes a high condition to lead GAUS. Lead GAUS extends to the AUS input terminal of code generation gates 2719 in the code generation circuit and, in addition, extends to OR gate 2720. As previously described, the application of a high condition to OR gate 2720 enables parallel load gate 2721. The application of the high condition to the AUS input terminal of code generation gates 2719 generates the several bits of the "AUS" (unassigned) character and these bits are applied in parallel to the stages of receive shift register 2715. The BYC4 clock pulse is now passed through load gate 2721 to load the several bits in parallel into the several stages of receive shaft register 2715 and the BIC clock pulse clocks the character out to the trunk line.

The trunk at the other end now receives the "AUS" character which is detected by the AUD code detection gate in the transmit code detection circuit. The enabling of the AUS code detection gate passes the BYC clock pulse therethrough to disable AND gate 2902. At the same time the pulse is passed to AND gate 2922. AND gate 2922 is enabled at this time by the high potential on lead ONHR. The pulse is thereby passed through to lead GSYN.

The BYC pulse passed through the AUS code detection gate is also passed through OR gate 2913 to AND gate 2914. AND gate 2914, as previously described, is enabled by the high potential on lead ONHR and the consequent high potential output of AND gate 2914, inverted, disables AND gate 2915 at the time that the BYC clock pulse is applied thereto. As previously described, the blocking of the BYC pulse enables byte clock monopulser 2916 to time out thereby raising the previously described trouble condition which lights TBL light emitting diode 2920, operates relay 29-TBL and applies a low condition to lead TBLR to operate relay 29-RLS. Accordingly, the trouble condition is raised and the trunk is busied out in the same manner as these conditions were prepared for the other trunk.

The positive pulse applied to lead GSYN is applied to OR gate 2720 and to the SYN input terminals of code generation gates 2719 in the code generation circuit. Accordingly, the "SYN" character is overwritten into receive shift register 2715 and sent to the trunk line and on to the other trunk circuit.

Assume now that a subscriber is calling a subscriber in another office. When the address digits are sent by the subscriber to the register sender and then passed on to the marker decoder, the marker decoder determines that an outgoing trunk circuit is required. If the outgoing trunk circuit is in a hunting group, ground is applied to lead IL by the trunk circuit when it is idle. Furthermore, as previously described, the idle outgoing trunk circuit applies negative battery to lead BT. As described in the R. J. Jaeger, Jr. et al patent, the marker circuit thereby locates the idle trunk circuit and returns momentary driving ground to the trunk circuit by way of the link and connector circuit and lead BT, thereby momentarily operating relay 28-MC. Relay 28-MC momentarily operates relay 28-MC1 which now applies ground to leads CSH, CST, CSU and MCTK. (Leads, CSH, CST an CSU designate the hundreds, tens and unit digits of the class mark, leads CST and CSU corresponding to leads CST and CSU9 in FIG. 10 of the R. J. Jaeger, Jr et al patent. Lead MCTK identifies the circuit as a trunk circuit and corresponds to the similarly identified lead in FIG. 10 of the R. J. Jaeger, Jr. et al patent.)

The marker decoder, upon ascertaining that the circuit is a trunk circuit, connects the trunk circuit to the register sender (and to the originating line circuit) by way of the link and connector circuit. Ground derived from the sleeve lead of the line circuit is now passed through the link and connector circuit to lead S and this ground is extended through relay 28-SL and the break contacts of relay 29-RLS to negative battery. Relay 28-SL thereby operates extending ground to lead HMH to apply holding ground to the horizontal hold magnet in the link and connector circuit. The operation of relay 28-SL also removes the application of negative battery to lead BT to indicate that the trunk circuit is now busy. With the trunk circuit now connected to the register sender, leads TT and TR and RT and RR are connected to corresponding leads in the register sender and are also connected to corresponding leads in the line circuit.

When the register sender is advised by the decoder marker than the trunk circuit is connected it sends "ENQ" characters to obtain a downstream register sender. The "ENQ" characters are received over leads RT and RR in the outgoing trunk circuit and passed to receive shift register 2715. The "ENQ" character is monitored by the ENQ code detection gate in the receive code detection circuit (FIG. 29). At this time the ENQ code detection gate is enabled by the high potential on lead TERM, which high potential is provided by ORIG flip-flop 2725 in the code generation circuit which flip-flop has been cleared at the termination of the previous call as described in detail hereinafter. Therefore, the ENQ code detection gate, being enabled upon the detection of the ENQ code character, passes the BYC pulse to lead ENQ.

Figure 30:
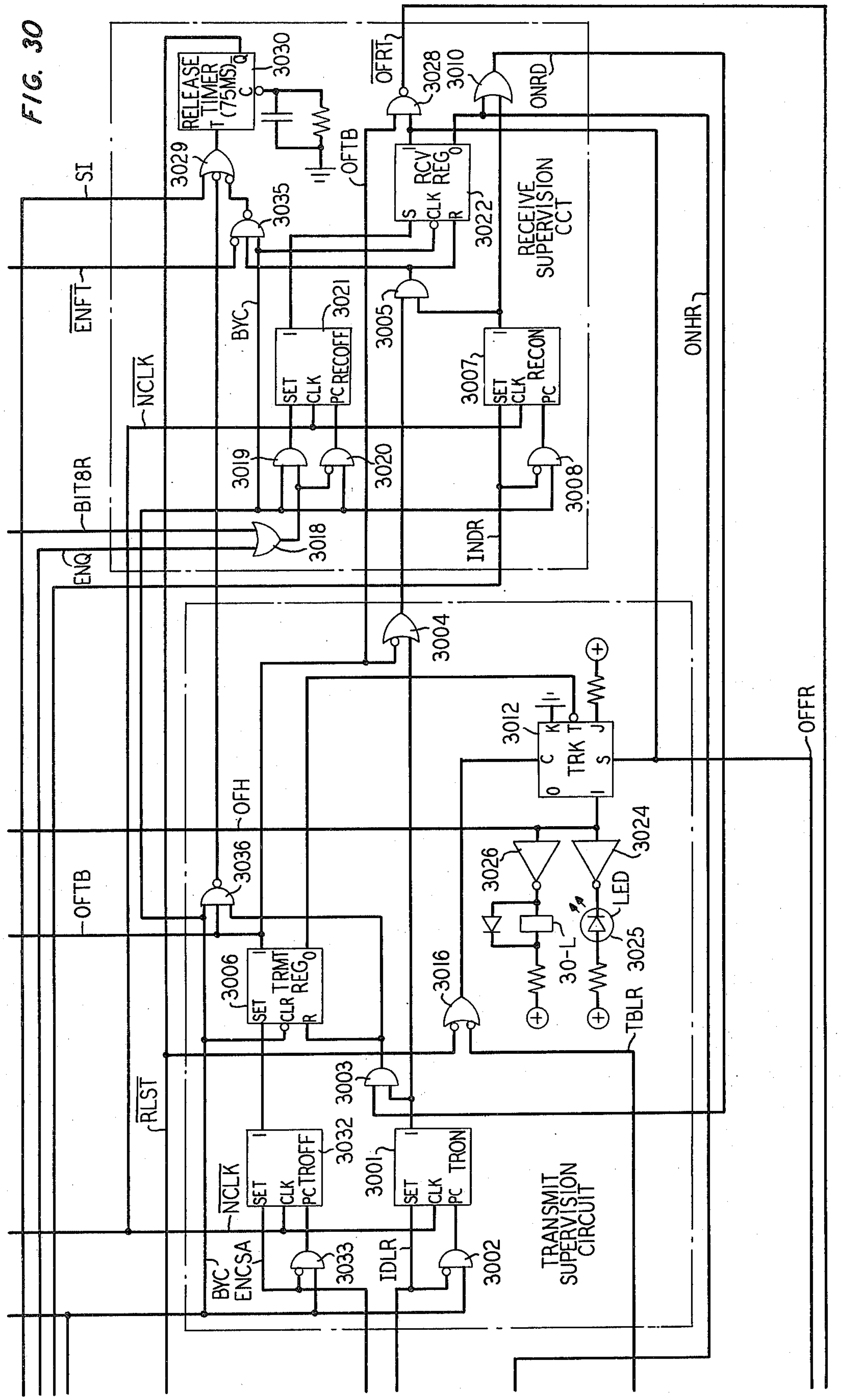

Lead ENQ extends by way of OR gate 3018 in the receive supervision circuit (FIG. 30) to AND gate 3019 and is also inversely applied to preclear gate 3020.

AND gate 3019 thus enabled, passes the BYC pulse applied to the other input to the "set" input of RECOFF flywheel 3021. RECOFF flywheel 3021 is a count-of-2 counter flywheel which, upon the application of the $\overline{NCLK}$ pulse, inserts a 1 bit into the counter. Thereafter, in the event that any character other than the "ENQ" character is received, the consequent low output condition of OR gate enables preclear gate 3020 and the subsequent passage of the BYC pulse thereupon clears flywheel 3021. In the event, however, that eight consecutive "ENQ" characters are therafter received the next $\overline{NCLK}$ pulse again clocks RECOFF flywheel 3021 advancing it to the count of two. The 1 output of the flywheel thereupon becomes high and this high condition is applied to the "set" input of RCV flip-flop 3022. The BYC pulse now clocks the RCV flip-flop 3022 to the "set" condition, applying a high potential to lead OFFR and a low potential to lead ONHR.

The high condition on lead OFFR sets TRK flip-flop 3012 applying a high condition to lead OFH. The high condition on lead OFH, inverted by inverter 3024, energizes light emitting diode 3025 to indicate that the trunk is busy and inverted by inverter 3026, applies current to relay 30-L to thereby operate the relay. The high condition on lead OFH partially enables TRA gate 2704 in the transmission circuit. The other input to TRA gate 2704 is connected to lead $\overline{SOA}$, which is presently high due to the clearing of SO flip-flop 2924 (in the receive code detection circuit) at the termination of the previous call, as described hereinafter.

Accordingly, TRA gate 2704 is fully enabled connecting the output of transmit shift register 2702 to AND gates 2705 and 2706. AND gate 2705 is connected to lead $\overline{REVA}$ and AND gate 2706 is inversely connected to lead $\overline{REVA}$. At this time the $\overline{REVA}$ lead is high since REV flip-flop 2925 is in the "clear" condition having been "cleared" at the termination of the previous call, as described hereinafter. Accordingly, AND gate 2705 is enabled, passing the output of TRA gate 2704 to driver 2707 which converts the binary output of the transmit shift register to bipolar pulses and passes the pulses to leads TT and TR and then on back to the register sender, as previously described. The trunk circuit is presently receiving "Idle" characters from the trunk line and these "Idle" characters are therefore now passed through transmit shift register 2702 on to the register sender.

The operation of relay 30-L operates in turn relay 28-L1. Relay 28-L1 operated further opens the IL lead.

The low condition on lead ONHR provided by RCV flip-flop 3022, "set," is inversely passed through OR gate 2906 is the receive code detection circuit to set CSA flip-flop 2926. CSA flip-flop 2926, "set," thereupon applies a high condition to lead ENFT and a low condition to lead $\overline{ENFT}$. The high condition on lead ENFT now removes one of the low conditions, inverted, passed through OR gate 2718 in the code generation circuit. Since receive shift register 2715 is no longer receiving "Idle" code characters, the positive pulse on lead INDR has been removed. Accordingly, OR gate 2718 passes neither a low condition inverted from lead ENFT nor positive pulses from lead INDR thereby removing the application of these conditions to input terminal IDL in code generation gate 2719 and similarly removes the application of these conditions from OR gate 2720. The parallel loading of the "Idle" character into receive shift register 2715 is therefore terminated and this permits the passage of the "ENQ" character from the register sender through the receive shift register to the trunk line.

The sending of the "ENQ" character to the downstream office initiates the operation of requesting a downstream register sender. Upon obtaining this downstream register sender it returns the "CSA" character back upstream. In the event, however, that the register sender is not obtained within a predetermined interval of time or it returns an unexpected character (other than the "CSA" character), the local register sender presumes that there is a noisy trunk and makes a second try by sending "SI" characters.

The "SI" characters from the local register sender are received by receive shift register 2715 and detected by the SI code detection gate in the receive code detection circuit. At this time the SI code detection gate is enabled by the high conditions on leads $\overline{OFRT}$, TERM and OFFR. Lead $\overline{OFRT}$ is derived from the output of NAND gate 3028 in the receive supervision circuit. NAND gate 3028 is disabled by the low condition on lead OFTB, which low condition is provided by TRMT flip-flop 3006 which was "cleared" at the termination of the previous call as described hereinafter. Lead TERM is high due to the previously described "clearing" of ORIG flip-flop 2725. Finally, lead OFFR is presently high, as previously described, in response to the setting of RCV flip-flop 3022. Accordingly, the SI code detection gate is enabled and, upon the detection of the "SI" code character, gates the BYC pulse therethrough to the D input of two-byte flywheel 2928.

Two-byte flywheel 2928 is arranged to be advanced by the clock pulse on lead BYC in the event that a high condition is applied to input terminal D and alternately to be "cleared" by the BYC pulse in the event that a low condition is applied to input terminal D. Accordingly, assuming the reception of two consecutive "SI" characters, the flywheel is advanced to the count of one at the termination of the BYC pulse and then to the count of two at the termination of the next successive BYC clock pulse. The potential on output terminal 1 thereupon goes high enabling AND gate 2929. AND gate 2929 is fully enabled by the high potential on lead $\overline{REVA}$ provided by REV flip-flop 2925 "cleared" at the termination of the previous call. AND gate 2925 therefore passes a positive pulse to lead SI.

The positive pulse on lead SI is passed through OR gate 3029 to the toggle input of release timer 3030. Release timer 3030 thereupon operates to pass a negative pulse to lead $\overline{RLST}$. The negative pulse on lead $\overline{RLST}$ passes through OR gate 3016 in the transmit supervision circuit to "clear" TRK flip-flop 3012 and the "clearing" of the flip-flop releases relay 30-L and extinguishes LED 3025. The clearing of TRK flip-flop 3012 also applies a low condition to lead OFH to disable TRA gate 2704 opening the output path of transmit shift register 2702. "NUL" characters are thereafter applied via leads TT and TR to the link and connector circuit. The $\overline{RLST}$ pulse also passes through OR gate 2919 in the transmit code detection circuit to momentarily operate relay 29-RLS. Finally, the $\overline{RLST}$ pulse "clears" CSA flip-flop 2906 in the receive code detection circuit providing a high condition to lead $\overline{ENFT}$ and a low condition to lead ENFT. The low condition on lead ENFT, inverted, is again applied through OR gate 2718 in the receive code generation circuit to pass a high condition to input terminal IDL of code detection gates 2719 and to OR gate 2720. The "Idle" code character is thereby impressed upon the several stages of receive shift register 2715 and loaded therein to be transmitted on to the trunk line.

The operation of relay 29-RLS opens the operating path for relay 28-SL and the latter relay releases. The release of relay 28-SL removes ground from lead HMH removing, in turn, ground from the hold magnet in the link and connector circuit to disconnect the trunk circuit from the switch. The release of relay 30-L, in turn, releases relay 28-L1 to reapply ground to lead IL. Thereafter, relay 29-RLS again releases and the trunk circuit is restored to its initial idle condition.

Since the trunk circuit has released from the switch, it is receiving "NUL" characters from the link and connector circuit. This is received by receive shift register 2715 and detected by the NUL code detection gate in the receive code detection circuit. The BYC pulse is thereupon passed through OR gate 2905 and applied via lead INDR to the "set" input of RECON flywheel 3007 in the receive supervision circuit. After the flywheel has been satisfied, its 1 output terminal passes a high potential to AND gate 3005. The other input to AND gate 3005 is connected to the output of OR gate 3004 which has been maintained high by the "clearing" of TRMT flip-flop 3006, as previously described. The AND gate 3005 is thereupon enabled and applies a high potential to the "reset" input of RCV flip-flop 3022 and the flip-flop is clocked to the "reset" condition by the BYC pulse. The trunk supervision circuits are now restored to the initial idle condition.

Assume now that the downstream register sender is successfully obtained and returns the "CSA" characters. The "CSA" character is then received in transmit shift register 2702 and monitored by the code detection gates in the transmit code detection circuit. The CSA code detection gate passes the BYC pulse through OR gate 2932 to lead ENCSA.

The pulse on lead ENCSA is applied to the "set" input of TROFF count-of-2 flywheel 3032 and is applied, inverted, to preclear gate 3033 of the flywheel. Accordingly, the next $\overline{\text{NCLK}}$ pulse inserts a 1 bit into flywheel 3032 and, assuming that eight more successive "CSA" characters are thereafter received, the next successive $\overline{\text{NCLK}}$ pulse advances the flywheel to the count of two. Output terminal 1 of TROFF flywheel 3032 thereupon goes to the high condition and this high condition is applied to the "set" input of TRMT flip-flop 3006. The flip-flop is then clocked to the "set" condition by the BYC pulse, providing a high condition to lead OFTB. In addition, the 0 output of the flip-flop applies a negative transition which is inverted and passed to the toggle input of TRK flip-flop 3012. TRK flip-flop 3012 is thereupon toggled to the "set" condition, if it had not been previously set; (under the present condition, however, TRK flip-flop 3012 is already in the "set" condition).

The "CSA" characters are now passed through transmit shift register 2702 to the local register sender as a dial tone signal. The register sender thereupon sends the address digits back downstream to the remote register sender. At the completion of the transmission of the address digits, the downstream register sender ascertains if the digits had proper format and parity, returning "ACK" characters if they are proper and "NAK" characters if they are improper.

In the event that "NAK" characters are returned, the local register sender sends "SI" characters causing, in turn, the trunk circuit to disconnect in response to the "SI" characters in the same manner as previously described with the exception that the "Idle" characters thereafter received from the trunk line are recognized by the IDLNR code detection gate in the transmit code detection circuit passing a pulse to lead IDLR, as previously described. This pulse is passed to the "set" input of TRON flywheel 3001 and, when the flywheel has been satisfied, output terminal 1 goes high. The high output condition enables AND gate 3003 since the other input to the AND Gate is connected to lead ONRD which is high due to the "clearing" of RCV flip-flop 3022 during the release sequence, previously described. The enabling of AND Gate 3003 passes a high condition to the R input of TRMT flip-flop 3006 and this flip-flop is clocked to the "clear" condition by the BYC pulse. This clearing of the flip-flop restores the trunk supervision circuits and the trunk circuit generally to the initial idle condition.

Return now to the condition where the downstream register sender has received address digits with proper format and parity. The downstream register sender returns the "ACK" characters and the local register sender, in response thereto, transmit "UOD" characters followed by "REV" characters. As previously described, the "UOD" characters are recognized by the originating line circuit to initiate the sending of "CSA" characters. The "REV" characters, received by receive shift register 2715 are monitored by the REV code detection gate in the receive code detection circuit. The REV code detection gate is at this time enabled by the high conditions on leads OFFR and TERM, which leads are presently high, as previously described. Accordingly, the REV code detection gate, upon the reception of the "REV" character, gates the BYC pulse to the "set" input of REV flip-flop 2925. The flip-flop is thereupon placed in the "set" condition and the low potential on its $\overline{Q}$ output is passed to lead $\overline{\text{REVA}}$. This low condition on lead $\overline{\text{REVA}}$ blocks gates 2929 and 2936, disables NAND gate 2705 and AND gate 2712 and enables NAND gate 2706 and AND gate 2713. Accordingly, the output of transmit shift register 2702 is passed through TRA gate 2704 and NAND gate 2706 to driver 2708 where it is converted to bipolar pulses and applied to lead RT and RR. At the same time incoming signals applied across leads TT and TR are passed through terminator circuit 2711 to lead $\overline{\text{DAI2}}$ and then through AND gate 2713 and NOR gate 2714 to receive shift register 2715. Accordingly, the transmission leads extending to the link and connector circuit are thereby reversed to directly connect the transmit side of the originating line circuit to the receive side of the trunk circuit and connect the receive side of the originating line circuit to the transmit side of the trunk circuit.

At the same time the call connection is being completed in the downstream office, the downstream register sender sends back a call progress code indicating that either the called subscriber is being rung, that he is busy or that he is not ready. If the called subscriber is available and being rung, he presumably answers the call and communication between the subscribers then proceeds. In the event that the called subscriber is busy or not ready, the originating subscriber recognizes the call progress sequence and presumably will thereafter hang up.

In the event that the terminator is busy, the downstream register sender returns the appropriate "busy" call progress code sequence back upstream and through the outgoing trunk which is transparent as previously described and back to the originator. The downstream register sender thereafter drops off and the outgoing trunk circuit will then receive "Idle" characters from the trunk line. The local register sender drops off when the "busy" sequence is received, the originator "hangs up" and the originating line circuit then disconnects, as previously described, and returns "NUL" characters to the switch. Similarly, if the terminator is not ready, the downstream register sender sends the "not ready" call progress code sequence and thereafter disconnects. The originating register sender disconnects and the originating subscriber thereafter "hangs up" whereupon the originating line circuit disconnects to send "NUL" characters back to the switch whereby in either event (busy or not ready) the trunk circuit simultaneously receives "Idle" characters from the trunk line and "NUL" characters from the switch.

The incoming "Idle" characters from the trunk line are received by transmit shift register 2702 and monitored by the code detection gates in the transmit code detection circuit. Code detection gate IDLNR is enabled by the reception of the "Idle" characters and passes the BYC pulse through OR gate 2923 to lead IDLR. Lead IDLR is connected to TRON flywheel 3001, as previously described and, assuming that the flywheel is satisfied by the succession of incoming "Idle" characters, the potential on output terminal 1 goes high. This high potential is passed through output OR gate 3004 to partially enable AND gate 3005 in the receive supervision circuit.

When the originating line circuit returns the "NUL" characters, it is received by receive shift register 2715 and monitored by the code detection gates in the receive code detection circuit. The NUL code detection gate is enabled and passes the BYC pulse through OR gate 2905 to lead INDR. The positive pulse on lead INDR is passed through OR gate 2718 in the receive code generation circuit to the IDL input terminal of code generation gates 2719 and to OR gate 2720. The bits of the "Idle" code are thereby applied in parallel to the stages of receive shift register 2715 and the code is overwritten into the receive shift register by the BYC4 pulse applied to the CLP input of the receive shift register. Accordingly, the "Idle" character is overwritten into the receive shift register and this character is then passed on downstream to the trunk line.

The positive pulse on lead INDR is also applied to RECON flywheel 3007. The flywheel, upon being satisfied by the succession of "NUL" characters from the switch, provides a high potential to output terminal 1. This high potential fully enables AND gate 3005 and the high potential output of the enabled gate is applied to the "reset" input of RCV flip-flop 3022 and to NAND gate 3035. NAND gate 3035 is fully enabled by the previously described low output on lead $\overline{\text{ENFT}}$ which is inversely applied to NAND gate 3035. Accordingly, the BYC pulse now toggles RCV flip-flop 3022 to the "clear" condition and is now passed through enabled NAND gate 3035 and inversely passed through OR gate 3029 to operate release timer 3030.

The high output potential of RECON flywheel 3007 is also passed through OR gate 3010 to lead ONRD. The high potential on lead ONRD enables AND gate 3003 in the transmit supervision circuit. AND gate 3003 is fully enabled by TRON flywheel 3001 which, having been previously satisfied by the incoming "Idle" characters from the trunk line, is applying a high potential to its output. The fully enabled AND gate thereby passes a high potential to the "clear" input of TRMT flip-flop 3006 and a high potential to NAND gate 3036 which is presently enabled by TRMT flip-flop 3006 in the "set" condition. The BYC pulse is thereupon passed through enabled NAND gate 3036 and at the termination of the BYC pulse, "clears" TRMT flip-flop 3006. The BYC pulse output of NAND gate 3036 thereupon passes through OR gate 3029 to the trigger input of release timer 3030. Accordingly, it can be seen that the coincidence of the incoming "Idle" characters from the trunk line and the "NUL" characters from the switch enables one or the other of NAND gates 3035 and 3036 which thereupon triggers the release timer.

The clearing of RCV flip-flop 3022 restores a low condition to lead OFFR and a high condition to lead ONHR and assures that the potential on lead $\overline{\text{OFRT}}$ is high. The clearing of TRMT flip-flop 3006 restores a low condition on lead OFTB. These potential conditions on these leads define the previously described "on-hook" condition of the supervision circuits.

The operation of release timer 3030 passes a negative pulse to lead $\overline{\text{RLST}}$. The negative $\overline{\text{RLST}}$ pulse is passed, inverted, through OR gate 3016 to "clear" TRK flip-flop 3012. The "clearing" of TRK flip-flop 3012 releases relay 30-L and passes a low condition to lead OFH. The low condition on lead OFH disables TRA gate 2704 blocking the output of transmit shift register 2702 and thus passing "NUL" characters back to the switch. The $\overline{\text{RLST}}$ pulse is also inversely passed through NOR gate 2919 in the transmit code detection circuit to momentarily operate relay 29-RLS. Finally, the $\overline{\text{RLST}}$ pulse resets CSA flip-flop 2926 and REV flip-flop 2925 in the receive code detection circuit. The resetting of REV flip-flop 2925 re-enables the appropriate reverse control gates in the trunk circuit to thereby interconnect the output of transmit shift register 2702 with leads TT and TR and interconnect leads RT and RR with receive shift register 2715. The "clearing" of CSA flip-flop 2926 reapplies a low condition to lead ENFT and a high condition to lead $\overline{\text{ENFT}}$. The low condition on lead ENFT is now applied, inverted, through OR gate 2718 to input terminal IDL of the code generation gates and to OR gate 2720. The bits of the "Idle" code will be thereby maintained on the parallel inputs to receive shift register 2715 and loaded by each of the BYC4 pulses into the register to be successively transmitted to the trunk line. The momentary operation of relay 29-RLS opens the operating path of relay 28-SL and this latter relay releases. The release relay 28-SL in turn, opens the hold magnet ground path HMH to permit the link and connector circuit to disconnect the connection to the trunk circuit. The release of relay 30-L releases relay 28-L1 and with relays 28-SL and 28-L1 released, ground is reapplied to lead IL and negative battery is reapplied through relay 28-MC to lead BT. The idle condition of the trunk circuit is now restored.

In the event that there is a communication failure, such as a break in the trunk line, "NUL" characters are received from the trunk line and passed through the trunk circuit on to the originating line circuit. The originating line circuit disconnects and sends NUL characters back to the switch. Since the trunk circuit is now receiving "NUL" characters from both directions, it flywheels these characters and proceeds through its disconnect sequence returning to the idle condition in the same manner as previously described.

In the event that the terminator is available and the connection is completed to the terminating line circuit the downstream register sender proceeds to send "BEL characters" to the terminator and return the "ringing" call progress code sequence to the originating subscriber. If the terminating subscriber does not answer the call, the originating subscriber will "hang-up." "NUL" characters are thereupon transmitted by the originating line circuit to the outgoing trunk circuit. The outgoing trunk circuit, monitoring the "NUL" characters, overwrites "Idle" characters into receive shift register 2715 and passes these "Idle" characters to the trunk line and on to the terminating line circuit. The terminating line circuit thereupon disconnects, returning "NUL" characters to the downstream trunk circuit and these "NUL" characters are then converted to "Idle" characters by the downstream trunk circuit and passed upstream to the outgoing trunk circuit. The outgoing trunk circuit, now receiving "NUL" characters from the switch and "Idle" characters from the trunk line, proceeds to disconnect and return to the idle condition.

Finally, assume now that the terminating subscriber answers the call and communication between the two subscribers proceeds to the completion of the call. At the completion of the call, one or the other of the subscribers will "hang up." "NUL" characters will thereupon be transmitted by the associated line circuit through the switch to the trunk circuit, converted to "Idle" characters and passed on to the trunk line. The line circuit at the other end will thereupon disconnect, returning "NUL" characters to the switch. These "NUL" characters are converted to "Idle" characters by the trunk circuit and passed back to the trunk line. Accordingly, each trunk circuit simultaneously receives "NUL" characters from the switch and "Idle" characters from the trunk line and therefore disconnects and restores to the idle condition.

Assume now that the trunk circuit is in the initial idle "on-hook" condition previously described and further assume that a subscriber connected to a remote office originates a call which is terminated in the local office. When the originating register sender connects to its outgoing trunk circuit, it proceeds to send the "ENQ" characters over the trunk line to the incoming trunk in the local downstream office. These "ENQ" characters are received in transmit shift register 2702 and are monitored by the code detection gates in the transmit code detection circuit. The detection of the "ENQ" character enables the ENQ code detection gate which passes the BYC pulse through OR gate 2932 to lead ENCSA. The positive pulse on lead ENCSA inverted, disables AND gate 2902 to preclude the previously described raising of trouble conditions. In addition, the positive pulse on lead ENCSA is passed to TROFF flywheel 3032 which proceeds to count the incoming "ENQ" characters. Accordingly, the $\overline{\text{NCLK}}$ pulse advances TROFF flywheel 3032 to the count of one in response to the incoming "ENQ" characters and, assuming eight additional successive "ENQ" characters are received, TROFF flywheel 3032 is advanced to the count of two providing a high condition to its 1 output terminal. This high condition is passed to the "set" input of TRMT flip-flop 3006. The BYC pulse thereupon clocks the flip-flop to the "set" condition, applying a high condition to lead OFTB and passing a negative transition from its 0 output terminal to the toggle input of TRK flip-flop 3012. This negative transition, inverted, toggles TRK flip-flop 3012 to the "set" condition since the J input is connected to a high potential.

The low output condition of TRON flywheel 3001 or the high condition on lead OFTB inverted, lowers the output of OR gate 3004, which low output is passed to AND gate 3005 in the receive supervision circuit to disable the gate. The high output condition on lead OFTB partially enables AND gate 3028 and partially enables AND gate 2728 which is connected to the "set" input of ORIG flip-flip 2725. The "setting" of TRK flip-flop 3012 lights the "busy" light emitting diode 3025 and operates relay 30-L. In addition, a high potential is passed by way of lead OFH to TRA gate 2704 to enable the gate and connect the output of transmit shift register 2702 to leads TT and TR thereby passing the "ENQ" character to the switch.

The operation of relay 30-L operates relay 28-L1. Relay 28-L1 operated applies ground via break contacts of relay 28-5L to lead VGS to make a bid for a decoder marker. Relay 28-L1 operated opens the BT lead and extends battery by way of break contacts of relay 29-RLS, the core of relay 28-MC, the break contacts of relay 28-SL and the make contacts of relay 28-L1 to lead LT. Finally, relay 28-L1 operated opens the path connecting lead IL to ground and the opening of this path together with the opening of lead BT renders the trunk circuit busy.

When the marker is obtained, it returns driving ground over lead LT, momentarily operating relay 28-MC and relay 28-MC, in turn, momentarily operates relay 28-MC1. The operation of relay 28-MC1 completes an operating path for relay 28-OR by way of make contacts of relay 28-L1 and 28-MC1 and relay 28-OR locks around the make contacts of relay 28-MC1. In addition, the momentary operation of relay 28-MC1 momentarily applies ground to leads CSH, CST, CSU and MCTK sending the corresponding number and trunk identification to the marker.

The operation of relay 28-OR now completes an operating path for relay 28-SL and provides ground to the sleeve lead S extending back to the link and connector circuit. The operation of relay 28-SL extends ground to lead HMH providing locking ground for the hold magnet in the switch. Finally, the operation of relay 28-SL removes ground from lead VGS thereby removing the bid for the decoder marker.

The marker now proceeds to locate a register sender and upon obtaining a register sender connects it by way of the link to the trunk circuit. The "ENQ" character being passed from the trunk line through the trunk circuit to the link is thus passed on to the downstream register sender.

In the event that the downstream register sender fails to respond to the "ENQ" characters, the local incoming trunk circuit continues to send "Idle" characters back upstream and the originating register sender thereafter times out and disconnects. The outgoing trunk circuit at the originating office again sends "Idle" characters. The "Idle" characters are received by transmit shift register 2702 and the IDLNR code detection gate in the transmit code detection circuit gates the BYC pulse through OR gate 2903 to lead IDLR. The pulse on lead IDLR is passed to TRON flywheel 3001. When the flywheel is satisfied, its 1 output terminal goes high and this high condition, as previously described, partially enables AND gate 3003. AND gate 3003 is fully enabled by the high condition on lead ONRD provided through OR gate 3010 by the 0 output terminal of RCV flip-flop 3022 which is presently "clear," as previously described. AND gate 3003 in the transmit supervision circuit is therefore fully enabled applying a high condition to the "clear" input of TRMT flip-flop 3006 and partially enabling NAND gate 3036. NAND gate 3036 is fully enabled by TRMT flip-flop 3006 in the "set" condition. The BYC pulse thereupon passes through NAND gate 3036 then inversely through OR gate 3029 to the toggle input of release timer 3030 to operate the timer. In addition, the BYC pulse also toggles TRMT flip-flop 3006 to the "clear" condition. The operation of release timer 3030 now restores the trunk circuit to the initial idle condition in the same manner as previously described.

Assume now that the downstream register sender responds to the "ENQ" characters in the normal manner by returning "CSA" characters; these characters are passed by way of the link and connector circuit back to the incoming trunk circuit. The "CSA" characters from the register sender are received by receive shift register 2715 and monitored by the code detection gates in the receive code detection circuit. The CSA code detection gate is thereby enabled and passes the BYC pulse to the D input of two-byte flywheel 2933. Accordingly, the flywheel is clocked to the one count by the BYC pulse and, assuming that the next successive character is also a "CSA" character, the flywheel is further advanced to the count of two by the next BYC pulse. The 1 output of flywheel 2933 thereupon goes high and this high output is passed through OR gate 2906 to the "set" input of CSA flip-flop 2926. CSA flip-flop 2926 is thereupon "set" providing a high condition to lead ENFT and a low condition to lead $\overline{\text{ENFT}}$.

The high condition on lead ENFT now removes the enabling potential previously passed inversely through OR gate 2718 to the IDL input terminal of code generation gates 2719 in the code generation circuit and further removes the high potential applied to OR gate 2720. This terminates the parallel loading of the "Idle" character into receive shift register 2715. The high condition on lead ENFT also partially enables AND gate 2728. The two other input leads to AND gate 2728 comprises leads ONHR and OFTB. Lead ONHR is presently high due to the "clearing" of RCV flip-flop 3022 at the termination of the previous call and lead OFTB is presently high due to the "setting" of TRMT flip-flop 3006, as previously described. Accordingly, the AND gate 2728 is fully enabled, "setting" ORIG flip-flop 2725. The setting of flip-flop 2725 applies a high condition to lead ORIG and a low condition to lead TERM.

At this time, the "CSA" characters from the register sender passed to receive shift register 2715 are shifted on to the trunk line since, as previously described, the parallel loading of the receive shift register has been terminated. The trunk circuit is therefore transparent in both directions, receiving "ENQ" characters from the trunk line and passing them to the switch and receiving "CSA" characters from the switch and passing them back upstream to the trunk line. The register sender in the remote originating office, in response to the "CSA" characters, now proceeds to send the route control digits, the class mark and the address digits. These characters are received by the downstream register sender since, as previously described, both of the intervening trunk circuits are transparent. The downstream register sender, after checking the format and parity of the digits, returns the code character "ACK" if the format is correct or returns the code character "NAK" if the format is incorrect.

In the event that the downstream register sender fails to respond to the address digits, the originating register sender times out and disconnects and the trunk circuit in the originating office again sends "Idle" characters to the downstream office. Thereafter, the downstream register sender, in response to the "idle" characters disconnects and the local incoming trunk circuit in the downstream office receives "NUL" characters from the switch. With the local incoming trunk circuit at the downstream office again receiving "Idle" characters from the trunk line, TRON flywheel 3001 is advanced and when the flywheel is satisfied, AND gate 3003 is enabled (since RCV flip-flop 3022 is "clear"), enabling in turn gate 3036 to pass the BYC pulse whereby release timer 3030 is operated to restore the trunk circuit to the idle condition. During the release sequence the pulse on lead $\overline{\text{RLST}}$ resets ORIG flip-flop 2725 and CSA flip-flop 2926. Lead ENFT goes low reapplying a high condition to input terminal IDL of code detection gates 2719 and to the OR gate 2720. The bits of the "Idle" code are again applied in parallel to receive shift register 2715 and loaded therein to pass the "Idle" character upstream.

In the event that the downstream register sender finds that the format or parity of the address digits is incorrect, it returns the "NAK" code character, and disconnects. The upstream register sender, in response to the "NAK" character returns the "SI" character. The upstream trunk circuit now disconnects and starts sending "Idle" characters downstream. The downstream trunk circuit then receives "Idle" characters from the trunk line and "NUL" characters from the switch. The incoming trunk circuit of the downstream office recognizes the "Idle" characters from the trunk line and restores itself to the idle condition in the same manner as previously described.

Assume now that the code format and parity of the address sequence is received correctly by the local downstream register sender. The downstream register sender returns the "ACK" characters, requests a marker, and returns "SO" (switch open) characters back upstream. The register sender in the upstream office recognizes the "ACK" characters, sends the "UOD" characters to the originating line circuit and sends the "REV" character to the upstream outgoing trunk circuit. The line circuit cuts through the subscriber to the switch and the outgoing trunk circuit reverses the line connection to connect the subscriber to the trunk line. Data mode characters are then passed downstream to the local incoming trunk circuit.

The "SO" characters from the downstream register sender are received by receive shift register 2715 in the incoming trunk circuit of the local downstream office. These characters are monitored by the SO code detection gate in the receive code detection circuit. At this time the SO code detection gate is enabled by the high conditions on leads ORIG and $\overline{\text{OFRT}}$. Lead ORIG is presently high due to the previously described setting of ORIG flip-flip 2725 in the receive code generation circuit. Lead $\overline{\text{OFRT}}$ presently has a high potential applied thereto by NAND gate 3028 in the receive supervision circuit, which NAND gate is presently disabled by RCV flip-flip 3022 in the "clear" condition. Accordingly, the SO code detection gate is fully enabled and, upon the detection of the "SO" character, passes the BYC pulse to lead GSO. The pulse on lead GSO is passed to OR gate 2730 in the code generation circuit and then applied to input terminal CSA of code generation gates 2719 and to OR gate 2720. The energization of input terminal CSA results in the application of the bits of the "CSA" character to receive shift register 2715 and the character is thereupon loaded into the receive shift register and sent on upstream by way of the trunk line.

The pulse on lead GSO is also applied to the D input of two-byte flywheel 2934. The BYC pulse thereupon clocks a 1 bit into the flywheel and, assuming that the next successive character is also an "SO" character, the flywheel advances to the count of two and the 1 output terminal goes high. This high condition "sets" $\overline{SO}$ flip-flop 2924, applying a low condition to lead $\overline{SOA}$ and partially enabling AND gate 2936. AND gate 2936 is fully enabled by the high condition on lead $\overline{REVA}$ supplied by the $\overline{Q}$ output terminal of REV flip-flop 2925, which was previously "cleared" at the termination of the last call. The enabling of AND gate 2936 thereupon passes a high condition to lead SO.

The low condition on lead $\overline{SOA}$ is passed to the input of TRA gate 2704 and this gate is thereupon disabled to apply "NUL" characters to the switch. This precludes the overwriting of subsequent codes sent by the terminating line circuit to the local register sender at the downstream office.

The high condition on lead SO is applied through OR gate 2731 to the "set" input of flip-flop 2732 in the receive code generation circuit. This sets flip-flop 2732 applying a high condition through OR gate 2730 to input terminal CSA of code generation gates 2719 and to OR gate 2720. The application of the bits of the "CSA" character to receive shift register 2715 and the loading of the character into the receive shift register is thereby continued and successive "CSA" characters are now returned back upstream via the trunk line.

When the marker is obtained by the register sender, the address information is passed thereto and the marker attempts to connect to the terminating line circuit. If the terminating line circuit is busy, the busy indication is returned to the register sender. The register sender now sends the "busy" call progress code sequence back upstream.

The initial character of the "busy" call progress code sequence is the character "CME." This character is received by receive shift register 2715 and monitored by the CME code detection gate in the receive code detection circuit. The CME code detection gate is presently enabled by the high potential on lead ORIG and passes the BYC pulse to lead $\overline{GCME}$. This pulse is passed through OR gate 2733 to the "reset" input of flip-flop 2732. Flip-flop 2732 is thereupon "cleared" terminating the parallel loading of the "CSA" characters into the receive shift register and again rendering the trunk circuit transparent to upstream characters. Since the originator has been cut through, the "busy" call progress code sequence is rceived by the originator. The register sender at the downstream office thereafter disconnects the "NUL" characters are sent by the switch to the incoming trunk circuit. The "NUL" characters received by the switch are converted to "Idle" characters by the incoming trunk circuit in the same manner previously described. These "Idle" characters are passed to the upstream office and the originating line circuit disconnects in response thereto and returns "NUL" characters which are converted to "Idle" characters by the outgoing trunk circuit in the upstream office, which "Idle" characters are passed on downstream to the incoming trunk circuit. With "Idle" characters being received from the upstream office, TRON flywheel 3001 is satisfied to enable the operation of release timer 3030 and the incoming trunk circuit is restored to the initial idle condition.

Assume now that the terminating subscriber and the terminating line circuit is in the "not ready" condition. In this event the marker connects the terminating line circuit which sends the "not ready" code characters to the register sender. The register sender, in turn, transmits the "not ready" call progress code sequence back upstream to the originating subscriber and thereafter disconnects whereupon the switch sends "NUL" characters to the incoming trunk circuit at the downstream office. These "NUL" characters are converted to "Idle" characters which are passed to the upstream office and the originating line circuit disconnects in response thereto and returns "NUL" characters. The "NUL" characters are converted to "Idle" characters by the outgoing trunk circuit in the upstream office and the "Idle" characters are passed on downstream to the incoming trunk circuit.

The initial character of the "not ready" call progress code sequence is the character "CME." This character is recognized by the incoming trunk circuit and flip-flop 2732 in the code generation circuit is thereupon "cleared" in the same manner as it is "cleared" when the "CME" character is recognized at the beginning of the "busy" call progress code sequence. Accordingly, the overwritting of the "CSA" characters into the receive shift register is terminated rendering the receive shift register transparent to pass the "not ready" call progress code sequence to the upstream office. As noted above, "Idle" characters are thereafter received from the upstream office and the TRON flywheel is thereupon satisfied in the same manner as previously described. This enables the operation of release timer 3030 to restore the incoming trunk circuit to the initial idle condition.

Assume now that the terminating subscriber is available. The marker thereupon connects the terminating line circuit to the downstream register sender and the downstream register sender transmits ringing signals to the terminating line circuit and returns the "ringing" call progress code sequence back upstream. The first character of the "ringing" call progress code sequence is the character "CME." This character is recognized by the incoming trunk circuit which, as previously described, thereupon "clears" flip-flop 2732 in the code generation circuit. The receive shift register is thereupon rendered transparent permitting the "ringing" call progress code sequence to be sent upstream by way of the trunk line to the originating office.

After the register sender transmits the "ringing" call progress code sequence, it sends the "UOD" (unblind) and "REV" (reverse) characters. The reverse characters are recognized by the terminating line circuit which thereupon reverses the transmission path connections therein, as previously described, and the terminating line circuit proceeds to send "CSA" characters to the switch. The "UOD" characters are received by the receive shift register in the incoming trunk circuit and monitored by the UOD code detection gate in the receive code detection circuit. At this time the UOD code detection gate is enabled by the high potential on lead ORIG, which high potential is provided by ORIG flip-flop 2725 in the code generation circuit, which flip-flop was previously "set." The UOD code detection gate is therefore enabled and upon the detection of the "unblind" character, passes the BYC pulse to lead UOD.

The pulse on lead UOD is passed through OR gate 2935 to the "reset" input of SO flip-flop 2924. This "clears" so flip-flop 2924 applying a high condition to lead $\overline{SOA}$. In addition the clearing of SO flip-flop 2924 disables AND gate 2936 whereby a low condition is passed to lead SO. The high condition on lead $\overline{SOA}$ is applied to one input of TRA gate 2704 in the transmission circuit. The other input is connected to lead OFH which is presently high since TRK flip-flop 3012 in the transmit supervision circuit is presently "set." Accordingly, TRA gate 2704 is enabled, connecting the output of transmit shift register 2702 through AND gate 2705 and driver circuit 2707 to leads TT and TR. This again renders the trunk circuit transparent to upstream signals.

At this time data mode characters (presumably data mode "SYN" characters) are received from the originating subscriber and passed downstream through the incoming trunk circuit to the terminating subscriber and at the same time the terminating line circuit is transmitting "CSA" characters through the switch to the incoming trunk circuit. At this time with flip-flop 2732 in the code generation circuit "set," as previously described, the incoming trunk circuit is overwriting "CSA" characters into receive shift register 2715 and these characters, in turn, are being sent upstream to the originator.

Assume now that the terminating subscriber fails to answer the call and that the originator decides to "hang up" terminating the sending of data mode characters. The originating line circuit thereupon sends control mode "Idle" characters to the switch and the outgoing trunk circuit in the upstream office passes control mode "Idle" characters downstream. These characters are monitored by the incoming trunk circuit, and as previously described, code detection gate IDLNR in the transmit code detection circuit applies pulses through OR gate 2903 via lead IDLR to TRON flywheel 3001. After the TRON flywheel is satisfied by the appropriate number of successive control mode "Idle" characters, it initiates the operation to operate release timer 3030 and to clear TRMT flip-flop 3006, in the same manner as previously described, for the "busy" and "not ready" sequences. The operation of release timer 3030 now "clears" flip-flop 2732 and restores the trunk circuit to the initial idle condition.

The "clearing" of flip-flop 2732 terminates the overwriting of the "CSA" code characters into the receive shift register and with CSA flip-flop 2926 in the receive code detection circuit "cleared" by the $\overline{RLST}$ pulse, "Idle" characters are again overwritten into receive shift register 2715.

Assume now that the terminating subscriber answers the call. The terminating line circuit thereupon returns an "answer packet." As previously described, the answer packet comprises data mode characters terminated by a data mode "CTC" (cut through) character which connects the terminating subscriber to the originating subscriber.

In the incoming trunk circuit the data mode characters are received by receive shift register 2715. Since the eighth bit of the data mode character is always 1, a positive pulse is applied to lead BIT8R. Lead BIT8R extends to load gate 2721 for receive shift register 2715 and the positive pulse is inversely applied thereto to disable gate 2721. The gate thus blocks the BYC4 pulse, precluding overwriting into the receive shift register and rendering it transparent when data mode characters are being passed upstream. At the same time the pulse on lead BIT8R is passed through OR gate 3018 to AND gate 3019 and the output of gate 3019 is connected to the "set" input for RECOFF flywheel 3021. The pulse on lead BIT8R is also inversely applied to preclear gate 3020. The positive pulse on lead BIT8R therefore disables preclear gate 3020, precluding the clearing of RECOFF flywheel 3021 when a data mode character is sent upstream. At the same time, AND gate 3019 is enabled by the BIT8R pulse and passes the BYC pulse to the "set" input of RECOFF flywheel 3021. The $\overline{NCLK}$ pulse therefore inserts a 1 bit into the flywheel if a data mode character is received at this time. Thereafter, assuming eight additional successive data mode characters are sent upstream, RECOFF flywheel 3021 is satisfed, applying a high condition to its 1 output. This high condition is passed to the "set" input of RCV flip-flop 3022 and the flip-flop is toggled to the "set" condition by the BYC pulse.

The setting of RCV flip-flop 3022 applies a high condition to lead OFFR and a low condition to lead ONHR. The setting of RCV flip-flop 3022 now places the receive supervision circuit in the "off-hook" condition and with TRK flip-flop 3012 also "set," both the transmit side and the receive side are off-hook. At the same time the low condition on lead ONHR is inversely passed through OR gate 2733 to the "reset" input of flip-flop 2732 in the code generation circuit. Flip-flop 2732 is thereupon "cleared," terminating any overwriting of the "CSA" character into the receive shift register. The originating and terminating subscriber can now proceed to interchange data.

At the termination of the call the originator or the terminator "hangs up." If the originator hangs up, the upstream trunk circuit thereupon sends control mode "Idle" characters downstream. The terminating line circuit thereupon "hangs up," in turn, and the downstream switch sends "NUL" characters to the incoming trunk circuit. If the terminator "hangs up," the downstream switch sends "NUL" characters to the incoming trunk circuit. The trunk circuit sends "Idle" characters upstream and the terminating line circuit disconnects and the upstream trunk circuit returns control mode "Idle" characters downstream. In either event, control mode "Idle" characters are received from the trunk line and "NUL" characters and simultaneously received from the switch. The trunk circuit monitors these characters and proceeds to restore to the idle condition, in the same manner as previously described for the outgoing trunk circuit in the originating office with the exception that the operation of release timer 3030 "clears" ORIG flip-flop 2725 in the code generation circuit to fully restore the downstream trunk circuit to the initial idle condition.

Figure 28:
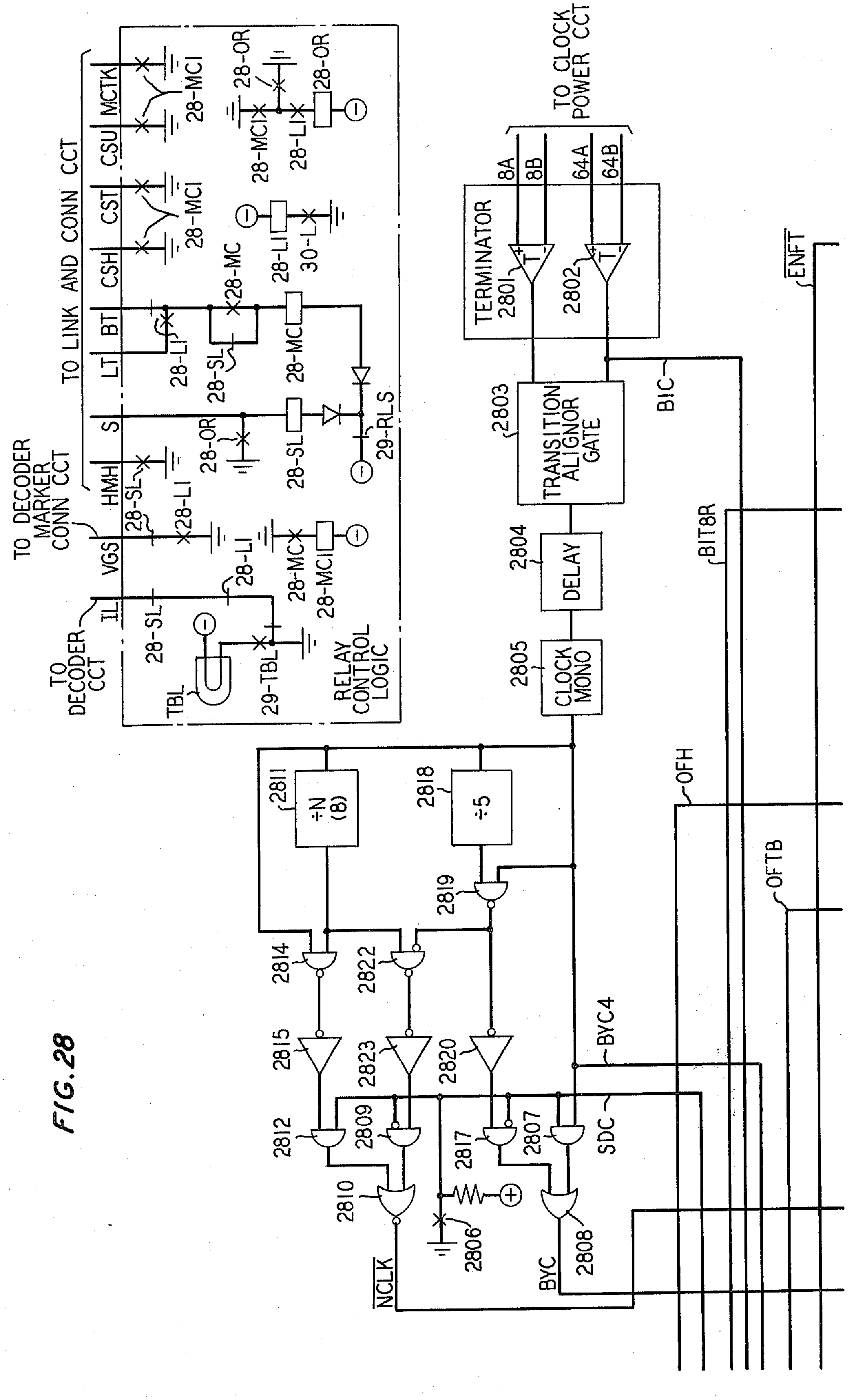

The clock distribution circuit which, as previously described, distributes various clock pulses throughout the trunk circuit is shown in FIG. 28. The bit clock pulse is obtained from the office bit clock which, as described in the A. C. Carney et al patent, is a 64 kilohertz clock. This clock is applied across leads 64A and 64B and passed to terminator 2802 which converts the clock signals from bipolar to binary pulses and passes the binary clock pulses to lead BIC, which lead is distributed through the trunk circuit.

The office byte clock which is disclosed in the A. C. Carney et al patent, is an 8 kilohertz office clock applied across leads 8A and 8B and passed to terminator 2801 which converts bipolar clock pulses to binary pulses. The outputs of terminators 2801 and 2802 are passed to transition aligner gate 2803. Transition aligner gate 2803 aligns the byte clock output of terminator 2801 with bit clock output of terminator 2802 and transitions of the byte clock pulse thus aligned are delayed by the delay circuit 2804 and the delayed transitions fire clock monopulser 2805. The monopulser output therefore comprises byte clock pulses delayed with respect to the 8 kilohertz office byte clock signal. The output of monopulser 2805 is passed to lead BYC4 for distribution throughout the trunk circuit.

If the trunk circuit is serving a high-rate subscriber, switch 2806 is unoperated and a high potential is passed to lead SDC. This high potential enables AND gates 2812 and 2807 and disables AND gates 2809 and 2817. The BYC4 pulse is thereupon passed through gate 2807 and OR gate 2808 to lead BYC. The BYC pulse thereupon corresponds to the BYC4 pulse for high-rate subscriber trunk circuits.

The BYC4 pulse is also applied to 8 circuit 2811. The coincidence of the output of divider circuit 2811 and the BYC4 pulse is passed by gate 2814 through inverter 2815 to gate 2812 and gate 2812 being enabled, as previously described, passes the pulse therethrough and through NOR gate 2810 to lead $\overline{\text{NCLK}}$ which is distributed throughout the trunk circuit. Accordingly, for high-rate subscribers trunk circuits the $\overline{\text{NCLK}}$ clock pulse comprises one-out-of-eight of the BYC4 byte clock pulses.

If the trunk circuit is serving a subrate subscriber, switch contacts 2806 is operated and ground is applied therethrough to disable gates 2807 and 2812 and enable gates 2809 and 2817. The BYC4 clock pulse is now blocked by gate 2807.

The BYC4 clock pulse is also applied to 5 divider circuit 2818 and the coincidence of the output of the divider circuit together with the BYC4 pulse is passed through gate 2819 and inverter 2820 to AND gate 2817. AND gate 2817 is now enabled, as previously described, and this pulse is passed therethrough and through OR gate 2808 to lead BYC which is distributed throughout the trunk circuit. Accordingly, for a trunk circuit serving a subrate subscriber, the BYC pulse train constitutes one-out-of-five of the BYC4 byte clock pulses.

The output of gate 2819 is also applied to gate 2822. The other input of gate 2822 is connected to the output of 8 circuit 2811 and gate 2822 passes this coincident output through inverter 2823 to gate 2809 and gate 2809 being enabled, as previously described, further passes this coincident output through NOR gate 2810 to lead $\overline{\text{NCLK}}$. Accordingly, for trunk circuits serving subrate subscribers, the $\overline{\text{NCLK}}$ trunk pulse constitutes one-out-of-40 of the BYC4 byte clock pulses or one-out-of-five of the pulses applied to lead $\overline{\text{NCLK}}$ when the trunk circuit is serving high-rate subscribers.

Register Sender

As previously noted, the digital register sender circuit 110 is connected to the link and connector circuit, identified as link and connector circuit 157 in FIG. 1 (and similarly identified in FIG. 1 of the Jaeger et al patent) and is connected to the decoder marker connector circuit identified as decoded marker connector circuit 161. In addition, register sender circuit 106 is connected to a billing information system described hereinafter and to various clock and power sources as detailed hereinafter.

The details of the register sender are shown in FIGS. 5 through 20, arranged as shown in FIG. 21. In the initial condition all the connecting links to the register sender are open, no signals being received with the exception of normal signals on the clock and power circuits. At this time ground is normally applied through break contacts of normally released relay 5-SR to lead RA in FIG. 6 indicating that the digital register sender is idle. Lead RA corresponds to lead RA6 in FIG. 59 of the Jaeger et al patent, which lead extends to the marker and ground thereon indicates that the register sender is idle.

In the initial condition, relay 5-ON is released. This removes ground from the lead in FIG. 16 extending to the toggle input of retriggerable monopulser 1601, permitting the application of positive potential to the toggle input of the monopulser. The positive level operates the monopulser and, so long as the positive potential is maintained in the toggle input, the output of the monopulser is maintained high. This high potential is passed to the D input of flip-flop 1602. The flip-flip is thereupon toggled to the SET condition by the byte clock pulse on lead BYTE CLOCK, described in further detail hereinafter. The flip-flop, being SET, applies a low potential to off-normal lead ON, initializing all logic as specifically indicated hereinafter.

Assume now that a local line subscriber initiates a call. As previously described, the subscriber goes off-hook and transmits the data mode character SYN. After the flywheel in the line circuit, such as line circuit 108, has been satsified, the line circuit bids for a marker as previously described. The marker recognizes the bid and operates appropriate crosspoints in the crossbar switch in link and connector circuit 157 to connect the line circuit to the digital register sender circuit. In addition, the marker applies ground to lead RST (FIG. 5) by way of the link and connector circuit (lead RST corresponds to lead RST19 in FIG. 63 of the Jaeger et al patent).

The ground on lead RST operates relay 5-MC by way of break contacts of relay 5-ON and relay 5-MC locks directly to the ground on lead RST. Relay 5-MC, operated, applies ground to lead MCRK thus passing ground to the marker indicating seizure of the register. (The MCRK lead corresponds to the similarly identified lead in FIG. 63 of the Jaeger et al patent.) The operation of relay 5-MC extends lead NDT, FIG. 5, (and similarly identified in FIG. 63 of the Jaeger et al patent) to relay 5-NDT and extends lead DT (similarly identified in FIG. 63 of the Jaeger et al patent) to relay 5-DT. Since this is a call from a local originating line, the marker energizes lead DT to operate relay 5-DT and does not energize lead NDT to maintain relay 5-NDT released. Relay 5-DT, operated, locks to ground by way of make contacts of relay 5-MC. In addition, relay 5-MC operated extends lead 9.6 to relay 5-SRATE. Lead 9.6 extends via the link and connector circuit to the marker which has been modified to indicate the speed of transmission. The marker obtains the speed of transmission (high rate or subrate subscriber) from the class-mark supplied by the line circuit (as previously described) and the marker translates the class mark and grounds lead 9.6 if the line circuit indicates that the subscriber transmits at a subrate (9.6 kbs) rather than a high rate (56 kbs). This translation is similar to the marker function described in the Jaeger et al patent wherein the marker determines if a trunk requires multifrequency signaling and grounds lead MF (in FIG. 63). Thus, if the subscriber transmits at the subrate, lead 9.6 is grounded by the marker operating relay 5-SRATE which locks through make contacts of relay 5-MC.

The operation of relay 5-MC also extends leads LKTO through LKT7 from the link and connector circuit to relays 5-LKO through 5-LK7 and extends leads HGTO through HGT7 (FIG. 6) to relays 6-HGO through 6-HG7 (not shown, but generally indicated by block 601). The operation of relay 5-MC also extends leads CLUO through CLU7 from the link and connector circuit to relays 6-CLUO through 6-CLU7, extends leads CLTO through CLT7 to relays 6-CLTO through 6-CLT7, extends leads CLHO through CLH7 to relays 6-CLHO through 6-CLH7. As described and shown in FIG. 66 of the Jaeger et al patent, the leads define the hundreds, tens and units class digits and the linking and horizontal groups. Appropriate leads are therefore energized by the marker to register class of service, and linking and horizontal groups.

The operation of each of the link and horizontal group and class of service relays provide locking ground back through a make contact of relay 5-MC and lead 606 and these locking grounds are passed through the operated relays to the decoder marker circuit by way of similarly designated leads to indicate that the register sender has registered the link and horizontal group and class of service.

At this time, the line circuit is connected via the link and connector circuit to the register sender. The line circuit applies ground to its S lead and this ground is passed through the link and connector circuit to lead 5 (FIG. 6) in the register sender operating relay 6-LD. (Lead S is similarly identified in FIG. 51 of the Jaeger et al patent.) Relay LD operated passes ground back over lead HMH to operate the hold magnet in the link and connector circuit (lead HMH corresponds to lead HMH19 in FIG. 51 of the Jaeger et al patent).

The operation of relay 6-LD also operates relay 5-SR. This in turn operates relay 5-ON. The operation of relay 5-ON removes positive potential from the toggle input of retriggerable monopulser 1601. Accordingly, after 70 milliseconds, monopulser 1601 restores and replaces the high potential on the D input of flip-flop 1602 with a low potential. As described hereinafter, the office byte clock pulse is applied to lead BYTE CLK, toggling flip-flop 1602 to the "clear" condition, removing clamping signals from on lead ON, thus removing the initializing potentials from various logic circuits, as noted hereinafter. The register sender is now prepared to proceed through its various modes of operation.

Figure 9:
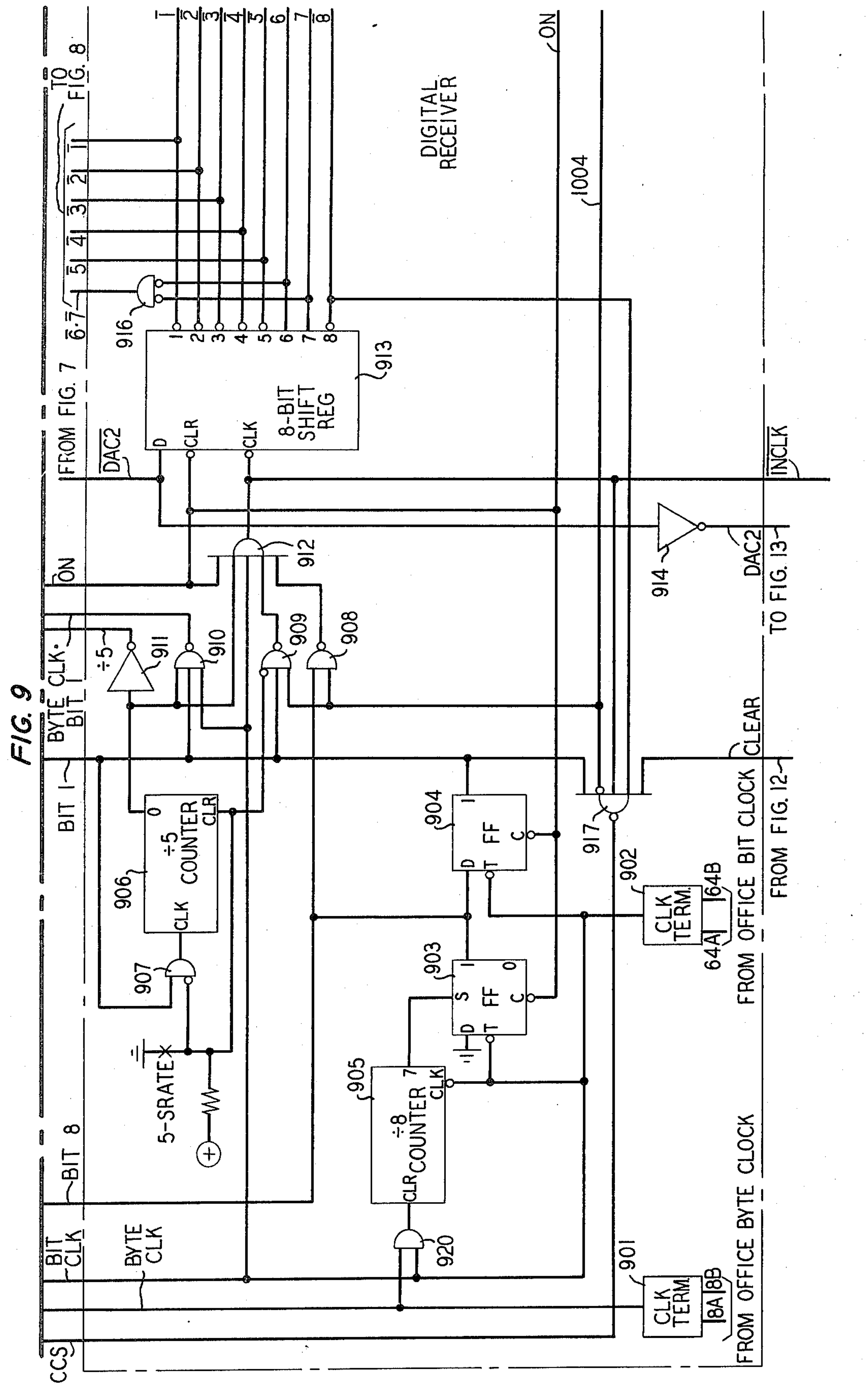

The register sender circuitry is clocked by timing signals derived from the office bit and byte clocks. The office bit clock (64 kbs) is derived from leads 64A and 64B (FIG. 9). This bit clock is passed to clock terminator circuit 902 which converts the clock to binary pulses having the waveform shown as waveform B in FIG. 4A of the Carney et al patent. The byte clock (8 kbs) is derived from leads 8A and 8B and passed to clock terminator 901 which converts the byte clock to binary pulses having the waveform shown as waveform A in FIG. 4A of the Carney et al patent. The output of the bit and byte clock terminators are applied to lead BIT CLK and BYTE CLK to distribute appropriate clocking signals through the register sender.

Leads BIT CLK and BYTE CLK are connected to AND gate 920 which, upon coincidence of the two clocks, clears 8-bit counter 905. The counter 905 is driven by the trailing edge of the bit clock and therefore counts the bits in each byte. After a count of seven, the output of counter 905 goes high. This high potential "sets" flip-flop 903 which applies, in turn, a high potential to the D input of flip-flop 904. (Note that the removal of the initializing potential from lead ON removed clamping voltages from the C inputs of flip-flops 903 and 904.) The high potential is also applied to lead BIT 8 to designate the 8th bit.

The trailing edge of the next bit clock pulse now toggles flip-flop 904 to the "set" condition and toggles flip-flop 903 back to the "clear" condition. The output of flip-flop 904 is connected to lead BIT 1 which designates the first bit of the byte. The next bit pulse then "clears" flip-flop 904 since flip-flop 903 has been "cleared."

The data from leads TR and TT (FIG. 7), extending from the line circuit by way of the link and connector circuit (and corresponding to similarly identified leads in FIG. 51 of the Jaeger et al patent) is passed to line terminator which converts the bipolar signals to binary. The incoming signals, now binary, are then passed to lead $\overline{DAC2}$. Lead $\overline{DAC2}$ is connected to the D input of 8-bit shift register 913 and to lead DAC2 by way of inverter 914 (FIG. 9).

AND gate 912, which is the clock input to 8-bit shift register 913, is controlled by five input leads. The first input lead, lead ON, is presently high as previously described. The second input lead is derived from counter 902 and is always high for high-rate line subscribers and is high for one out of five bytes for subrate subscribers.

In the event that the customer is a high-rate customer, relay 5-SRATE is released, as previously described. A high potential is inversely applied to AND gate 907 blocking the clock input to counter 906. Counter 906 cannot advance and is maintained in its initial count by the high potential on its "clear" input. The output of counter 906 is therefore high at all times.

If the customer is a subrate customer, relay 5-SRATE is operated, applying ground (inverted) to gate 907 and the gate is enabled. The other input lead of gate 907 is derived from lead BIT 1, which is high during the first bit of each byte. Counter 906 is therefore clocked by the BIT 1 pulse and, at the same time, the operation of relay 5-SRATE removes the clamp from the "clear" input of the counter. The counter therefore advances at the beginning of each byte. The output of counter 906 is high during one byte and low during the other four bytes. Thus, when a subrate subscriber is sending, counter 906 partially enables gate 912 during one of the five repetitive bytes and disables gate 912 during the other four bytes, whereas if a high-rate subscriber is connected, counter 906 partially enables gate 912 at all times.

Figure 14:
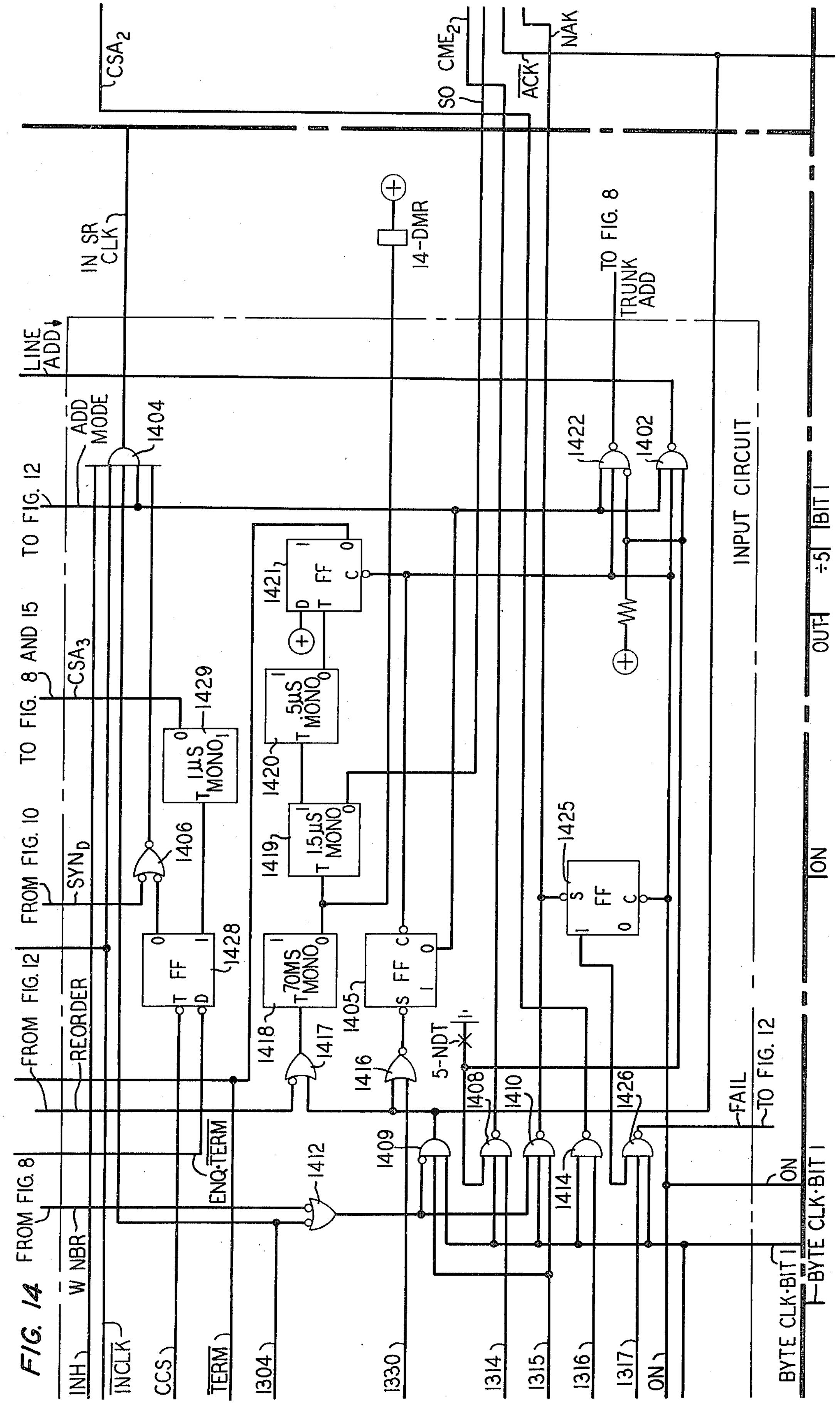
Figure 15:
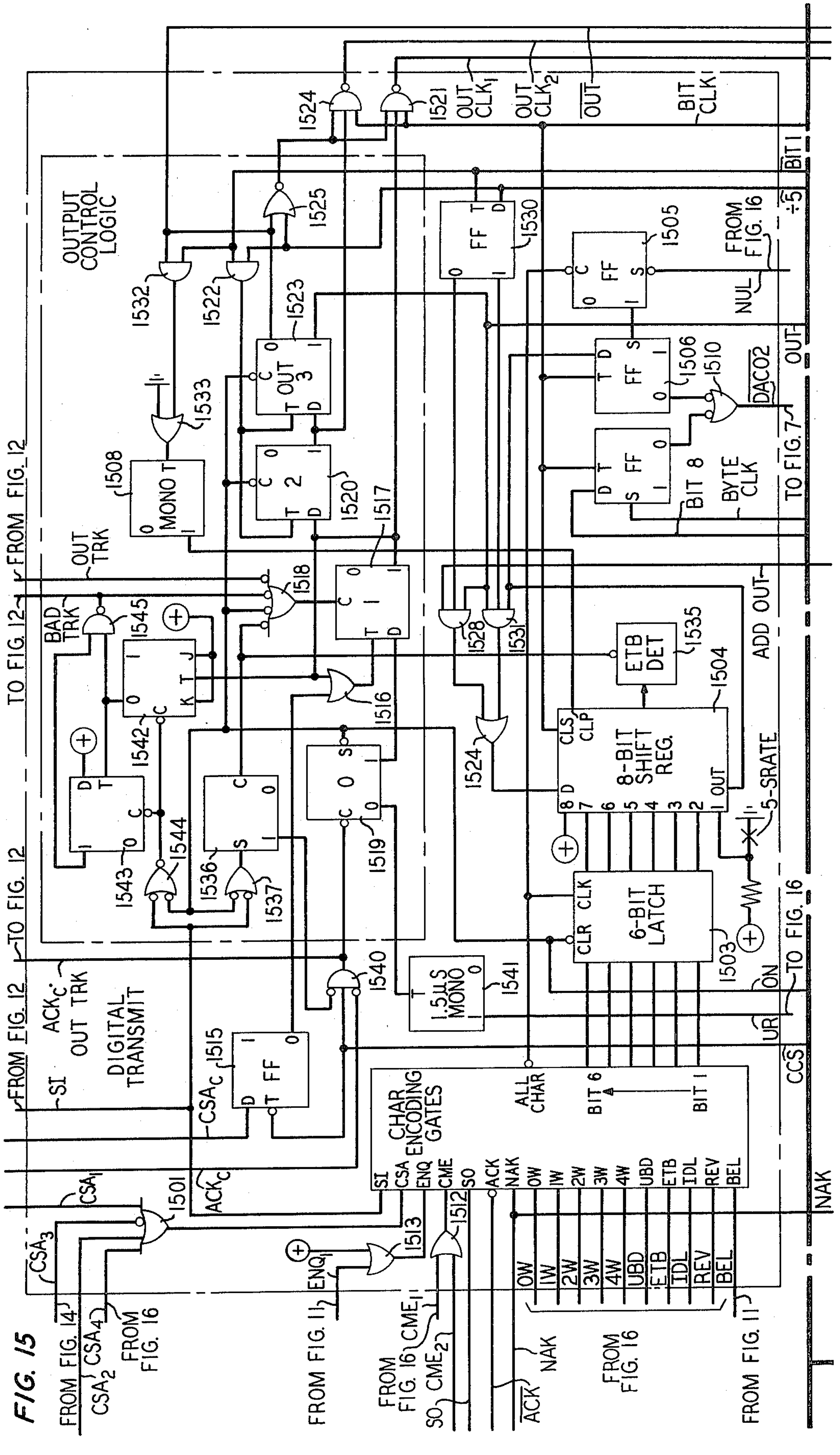

The fourth and fifth input leads of gate 912 are controlled by NAND gates 908 and 909. Both NAND gates 908 and 909 are, in turn, partially controlled by the output of NAND gate 1002 (FIG. 10) which is applied to lead 1004. When it is not a trunk call, relay 5-NDT is released, as previously described, whereby a positive potential is applied to one input of gate 1002. The other input of AND gate 1002 is derived from LINE ADD which is connected to the output of NAND gate 1402 (FIG. 14). After initialization, lead ON applies a high potential to one input of gate 1402, relay 5-NDT released permits application of a high potential to a second input of gate 1402 and, initially, as described hereinafter, lead ADD MODE is high, and the output of NAND gate 1402 is low. Gate 1002 is enabled by the low potential, passing a high potential to lead 1004 which enables both of NAND gates 908 and 909. AND gate 908 is connected to lead BIT 8 and goes low on BIT 8; NAND gate 909 is connected to the relay 5-SRATE contacts and to lead BIT 1 and goes low on BIT 1 if the subscriber is a subrate subscriber.

Returning to AND gate 912, the gate is enabled to pass the bit clock pulse on lead BIT CLK to lead $\overline{\text{INCLK}}$ and to the clock input of shift register 913 on bits 1 through 7 of every byte for the high-rate subscriber and on bits 2 through 7 of one of five successive bytes for the subrate subscriber. The 8-bit shift register 913 data input is derived from lead $\overline{\text{DAC2}}$. With lead ON up, the clamp is removed from the "clear" input of 8-bit shift register 913 and the clock input clocks in bits of the incoming data, stripping the eighth bit of the byte for high-rate subscribers and stripping the first and eighth bit of the byte for subrate subscribers (thus leaving only the information bits from the subscriber).

Figure 10:
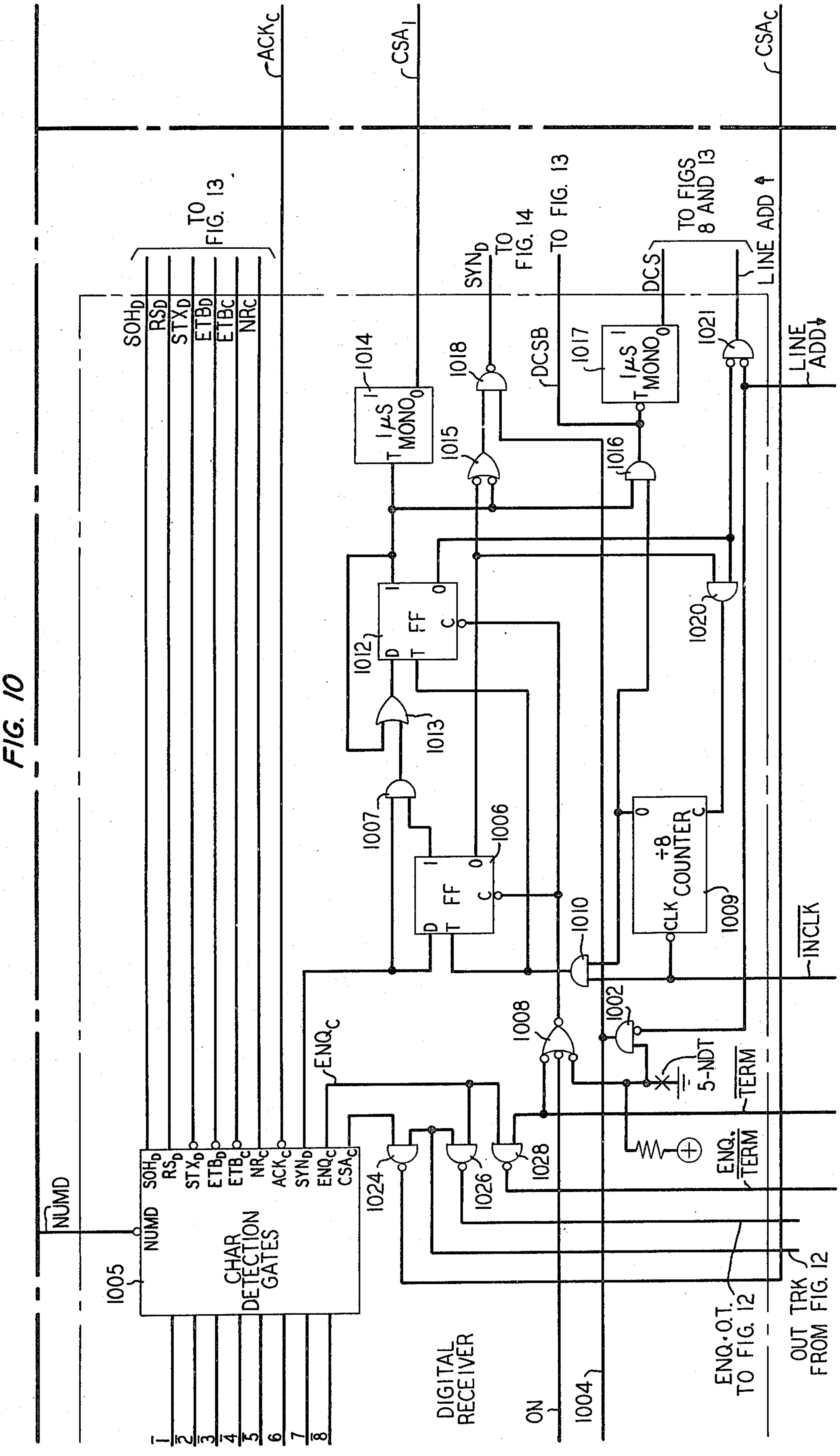

The outputs of various stages of 8-bit shift register 913 are applied in parallel to character detection gates 1005 (FIG. 10). The first character that the character detection gates look for is the data mode SYN character. When this character is received from the subscriber, character detection gates 1005 enable output terminal $SYN_D$ which places a high on the output lead connected thereto. This high enables AND gate 1007 and is also applied to the D input of flip-flop 1006.

Flip-flop 1006 was "cleared" during the initialization of the circuit by a low potential clamp, inverted, provided to the "clear" input by NOR gate 1008. After initialization, lead ON removes one low (inverted from high) from the input of NOR gate 1008. The second low (inverted) is from lead $\overline{\text{TERM}}$ which, as described hereinafter, was initialized high and the third low (inverted) is derived from the high potential obtained by relay 5-NDT, released as previously described. With all inputs low, the output of NOR gate 1008 is high, removing the clear clamp from flip-flop 1006 enabling it to respond to the toggle input.

The toggle input of flip-flop 1006 is derived from lead $\overline{\text{INCLK}}$ carrying the clock pulse input of 8-bit shift register 913 gated with the output of divide-by-8 counter 1009. Divide-by-8 counter 1009 is initially cleared enabling gate 1010, passing the $\overline{\text{INCLK}}$ clock pulses through AND gate 1010 to the toggle input of flip-flop 1006. Flip-flop 1006 is "set," partially enabling AND gate 1007.

Assume that two successive SYN characters are received from the subscriber. The second character again raises the potential on input terminal $SYN_D$ of character detection gates 1005. The AND gate is now fully enabled and a high potential is applied via OR gate 1013 to the D input of flip-flop 1012. The $\overline{\text{INCLK}}$ clock pulse now toggles flip-flop 1012 to the "set" condition.

The "setting" of flip-flop 1012 provides a high potential at the 1 output and this is passed through OR gate 1013 back to the D input of the flip-flop maintaining the flip-flop in the "set" state. Thus, the toggling of flip-flop 1012 to the "set" condition indicates that two successive SYN characters have been received.

The "setting" of flip-flop 1012 applies a positive transition to the input of one microsecond monopulser 1014 and applies a high potential to an input of AND gate 1016 and a high potential, inverted, to an input of OR gate 1015.

Initially, with flip-flops 1006 and 1012 "cleared," AND gate 1020 is enabled providing a high clamp to the "clear" input of divide-by-8 counter 1009 and the counter is maintained in its "clear" or initial state. In this state, the counter output is maintained high enabling gate 1010. When flip-flop 1006 is "set," as previously described, gate 1020 is disabled removing the clamp from counter 1009 and enabling divide-by-8 counter 1009.

Divide-by-8 counter 1009 is driven by the clock pulse on lead $\overline{\text{INCLK}}$, inverted, and counter 1009 advances concurrently with the clocking of the information bits into shift register 913. It is recalled that for the subrate customer there are six clock pulses corresponding to six information bits in each byte and for the high-rate customer there are clock pulses corresponding to seven information bits in each byte. In either event, incoming data information, in the form of 8-bit ASCII characters, is assembled by the OCU into the information bits of 8-bit bytes. Accordingly, a complete ASCII character is shifted in after eight $\overline{\text{INCLK}}$ pulses. The first pulse starts the advance of counter 1009, its output goes low disabling gate 1010. After eight clock pulses (the next ASCII character is fully shifted in register 913), counter 1009 is reset to re-enable gate 1010.

Return now to the "setting" of flip-flop 1012. The positive potential back through OR gate 1013 locks the flip-flop in the "set" condition. With flip-flops 1006 and 1012 set, gate 1016 connected to the output of the divide-by-8 counter 1009 is enabled. Consequently, each eighth clock pulses input to the 8-bit shift register 913 is converted to a positive pulse by divide-by-8 counter 1009 and is passed through this enabled gate 1016 to lead DCSB and to one microsecond monopulser 1017. At the trailing edge of this pulse, monopulser 1017 provides a negative sample pulse to lead DCS. It is also noted that OR gate 1015 is enabled when either flip-flop 1006 is "set" or flip-flop 1012 is "clear," passing a high condition to gate 1018. The other input to NAND gate 1018 is provided by lead 1004 (connected to gate 1002( which is high as previously described. Consequently, gate 1018 provides a low output potential to lead $SYN_D$ when the register sender is seized (relay 5-NDT operated and flip-flop 1012 "clear") and the low potential is maintained when the first SYN character is detected (flip-flop 1006 "set"), the low potential being removed when a character other than the SYN character is received and flip-flop 1006 returns to the "clear" with flip-flop 1012 maintained in the "set" condition.

Return now to the pulse on lead CSA1. This initiates the generation of the "proceed-to-dial" characters for transmission back to the subscriber. The CSA1 lead is connected through OR gate 1501 (FIG. 15) to the CSA input terminal of character encoding gates 1502 in the digital transmitter. The pulsing of this particular input port of character encoding gates 1502 provides a permutation of bits at output leads BIT 1 through BIT 6 which constitute bits 2 through 7 of the "proceed-to-dial" character. These bits are applied to 6-bit latch 1503. At the same time character encoding gates 1502 generate a pulse at output terminal ALL CHAR to clock the six bits into 6-bit latch 1503. The 6-bit latch thereupon impresses six bits onto stages 2 through 7 of 8-bit shift register 1504 in the digital transmitter. At the same time "all character" pulse from character encoding gates 1502 "clears" flip-flop 1505 and the flip-flop removes a "setting" clamp from the set input of flip-flop 1506.

The eighth stage of 8-bit shift register 1504 has a positive potential maintained thereon to normally impress 1 bits on the stage. This designates that the "proceed-to-dial" character is a control character. The first stage of the shift register is connected (inverted) to a high potential and to ground via make contacts of relay 5-SRATE. Accordingly, if a high-rate subscriber has seized the register sender, relay 5-SRATE is released and a 0 bit is inserted in the first stage, whereas, when a subrate customer seizes the register sender, relay 5-SRATE is operated and a 1 bit is inserted in the first stage of the shift register. The insertion of the 1 or 0 bit in accordance with the rate of the subscriber is a signaling requirement, the 0 or 1 designating the rate of the subscriber.

At the first bit interval of the office byte, a pulse appears on lead BIT 1. This pulse is, as detailed hereinafter, applied to monopulser 1508 which generates a pulse passed to the CLP input terminal of 8-bit shift register 1504. This loads the six bits from 6-bit latch 1503, the 1 bit applied to the first stage and the 0 bit applied to the eighth stage into 8-bit shift register 1504. Serial clocking is now supplied by lead BIT CLK and the 8-bit "proceed-to-dial" character is shifted out to the D input of flip-flop 1506. The bits are then toggled into flip-flop 1506 by the bit clock pulses on lead BIT CLK and passed by way of OR gate 1510 to output lead $\overline{\text{DACO2}}$.

Figure 7:
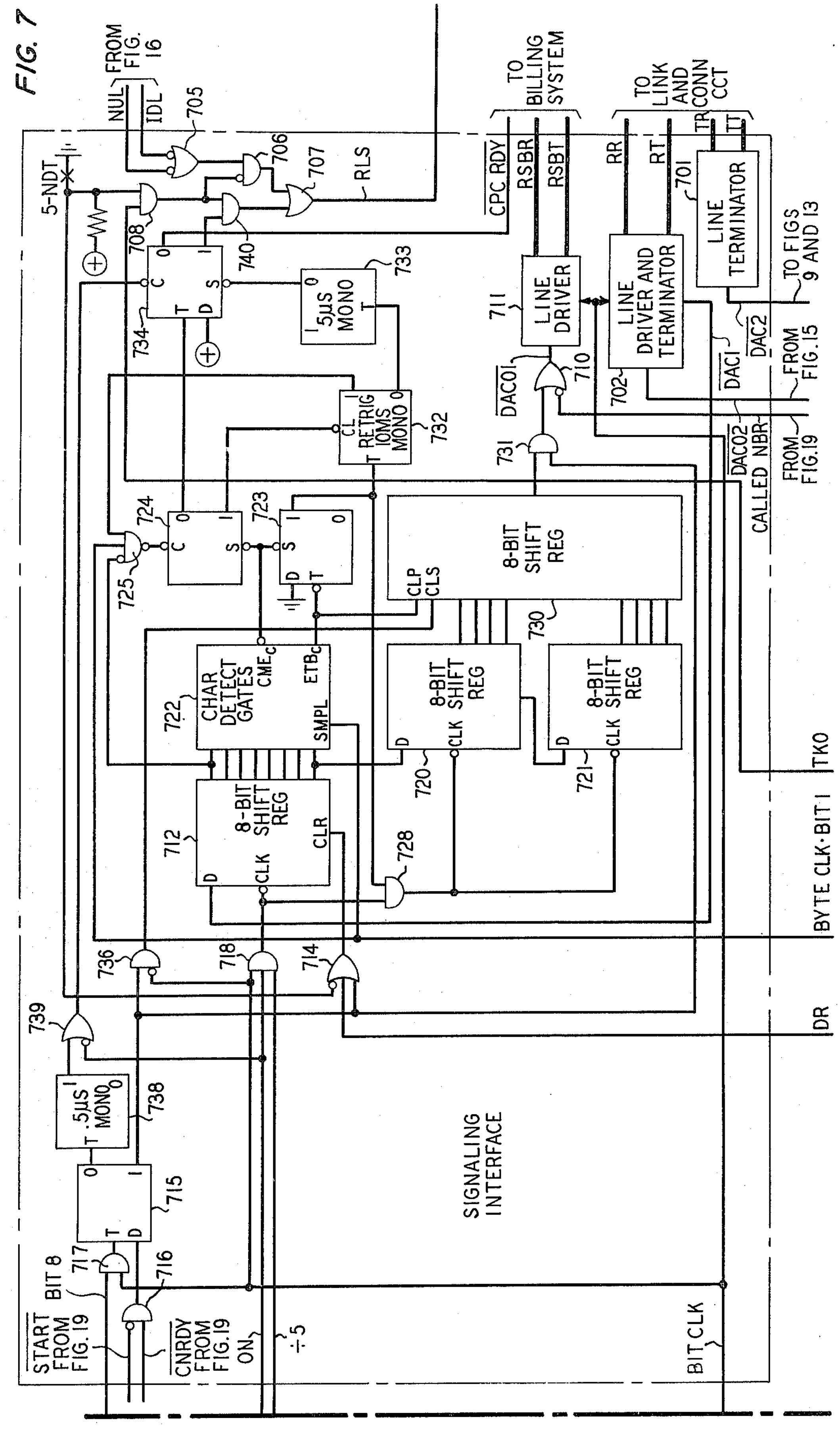

The "proceed-to-dial" character on lead $\overline{\text{DACO2}}$ is passed on to line driver and terminator 702 in the interface circuit (FIG. 7). The bits are converted by the driver portion to bipolar pulses and applied to the RR and RT leads, which extend through the link and connector circuit back to the line circuit which is now transparent, as previously described, permitting the "proceed-to-dial" character to be sent to the subscriber.

The "proceed-to-dial" character bits impressed on 8-bit shift register 1504 are maintained impressed on the register. As a consequence, upon the generation of the next clock pulse on lead BIT 1, the character bits are again loaded into 8-bit shift register 1504 and then clocked out in the same manner as previously described. Thus, in the present condition of the digital transmitter, the "proceed-to-dial" character is repetitively generated and transmitted to the line circuit.

When the subscriber receives the "proceed-to-dial" code, indicating that the register sender has been seized, he sends the characters designating the number of the addressee. These characters are successively received by the line circuit and passed to the link and connector circuit, as previously described, and received by line terminator 701. The characters are converted to binary bits and applied to lead $\overline{\text{DAC2}}$ and then passed to 8-bit shift register 913 in the digital receiver, the bits being clocked into the shift register in the same manner as previously described. Therefore, for the high-rate customer the eighth bit of each byte is stripped and the remaining information bits loaded into 8-bit shift register 913 until the register is full, whereas, for the subrate subscriber, the first and eighth bit of each fifth byte is stripped and the remaining bit information loaded into 8-bit register 913 until the register has been filled with the character, all being previously described in detail.

With 8-bit shift register 913 loaded, the output bits are passed to character detection gates 1005, as previously described, and are also passed through leads $\overline{1}$ through $\overline{5}$ to steering gates 809 (FIG. 8) in the block check circuit. We have presumed that this is a line call and lead LINE ADDRESS is presently "low," and flip-flop 1012 is presently "set" providing a low to the 0 output, as previously described. Both these lows are applied, inverted, to AND gate 1021 in the digital receiver resulting in a high potential on lead LINE ADD. This enables steering gates 809 to gate the signals on lead $\overline{1}$ to $\overline{4}$ to 1-out-of-10 decoder 810 which in turn energizes a selected 1-out-of-10 output lead as defined by the digit number in the four leads. This digit number is then converted by 2-out-of-5 gates 811 to a 2-out-of-5 permutation which is applied via the five output leads of gates 811 to stages 2 through 6 of 8-bit shift register 812. Ground is applied to stages 1, 7 and 8 in shift register 812.

The incoming address digit in 8-bit shift register 913 in the digital receiver is also passed to character detection gates 1005 which, from an examination of bits 5, 6 and 7, determines that a digit number in fact has been received. Character detections gates 1005 thereupon energize output lead NUMD, applying a low potential to the lead. At the same time (i.e., the end of the character) counter 1009 completes its cycle and pulses gate 1016 since flip-flop 1012 is "set." This operates monopulser 1017 at the termination of the pulse, passing a negative pulse to lead DCS. When both leads NUMD and DCS are simultaneously negative, AND gate 815 (FIG. 8) in the block check circuit is enabled to pass a positive pulse through OR gate 816 to partially enable AND gate 817. The second input lead for AND gate 817 comprises lead INH.

Lead INH is controlled by the inhibit logic flip-flop 1301 (FIG. 13) in the input circuit. Inhibit logic flip-flop 1301 normally applies a high or enabling potential to lead INH. It is a function of the flip-flop to examine output leads RSD and SOHD of character detection gates 1005 in the digital receiver. The system permits a subscriber to insert in the address a group of characters, headed by the "start-of-header" (SOH) character and terminated by the "RS" character, which group does not contain address information. Upon recognition of the "start-of-header" character, lead SOHD is energized to apply a high condition to the J input of flip-flop 1301 which is toggled to the "set" condition by the pulse on the DCS lead. This lowers the potential on the 1 output of the flip-flop and this low condition is passed to lead INH to disable AND gate 817 in the block check circuit. When the "RS" character is received, a high potential on lead RSD (from character detection gates 1005) is applied to the K input of flip-flop 1301, restoring the flip-flop to the "clear" state to reapply the high potential to lead INH to re-enable AND gate 817 in the block check circuit.

At this time the third input lead of AND gate 817 is normally enabled by flip-flop 818 "set" by the initializing potential on lead ON. Accordingly AND gate 817 is enabled to pass the DCS pulse from gate 815 to the CLP input terminal of 8-bit shift register 812. The 2-out-of-5 digits from decoding gates 811 (and the 0 bits) are thereby loaded into the several stages of the 8-bit shift register 812.

Figure 13:
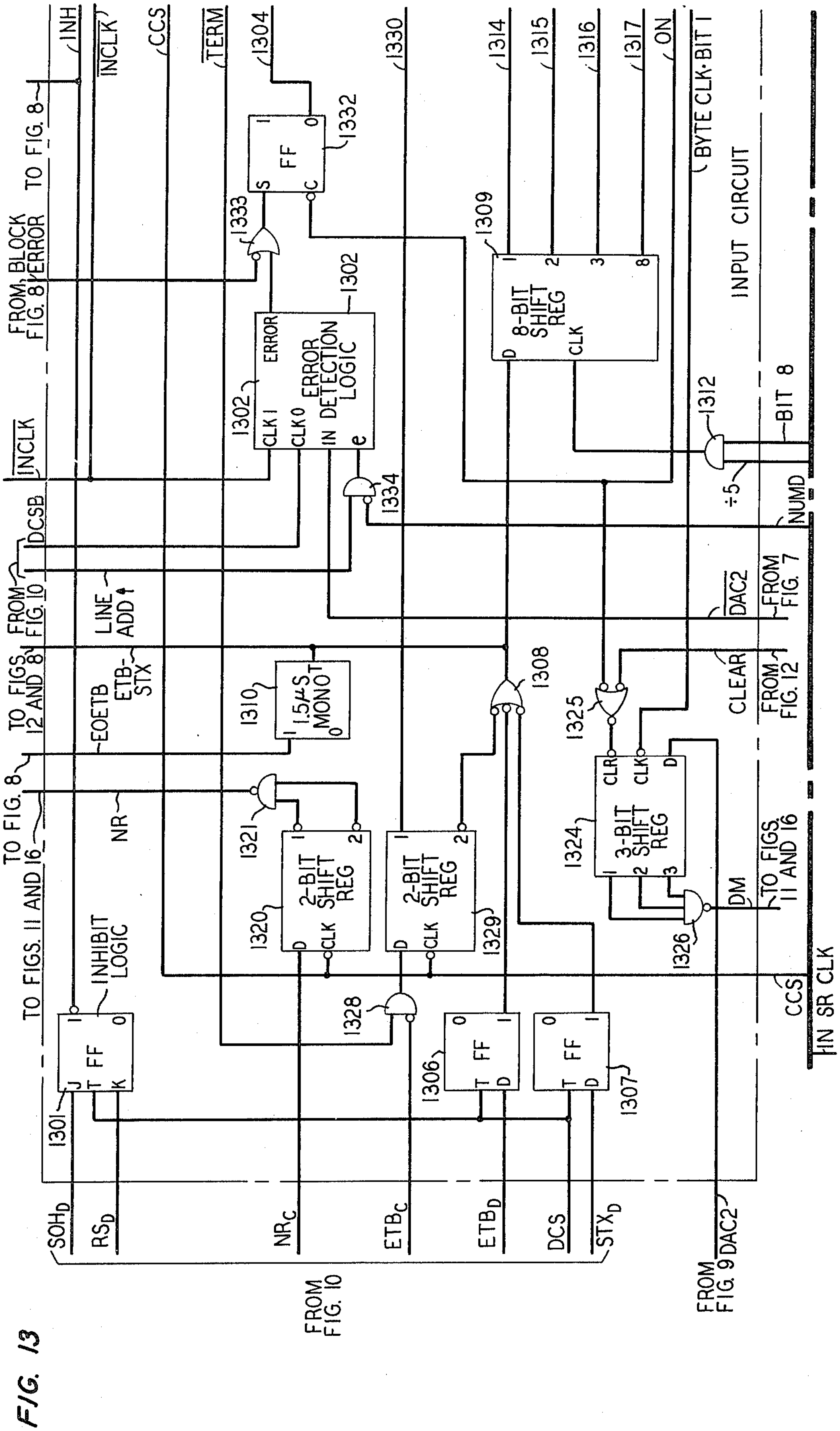

The serial clocking for 8-bit shift register 812 is derived from the clocking input to 8-bit shift register 913 of the digital receiver. This clocking signal, on lead $\overline{INCLK}$, extends to multiple AND gate 1404 (FIG. 14) in the input circuit. A first input lead to AND gate 1404 is connected to lead INH which, as previously described, normally provides an enabling signal. A second input lead to AND circuit 1404 is connected via lead 1304 to the 0 output of flip-flop 1332 (FIG. 13).

Flip-flop 1332 is jointly controlled by the output of error detection logic 1302 and the potential on lead BLOCK ERROR. The flip-flop, which is normally cleared by the initializing potential on lead ON, is "set" by a low potential on lead BLOCK ERROR inverted and applied through OR gate 1333 to the "set" input of flip-flop 1332. Lead BLOCK ERROR is normally high, however, as described hereinafter. In addition, flip-flop 1332 may be "set" by a high potential output of error detection logic 1302 also applied through OR gate 1333.

Error detection logic circuit 1302 constitutes a standard parity error check circuit. This circuit is enabled to operate by a high potential applied to its input E terminal. This high potential is provided by gate 1334 which is enabled by a high potential on lead LINE ADD and a low potential on lead NUMD, which leads are presently in these conditions as previously described. The incoming bits of the digit number being applied to error detection logic 1302 are presently appearing on lead $\overline{DAC2}$ as previously described, and is clocked into error detection logic 1302 by the clocking pulses on lead $\overline{INCLK}$. At the instant the pulse is received on lead DCSB which pulse, as previously described, is derived from gate 1016 in the digital receiver once per byte in synchronism with the customer's data, an appropriate energizing output is generated by error detection logic circuit 1302. This output constitutes the application of a negative potential to output terminal ERROR when there is no parity error (for example, when there is an odd number of bits for an odd parity scheme) and a positive potential when there is parity error. Thus, digits received with the correct parity enable error detection logic 1302 to apply a negative potential to OR gate 1333 and flip-flop 1332 is maintained in its initial clear condition, this applies an enabling potential via lead 1304 to the second input of AND gate 1404.

The third input lead for gate 1404 is connected to lead ADD MODE which extends from the output of address mode flip-flop 1405. Flip-flop 1405 was initially cleared by the initializing potential on lead ON and thereafter, at this time, applies an enabling potential to lead ADD MODE. The fourth input lead to AND gate 1404 extends to NOR gate 1406 whose output is low when the register sender is detecting control mode ENQ characters, as described hereinafter, or data mode detection SYN characters. The control mode ENQ character detection results in the setting of flip-flop 1428, as described hereinafter; and the detection of the SYN character results in the application of a low potential to lead $SYN_D$, as previously described. Since neither of these conditions exist, lead $SYN_D$ is high, flip-flop 1428 is "clear" and OR gate 1406 is applying an enabling potential to the fourth input of AND gate 1404.

AND gate 1404 is therefore fully enabled and clock pulses on lead $\overline{INCLK}$ is passed through to lead IN SR CLK to the CLS input terminal of 8-bit shift register 812 of the block check circuit. Accordingly, the 2-out-of-5 digit (in 8-bit form) is clocked to output lead IN-DATA and passed to AND gate 1801 (FIG. 18) in the digit store.

The other input to AND gate 1801 is provided by lead $\overline{OUT}$. As described hereinafter, the present mode of the register sender, lead $\overline{OUT}$ has an enabling potential applied thereto. Accordingly, AND gate 1801 is enabled and the data on lead IN DATA is passed through and via OR gate 1802 to lead IN.

Lead IN is connected to the D input of 56-stage register 1901 (FIG. 19) thus passing the digits from shift register 812 to the serial input of shift register 1901. Lead IN SR CLK is passed through OR gate 1902 to input terminal CLK of shift register 1901 to clock in the 2-out-of-5 character digit as it is clocked out of register 812.

For each succeeding digit from the subscriber, the same translation is made and clocked into the 56-stage register 1901, shifting along each of the previously translated digits. The address constitutes seven digits and when the complete address has been received, the 56-stage register is presumably full.

After receiving the appropriate number of digits, which in accordance with the present embodiment constitutes seven digits, code character "ETB" is presumably received from the subscriber. Alternately, code character "STX" may be received. In either event the code character is received by the shift register 913, as previously described, and applied to character detection gates 1005. Output lead STXD or ETBD is thereby negatively energized. These leads extend to the D inputs of flip-flops 1306 and 1307 in the input circuit (FIG. 13). The pulse on lead DCS, which pulse occurs at the end of the character, as previously described, is applied to the toggle inputs of these flip-flops. Therefore, if code character "ETB" or "STX" is received, one or the other flip-flop is toggled to the "clear" condition. A low condition is thereby applied (inversely) to OR gate 1308 which provides in response thereto a high condition to lead ETB-STX. This lead is connected to the D input of 8-bit shift register 1309. The positive transition on lead ETB-STX operates the 1.5 microsecond monopulser 1310 and a resultant pulse is applied by the monopulser to lead EOETB.

Clocking is provided for 8-bit shift register 1309 by AND gate 1312. One input to AND gate 1312 is lead BIT 8 and the other input to AND gate 1312 is connected to lead 5. Lead 5 is connected to the output of 5 counter 906 by way of inverter 911. Accordingly, lead 5 is maintained high when the register sender is connected to a high- rate subscriber and goes high for one-byte-out-of-5 when the register is connected to a subrate subscriber. While this lead is high, gate 1312 is enabled to pass the 8th bit pulse which clocks in a bit into the first stage of register 1309 due to the high condition provided by the OR gate 1308 to the D input. Thereafter, for each office byte interval (or each 5th office byte interval) a clock or shift pulse is applied to 8-bit shift register 1309, shifting the bit from the first stage through the other seven stages.

The output of the first stage of register 1309 is connected via lead 1314 to the NAND gate 1408 (FIG. 14), partially enabling the gate when the one bit is in the first stage. The second input extends to contacts of relay 5-NDT and, since it is a line call, relay 5-NDT is released and a high potential is presently being applied to the lead. Gate 1408 is therefore enabled, passing a pulse from lead BYTE CLK BIT 1. Lead BYTE CLK BIT 1 originates in the digital receiver, coming from the output of NAND gate 910. This gate examines the coincidence of the pulse on lead BIT 1, the pulse on lead BIT CLK and the output of divide-by-5 counter 906. Accordingly, a bit clock pulse is provided to BYTE CLK BIT 1 during the first bit of each byte for high-rate subscribers and for one-byte-in-five for low-rate subscribers.

The BYTE CLK BIT 1 pulse, inverted is now passed, by gate 1408 to lead CME2 to enable the digital transmitter to generate and send out the "CME" character to the line circuit as the first character in the ACK or NAK sequence. The pulse on lead CME2 is passed by OR gate 1512 to input terminal CME of character encoding gates 1502. Character encoding gates 1502 thereupon generates the bits of the character "CME," applying them to latch 1503 and as previously described, a byte with the information bits in the latch is formed by shift register 1504 and transmitted to the line circuit by way of the link and connector circuit.

After the transmission of the "CME" character, shift register 1309 is clocked to advance the bit therein to the second stage.

The output of the second stage is connected via lead 1315 to AND gate 1409 and NAND gate 1410. These gates are also connected to OR gate 1412. If there is a parity error in a digit, error detection logic 1302 "sets" flip-flop 1332 which provides a low potential (inverted) to gate 1412. If the subscriber sent the wrong number of digits, a negative potential is applied to lead W No. and passed to OR gate 1412, as described hereinafter. In either event, gate 1410 is enabled and gate 1409 is disabled. Gate 1410 thereupon passes the BYTE CLK BIT 1 pulse, inverted to lead NAK.

Conversely, if there is neither a wrong number of digits nor an error, the output of OR gate 1412 is low, gate 1409 is enabled and gate 1410 is disabled. The BYTE CLK BIT 1 $\overline{\text{pulse}}$ is now passed through gate 1409 to output lead $\overline{\text{ACK}}$.

Lead NAK is connected to the NAK input terminal of character encoding gates 1502 and lead $\overline{\text{ACK}}$ is conversely connected to the ACK input terminal. Accordingly, the pulsing of one or the other of these leads results in the generation of the NAK or ACK character which is the second character in the character sequence lead sent to the subscriber.

The third stage output of 8-bit shift register 1309 is connected via lead 1316 to gate 1414. When the one bit is shifted to this third stage, the gate 1414 is enabled and passes the pulse on lead BYTE CLK BIT 1 to output lead CSA2. Lead CSA2 similarly extends via OR gate 1501 to the CSA input terminal of character encoding gate 1502, resulting in the generation and transmission of the code character "CSA." That ends the sequence of characters returned to the subscriber if an ACK sequence is sent.

Figure 8:
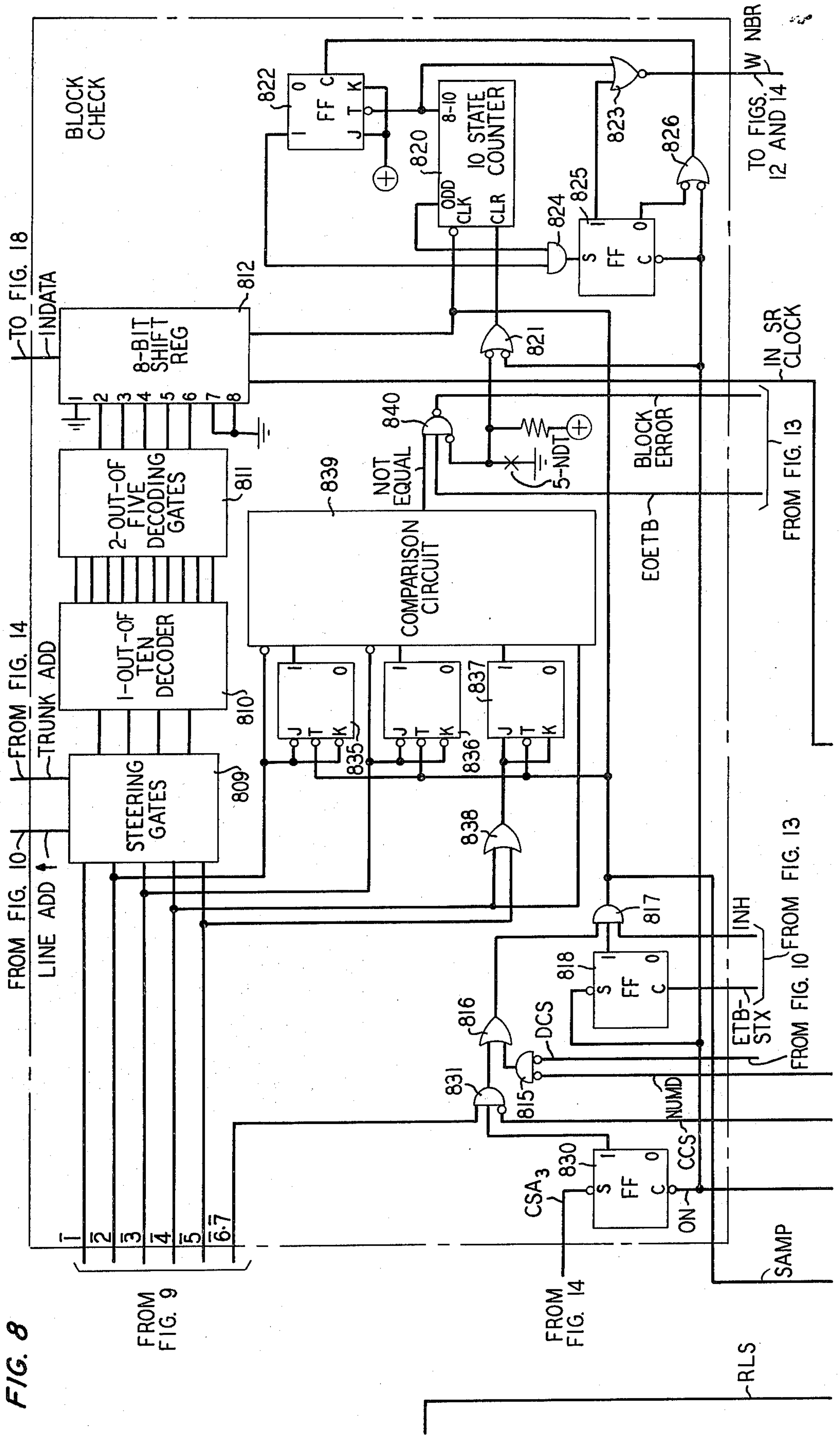

The wrong number digit count is provided by 10-state counter 820 in the block check circuit (FIG. 8). The initializing signal on lead ON applied through OR gate 821 previously cleared the 10-state counter 820. Thereafter, as each digit number is received, a digit number pulse is provided by the output of AND gate 817 as previously described. The trailing edge of this pulse also advances 10-state counter 820.

One output from 10-state counter 820 is derived from the output terminal 8-10 which is connected to the toggle input of flip-flop 822 and to an input of NOR gate 823. If the number of digits received does not exceed seven, this terminal is maintained low, the flip-flop is not toggled and the NOR gate output to lead W is normally high.

Assume now that more than seven but less than eleven digits are received. The 10-state counter is therefore advanced to at least the count of eight. Output terminal 8-10 goes high and NOR gate 823 provides a negative potential to lead W. This condition indicates the reception of the incorrect number of digits. Upon the reception of an eleventh digit, however, terminal 8-10 goes negative, toggling flip-flop 822 to the "set" condition. The setting of the flip-flop enables one input lead to AND gate 824. The 10-state counter 820 is also provided with an odd number output terminal which goes high upon the attainment of any odd number. Gate 824 is therefore enabled "setting" flip-flop 825 which was previously cleared by the initializing circuit. This passes a high output to OR gate 823 and the W No. lead is therefore maintained low. At the same time the "setting" of flip-flop 825 provides from its 0 output terminal a negative condition to OR gate 826 which clears flip-flop 822. (Note that the initializing circuit also clears flip-flop 822 via OR gate 826.)

During the generation of the ACK sequence, the ACK gate 1409 is pulsed and this pulse passed to lead $\overline{\text{ACK}}$ is also passed to OR gate 1417 and NOR gate 1416. The pulse passed to NOR gate 1416 sets flip-flop 1405 at the output thereof. This flip-flop as previously described aided in setting the register-sender in the line address mode. With the flip-flop now set, line address gate 1402 is disabled and lead LINE ADD has positive potential restored to take the register sender out of the line address mode. At the same time clock gate 1404 is disabled by flip-flop 1405 to terminate the pulses on lead IN SR CLK.

The pulse passed to OR gate 1417 toggles 70 millisecond monopulser 1418. This momentarily operates the relay 14-DMR. This in turn operates relay 5-DMST (FIG. 5) and relay 5-DMST locks via break contacts of relay 5-DR. Relay 5-DMST operated connects lead SBB to STB and lead SBA to STA (FIG. 6) all leads extending to the decoder marker connector and applies ground to leads TM and LCB also extending to the decoder marker connector, all of the leads being similarly identified in FIG. 59 of the Jaeger et al patent.

Figure 20:
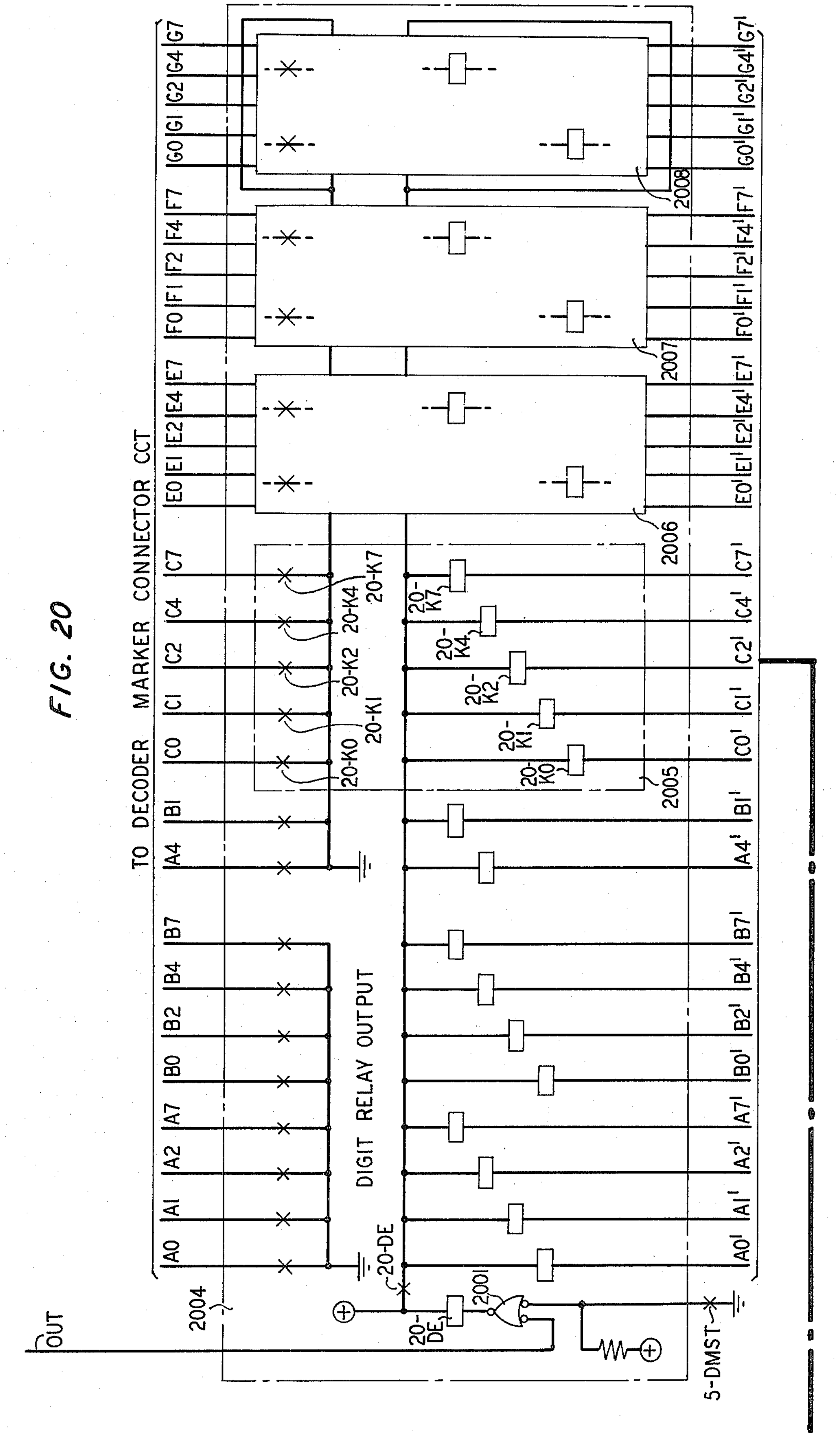

Relay 5-DMST operated also applies a ground, inverted, to OR gate 2001 in the digit relay output circuit (FIG. 20). OR gate 2001, in turn, applies current to the digit enabled relay 20-DE. The operation of relay 20-DE applies positive potential to the digit store relays such as relay 20-KO, 20-K1 et cetera As a consequence, the digits stored in the 56-bit shift register 1901 are now passed via leads such as leads CO′, C1′, C2′, C4′ and C7′, and inserted in the digit relays, such as relays K0 K1, K2, K4 and K7, in accordance with the two-out-of-five code. The operation of these digit relays close corresponding contacts, passing ground to appropriate output leads A0 through A7, B0 through B7, et cetera. These leads extend to the decoder marker connector circuit and correspond to similarly identified leads in FIG. 62 of the Jaeger et al patent.

These operations have the effect of summoning the marker to accept the address digits stored in the register sender and passing the digits to the marker. The register now enters the terminating phase of the call setup.

When the 70 millisecond monopulser 1418 times out, 1.5 millisecond monopulser 1419 is fired. This supplies a negative pulse to lead SO which extends to input terminal SO of character encoding gates 1502. This impresses the bits of the SO character on 6-bit latch 1503. The SO character is thus loaded into 8-bit shift register 1504 in the digital transmitter and the character will be repetitively transmitted. This, as previously described described, blinds the line circuit to preclude it from sending further characters to the register sender.

The pulse of 1.5 monopulser 1419 also fire 0.5 monopulser 1420. This toggles flip-flop 1421 applying a negative condition to output lead TERM designating the entering of the terminating phase.

Figure 12:
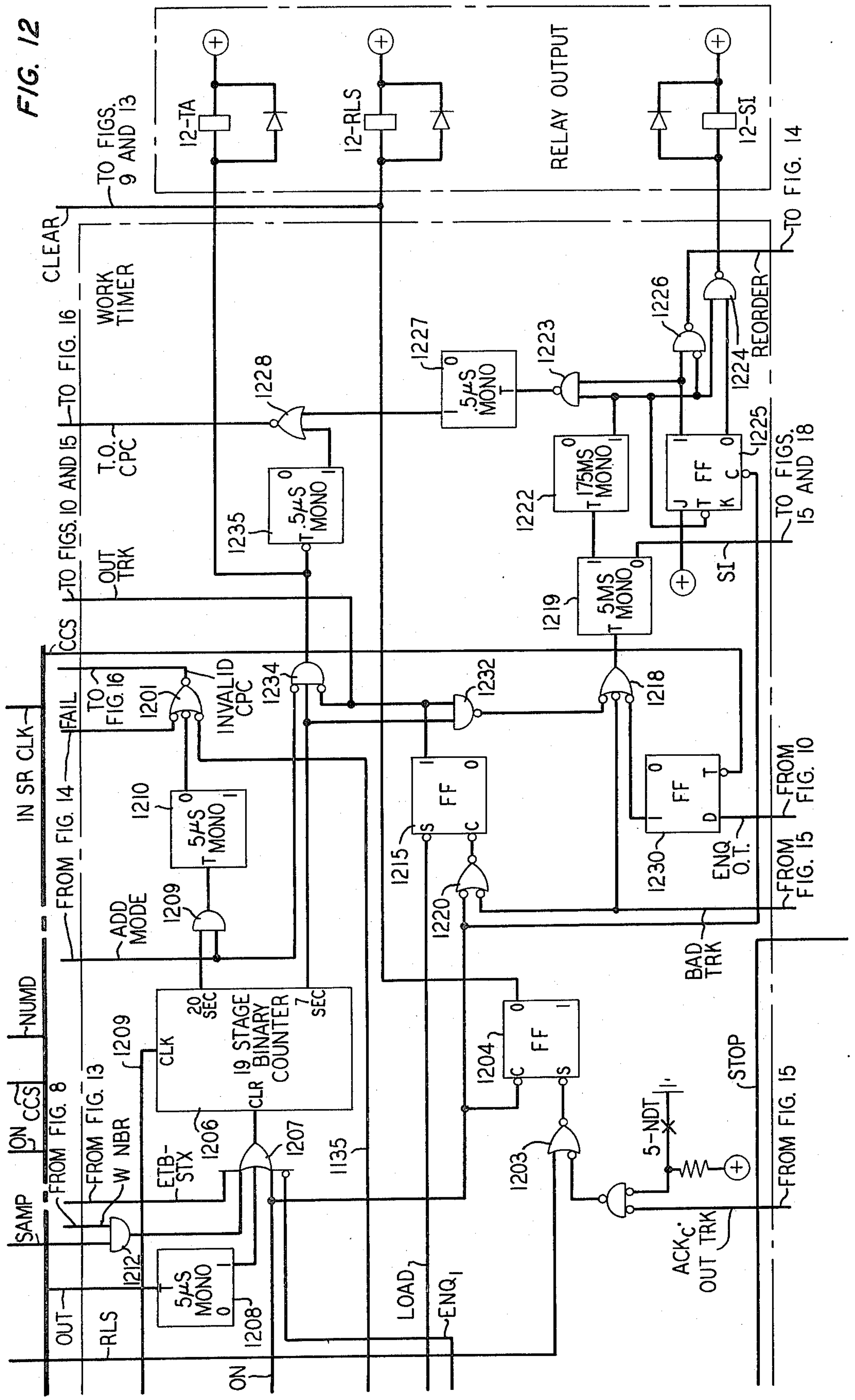
Figure 16:
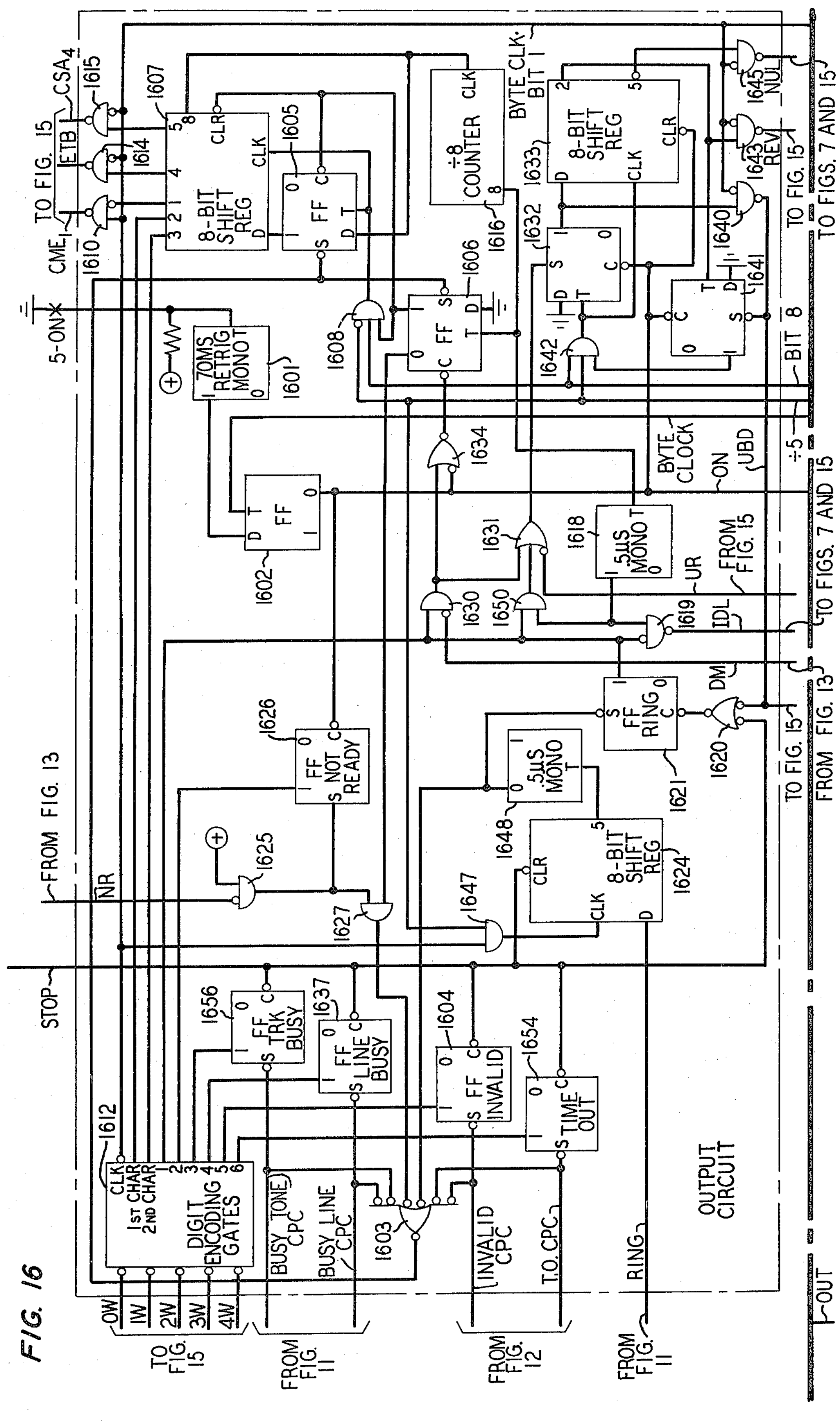
Figure 17:
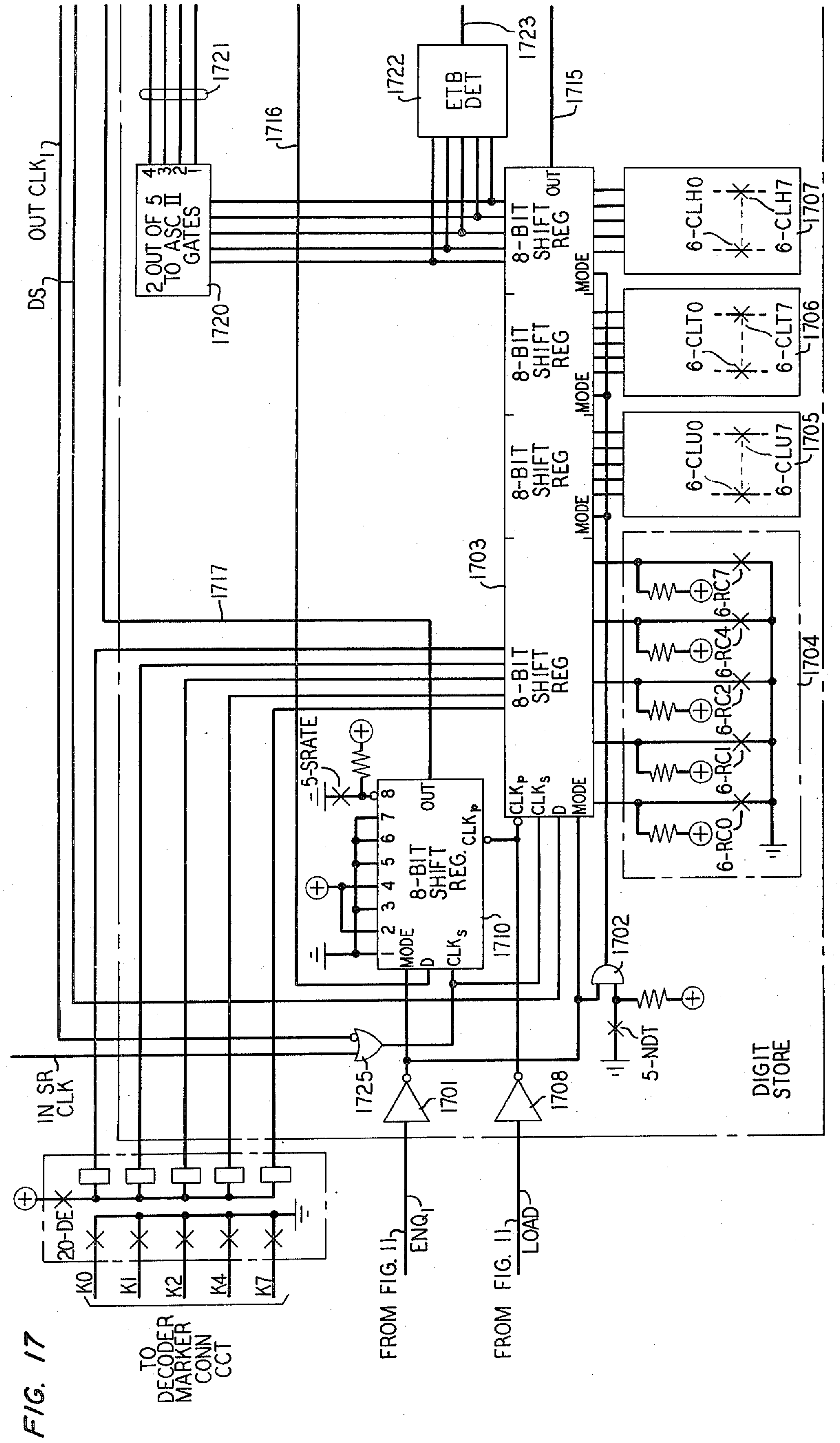
Figure 18:
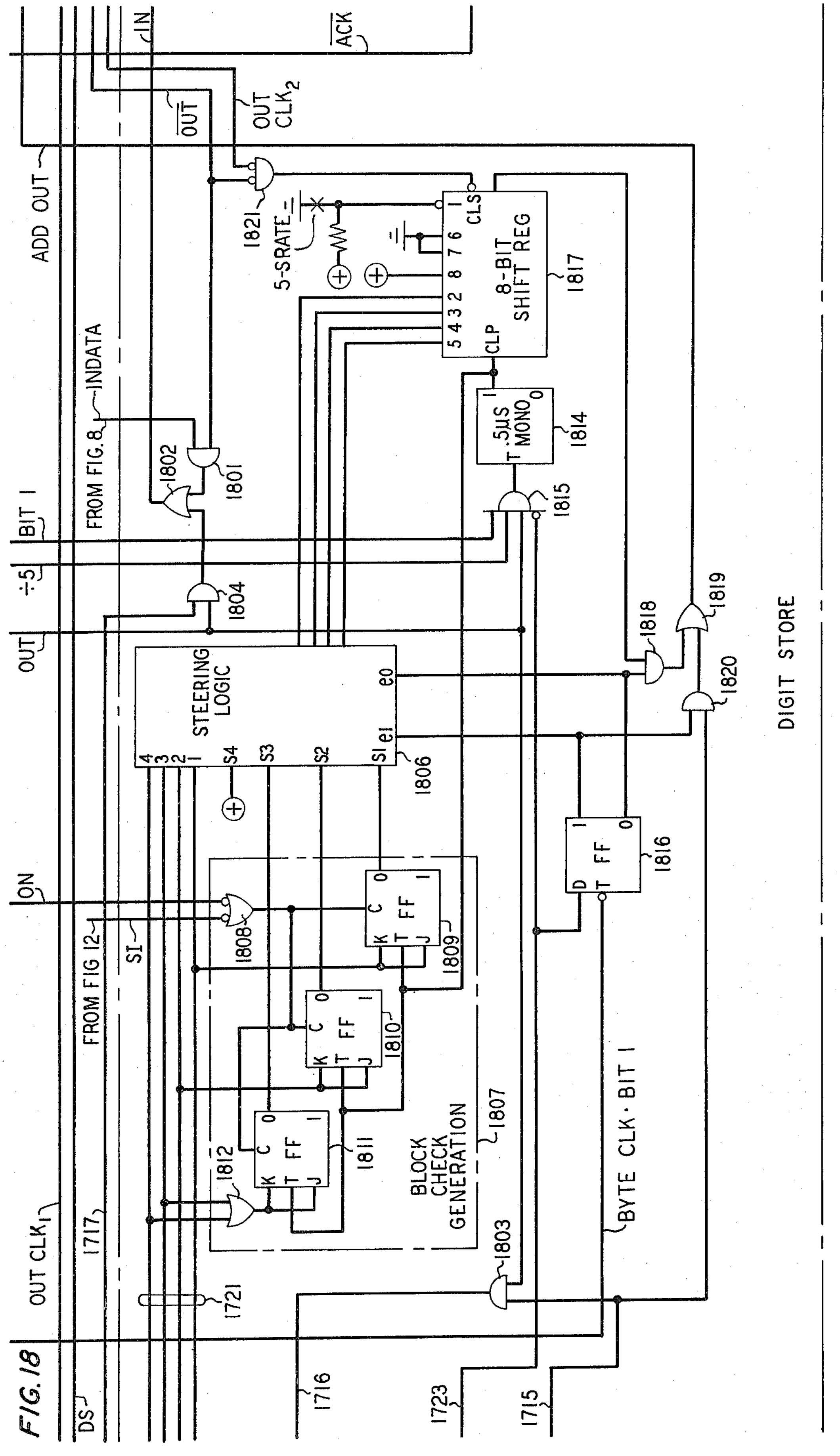
Figure 19:
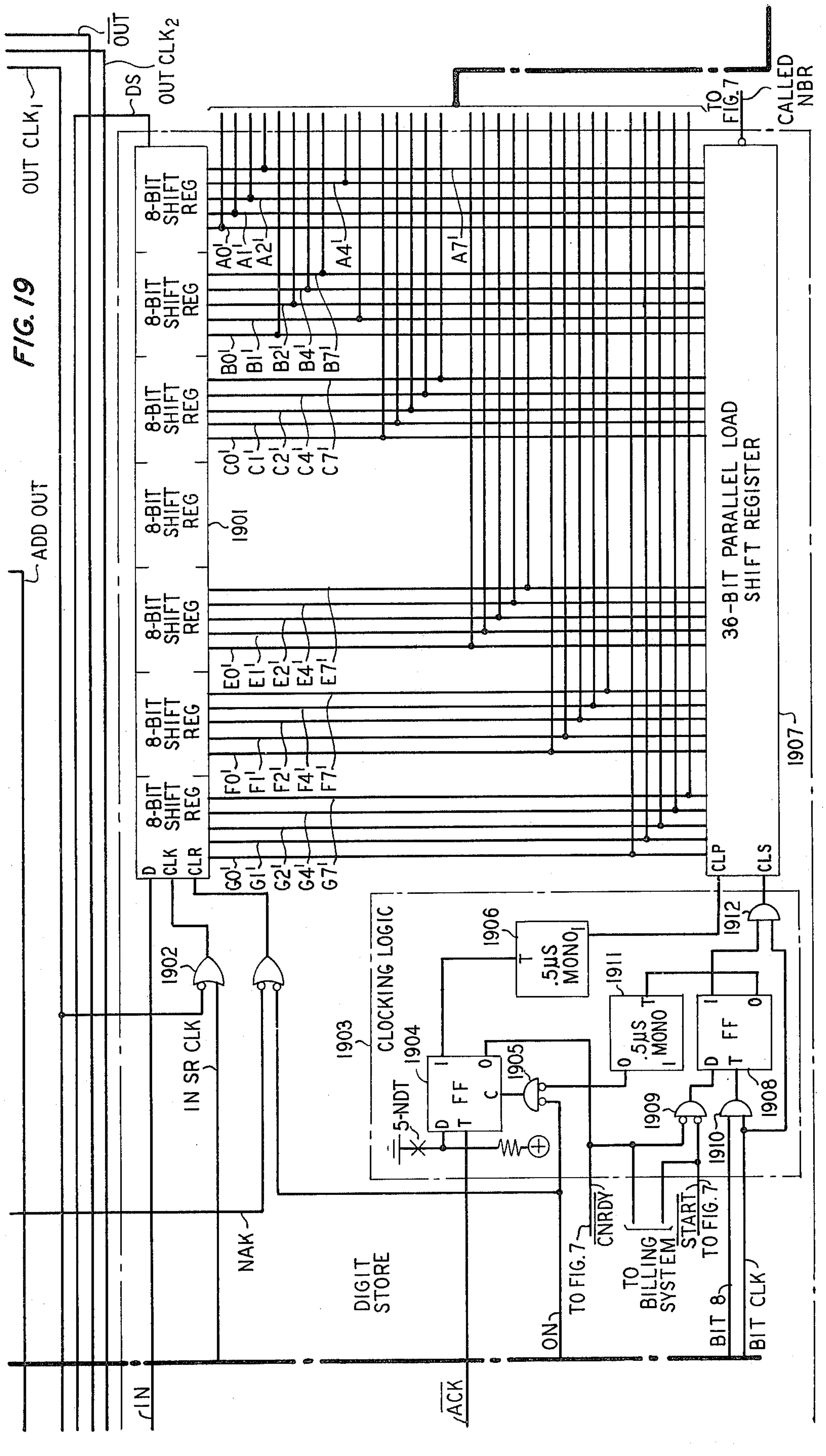

Assume now that a wrong number of digits or an error is detected and the NAK or fail sequence is returned to the subscriber. The pulsing of NAK gate 1410 (which provided the pulse to lead NAK), also "sets" flip-flop 1425, the flip-flop being previously "cleared" by the initializing potential on lead ON. The 1 output terminal of flip-flop 1425 goes high partially enabling NAND gate 1426. The other enabling input to NAND gate 1426 is connected to the eighth stage output of 8-bit shift register 1309 via lead 1317. Accordingly, when the one bit in the shift register 1309 is shifted to the eight stage, the gate 1426 is enabled. The gate passes, inverted, the pulses on lead BYTE CLOCK BIT 1 to output lead FAIL. Output lead FAIL extends to NOR gate 1201 in the work timer (FIG. 12). The negative pulse on lead FAIL, applied to NOR gate 1201, produces a negative pulse on output lead INVALID CPC. Lead INVALID CPC extends inverted, to the "set" input of invalid flip-flop 1604 and to NOR gate 1603 in the output circuit (FIG. 16).

The pulse thereby "sets" the flip-flop 1604 and is passed through NOR gate 1603 setting control flip-flops 1605 and 1606. The setting of control flip-flop 1606 removes a "clear" clamp from the CLR input of shift register 1607. The setting of control flip-flop 1605 impresses a 1 bit in the first stage of a 9-bit recirculating register (it is to be noted that flip-flop 1605 constitutes the first stage and shift register 1607 constitutes the last eight stages as will be seen hereinafter).

The input clock gate 1608 for the recirculating register is controlled by the "Divide-by-5" lead and the 1 output of control flip-flop 1606. Since control flip-flop 1606 is "set," gate 1608 is enabled at all times for high-rate subscribers and every fifth byte for subrate subscribers. With gate 1608 enabled, the pulse on lead BIT 8 is passed therethrough to toggle control flip-flop 1605 and to shift register 1607. The eighth stage output of shift register 1607 is connected to the D input of shift register 1605. The first BIT 8 clock pulse therefore toggles the flip-flop back to the clear condition. At the same time the 1 bit in flip-flop 1605 is inserted in the first stage of shift register 1607 since the 1 output of the flip-flop is connected to the first stage of the register.

With the bit in the first stage, NAND gate 1610 is enabled permitting the passage, inverted, of the pulse on the BYTE CLK BIT 1 lead to lead CME1. Lead CME1 extends to the digital transmitter (FIG. 15) and is connected by way of OR gate 1512 to the CME terminal of character encoding gates 1502. Accordingly, the information bits of the "CME" character are passed through 6-bit latch 1503 to 8-bit shift register 1504 and the digital transmitter sends the "CME" character back to the subscriber.

Upon the application of the next clock pulse to lead BIT-8, the bit in the first stage of shift register 1607 is shifted to stage two. The output of stage two is connected to the "first character" input terminal of digital encoding gates 1612. Digital encoding gates 1612 comprise standard steering circuits which are enabled by the enabling signal on the first character input terminal and an enabling signal on one of input terminal 1-6 to steer a clock pulse to a selected output lead. Since the invalid flip-flop 1604 is set, its 1 output terminal enables the 5 input terminal causing appropriate steering gates to steer the clock pulse on lead BYTE CLK BIT 1 to output lead 3W. Accordingly, a negative pulse is applied to lead 3W which extends to the 3 input terminal of character encoding gates 1502 which encode at its output the information bits of the ASCII character digit 3. Accordingly, the character 3 is returned to the subscriber in the same manner as previous characters were generated by the digital transmitter and transmitted back.

A third BIT 8 pulse now steers the 1 bit to the third stage of shift register 1607. The output of the third stage is connected to the "second character" input terminal of digital encoding gates 1612. The steering circuits enabled by flip-flop 1604 steers the BIT CLK BIT 1 pluse to output lead OW. The negative pulse on lead OW is applied to the 0 input terminal of character encoding gates 1502 which generate the information bits of the code character digit 0.

The next clock pulse on the BIT 8 lead advances the 1 bit to the fourth stage of shift register 1607 to enable gate 1614. The BYTE CLK BIT 1 pulse is gated through gate 1614, applying a negative pulse to lead ETB. Lead ETB extends to input terminal ETB of the character encoding gates which encode the information bits of the character "ETB" on the 6-bit latch and the character is thus transmitted back to the subscriber.

Similarly, the next BIT 8 pulse advances the 1 bit to the fifth stage of shift register 1607 to enable the fifth stage gate 1615. The BYTE CLK BIT 1 pulse is passed therethrough to lead CSA4. The negative pulse on lead CSA 4 is passed through OR gate 1501 to the character encoding gates to thereby generate the CSA character for transmission back to the subscriber.

At this point a character sequence has been sent to the subscriber (including digits 3 and 0) which indicates to the subscriber that the address code sequence was invalid by reason of either having the wrong number of digits or having a parity error. The succeeding BIT 8 clock pulses then proceed to advance the one bit through the several subsequent stages of shift register 1607 and when the 1 bit is in the final or eighth stage it is impressed back into control flip-flop 1605. At the same time the 1 bit in the eighth stage toggles divide-by-8 counter 1616, advancing the counter to the count of one.

With the 1 bit in flip-flop 1605, the process of cycling the 1 bit through shift register 1607 is repeated. This again generates the invalid sequence for transmission back to the subscriber. At the termination of the cycle the divide-by-8 counter 1616 is advanced to the count of two. This process is repeated eight times until divide-by-8 counter 1616 reaches the count of eight.

The eighth stage of the divide-by-8 counter is connected to the toggle input of control flip-flop 1606. When counter 1611 reaches the count of eight, it toggles control flip-flop 1606 to the "clear" condition, clearing shift register 1607, blocking gate 1608 and thus terminating the above described cycling sequence. The eighth stage of 8 counter 1616 also fires 0.5 millisecond monopulser 1618. The pulse generated by 0.5 millisecond monopulser 1618 is applied to NAND gate 1619 which is normally enabled for reasons described hereinafter. A negative pulse is thereupon passed to lead IDL.

Lead IDL extends to input terminal IDL of character encoding gates 1502 in the digital transmitter resulting in the generation of information bits of the character code "IDLE" which is transmitted back to the subscribers line circuit. Lead IDL also extends to OR gate 705 in the bit interface circuit (FIG. 7) and the negative pulse on lead IDL is inverted by the OR to enable the RLS gate 706. The other input to AND gate 706 is inversely connected to the output of AND gate 708 which is normally disabled by lead TKO as described hereinafter. Accordingly, gate 706 is enabled to gate the pulse from lead IDL through the OR gate 707 to leads RLS.

The pulse on lead RLS is applied to NOR gate 1203 in the work timer (FIG. 12). The output of NOR gate 1203 accordingly goes low "setting" flip-flop 1204 (which was previously cleared by the initializing circuit). The "setting" of flip-flop 1204 applies a negative condition to lead CLEAR which energizes 12-RLS relay in the relay output circuit.

The operation of relay 12-RLS operates in turn relay 5-RLSA in the relay circuit (FIG. 5) and relay 5-RLSA locks up through its own contacts to relays 5-ON. The operation of relay 5-RLSA starts to take down the connection of the register sender. With the relay 5-RLSA operated relay 6-LD releases and the operating path for the hold magnet in the link and connector circuit via lead HMH is opened. In addition, the release of relay 6-LD releases relay 5-SR and relay 5-SR releases relay 5-ON. Relay 5-ON now returns the register sender to the initial idle state.

Figure 11:
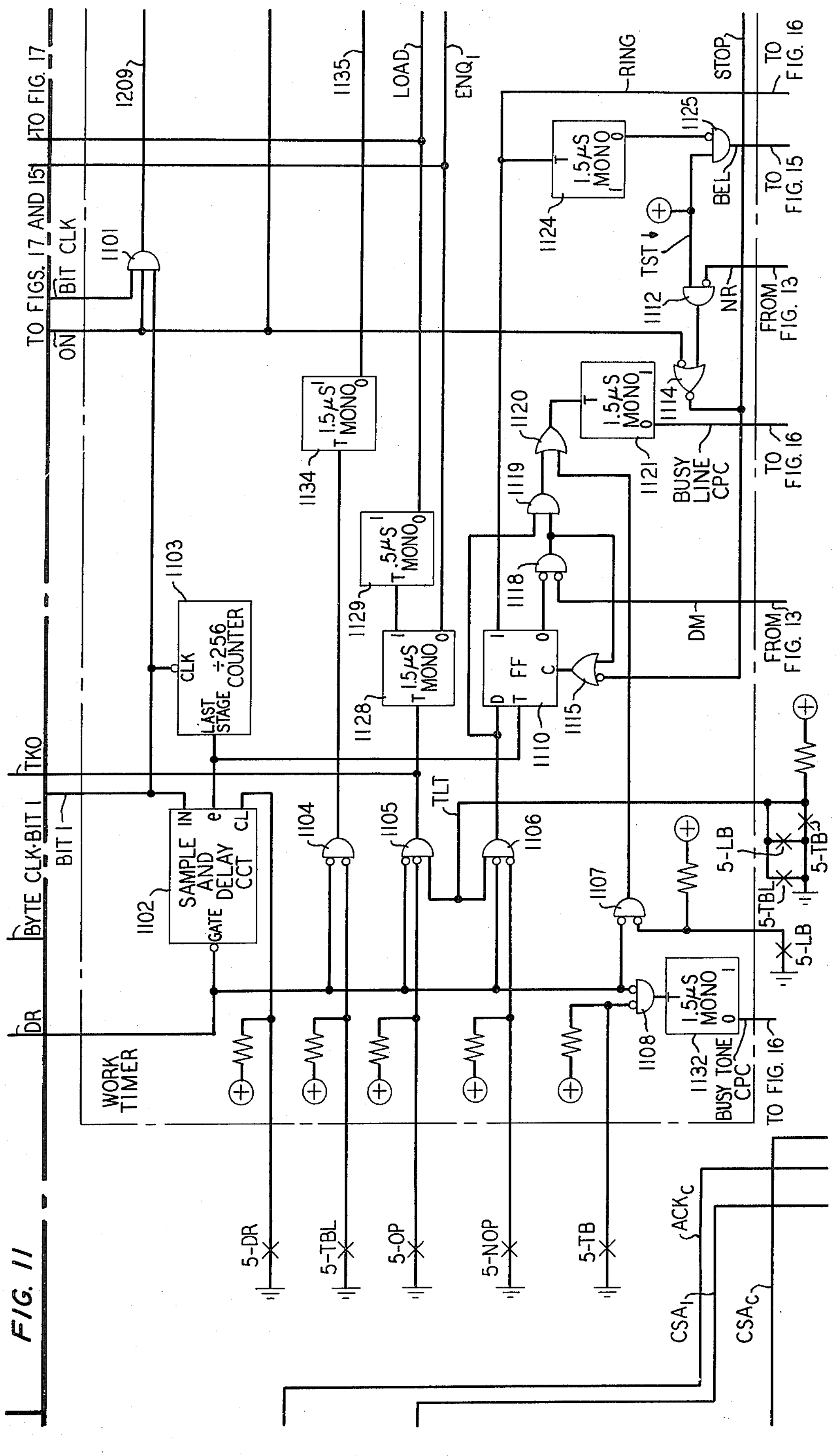

Assume now that instead of receiving seven or more digits from the subscriber, the subscriber either fails to send any digits, or sends less than seven digits, or pauses for more than 20 seconds in the sequence of sending digits. The circuit that observes the reception of the digits to insure that there is no inordinate delay is the work timer (FIGS. 11 and 12). The timing is provided by 19-stage binary counter 1206 which is driven by the coincident of the BIT 1 pulse and the BIT CLK pulse. The coincident gate 1101 is normally enabled by the potential on lead ON which is, as previously described, normally high after initialization. Accordingly, each coincidence of the BIT 1 and BIT CLK pulses provides a pulse to lead 1209 to advance 19-stage binary counter 1206.

It is recalled that each time a digit is received from the subscriber an enabling potential is applied to lead NUMD by character detection gates 1005. This results in a clock pulse being generated by gate 817 in the block check circuit for application to the shift register 812 and 10-state counter 820, also previously described. This clock pulse is also applied to lead SAMP which extends to gate 1212 in the work timer. Gate 1212 is normally enabled by lead W. No. which, as previously described, is normally high so long as the number of digits do not exceed seven. Accordingly, the pulse on SAMP is passed through gate 1212 and then through OR gate 1207 to clear the 19-stage binary counter 1206, resetting the counter to its initial count.

Assume now that less then seven digits have been sent by the subscriber and no further digits have been transmitted in a 20 seconds interval. The count of 19-stage binary counter 1206 is thus being advanced without the counter being cleared. After 20 seconds, the count of 19-stage binary counter 1206 is sufficiently advanced to reach a count which results in the energizing output terminal "20 sec." This partially enables AND gate 1209. Gate 1209 was previously partially enabled by lead ADD MODE which has, as previously described, a positive potential applied thereto at this time. Gate 1209 is thus fully enabled and fires 5 microsecond monopulser 1210. The pulse produced thereby is passed through NOR gate 1201 to lead INVALID CPC as previously described. The pulsing of lead INVALID CPC results in the generation of the invalid sequence. Accordingly, this invalid sequence is sent back to the subscriber and the register sender releases in the same manner as previously described.

When the correct number of digits have been received from the subscriber with no parity error and followed by the character "ETB" or "STX," the register sender transmits back the correct or ACK sequence; sends the line circuit the SO character to halt the repeating of characters by the line circuit to the subscriber; recalls the marker; and then waits for marker action as previously described. At this time the register sender goes to the terminating phase.

As previously described, the register sender logic (when going into the terminating phase) provides a negative potential to lead $\overline{\text{TERM}}$. This negative potential is passed through OR gate 1008 to clear the flip-flops 1006 and 1012. With these flip-flops cleared, gate 1016 is disabled, disabling in turn the one microsecond monopulser 1017. The DCS lead is thereby maintained in a high condition precluding subsequent sampling of the incoming data by the block check circuit (and the resultant application to the digit relays). In addition, when the "ACK" character is transmitted due to the pulse on lead $\overline{\text{ACK}}$, the $\overline{\text{ACK}}$ pulse is also passed through NOR gate 1416 to set flip-flop 1405. Flip-flop 1405, "set," disables gates 1402 and 1404 and gate 1402 raises the potential on lead ADD LINE. Lead ADD LINE extends inverted to one input of AND gate 1002 which is now disabled. The output of gate 1002 goes low and this low output is passed via lead 1004 to disable gates 908 and 909. Gate 912 is now enabled for all the bits of the incoming byte. This places the digital receiver in the control mode wherein gate 912 shifts in all the bits of the byte into shift register 913 since the code characters next received are control characters aligned with the byte clock (the characters being generated by equipment internal to the switching system).

Figure 5:
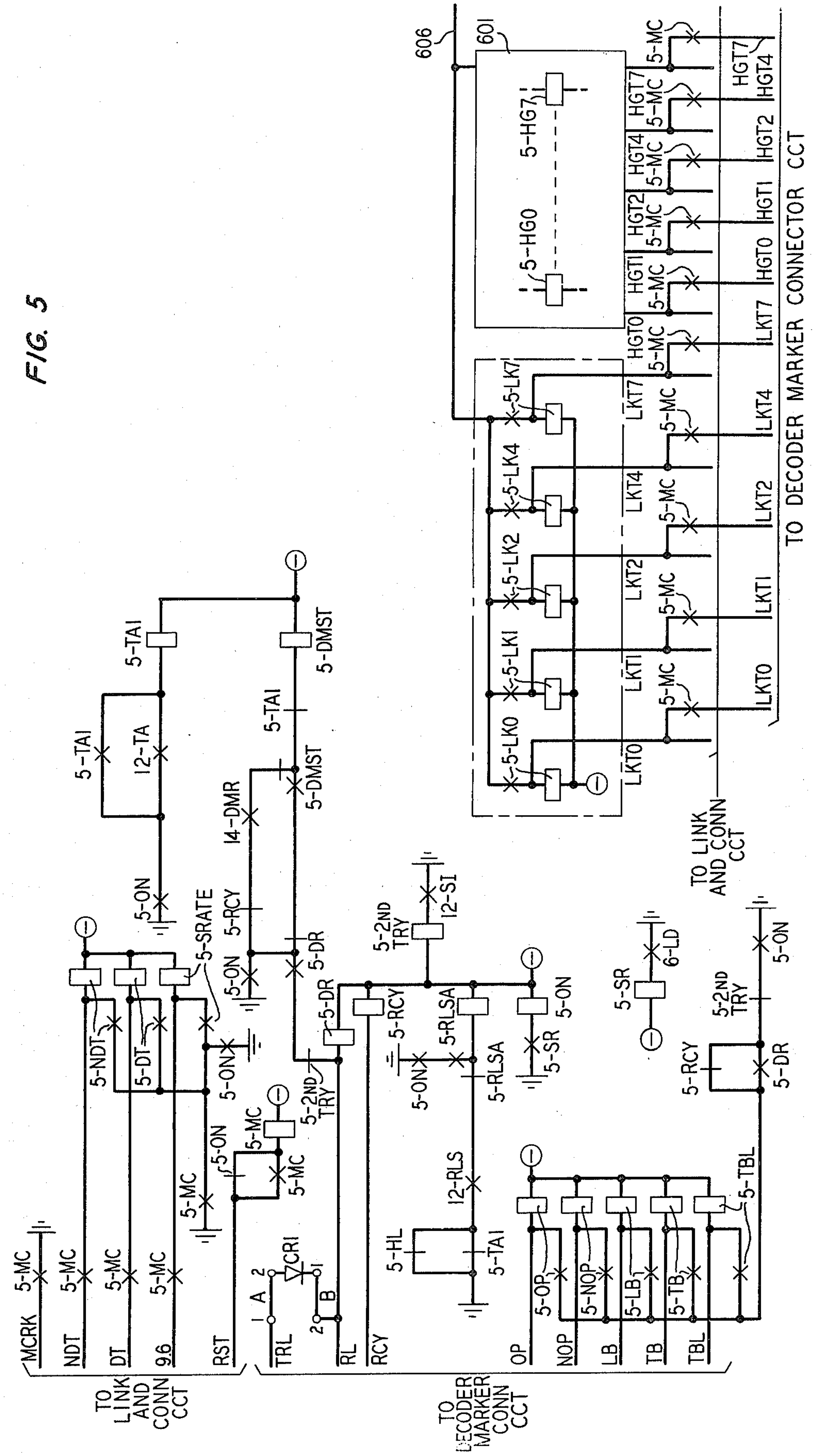
FIGS. 5 through 20, when arranged as shown in FIG. 4, show in schematic form the various circuits which form a digital register sender common control circuit which comprises part of the central office switching facility.
Figure 6:
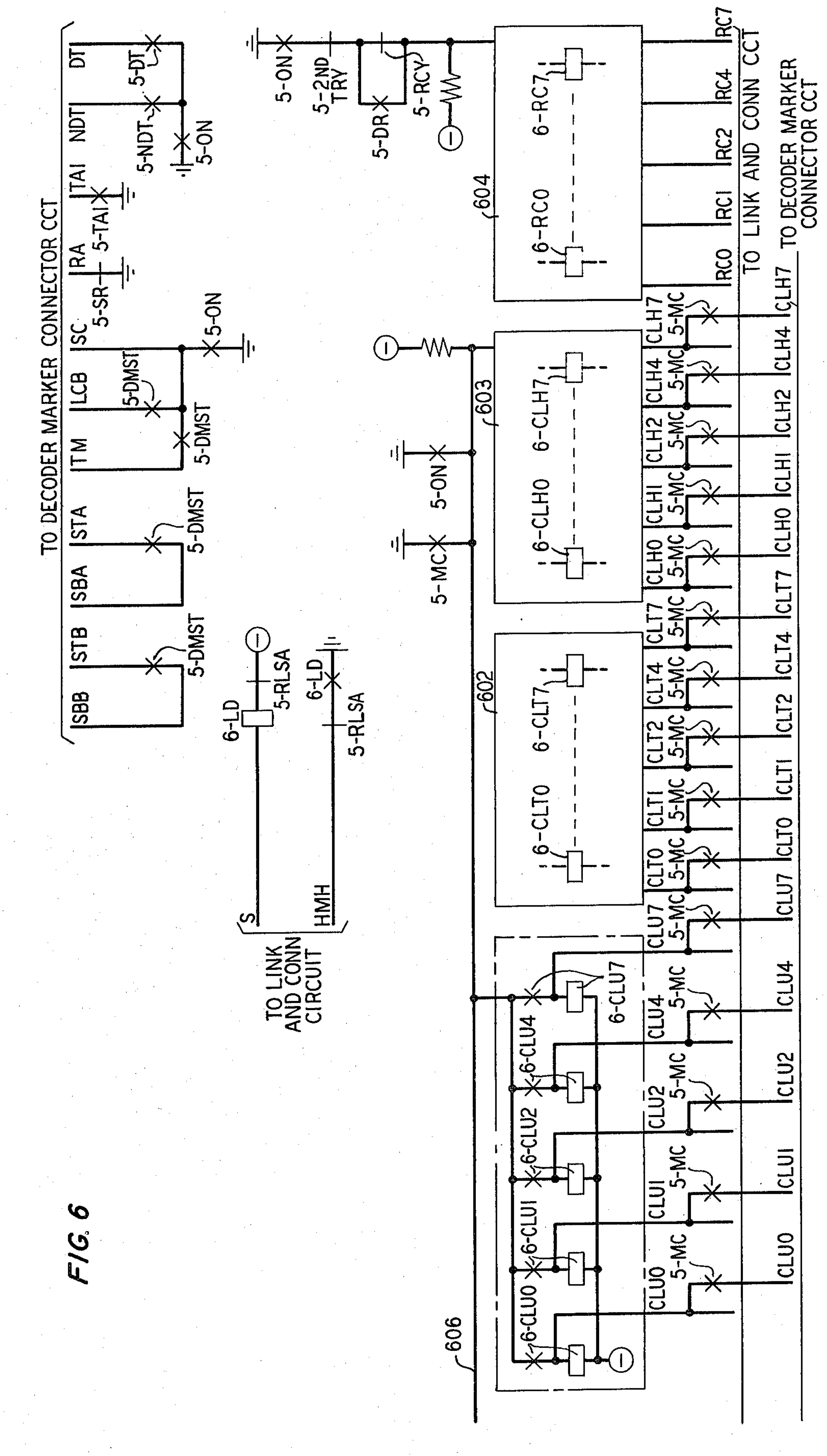

When the marker is summoned, the register sender provides the following indications to the marker by way of the decoder marker connector:

1. The horizontal link and group numbers by way of leads LKTO through LKT7 (FIG. 5) and HGTO through HGT7 (FIG. 6).

2. The originator class by way of leads CLUO through CLU7, CLTO through CLT7 and CLHO through CLH7 (FIG. 6).

3. The line or trunk indication; in this case the line indication by way of lead DT (FIG. 5).

4. The address digits by way of leads A0 through A7 to GO through G7 (FIG. 20). The marker as described hereinafter now attempts to identify the outgoing channel (line or trunk), select the route and indicate to the register sender the action it is taking.

Assume first that the addressee is another local line, that the marker has found that the line is not busy and has connected through to the local addressee line. The marker thereupon returns ground on lead NOP (FIG. 5). This function is identical to the marker function as described in the Jaeger et al patent, lead NOP corresponding to a similarly identified lead in FIG. 69 of the patent.

The ground on lead NOP operates relay 5-NOP. Relay 5-NOP locks by way of the break contacts of relay 5-RCY and 5-2nd TRY and the make contacts of relay 5-ON. In preparation of its releasing, the marker also grounds lead RL (FIG. 5) corresponding to the similarly identified lead in FIG. 59 of the Jaeger et al patent. This operates relay 5-DR, which locks via break contacts of relay 5-2nd TRY and make contacts of relay 5-ON. The operation of relay 5-DR opens the locking path of relay 5-DMST and this relay releases terminating the summoning of a marker.

In addition, the operation of relay 5-DR removes a positive disabling clamp applied to input terminal CL of sample and delay circuit 1102 in the work timer (FIGS. 11 and 12). This permits sample and delay circuit 1102 to initiate a delay interval in conjunction with divide-by-256 counter 1103. More specifically, a delay of approximately 40 milliseconds is provided and after the termination thereof, counter 1103, upon achieving the count of 128, enables sample and delay circuit 1102 to sample the next pulse on lead BIT 1 and apply, via output terminal GATE, a low potential to lead DR, simultaneously partially enabling a plurality of work timer AND gates, such as gates 1104 through 1108.

With respect to the AND gate 1106, input lead TLT is high in this present state for reasons described further hereinafter. Relay 5-NOP operated, as previously described, applies a low potential to a third lead of gate 1106. The gate is thereby fully enabled, passing a high condition to the D input of ring flip-flop 1110.

As previously noted, the register sender is now attached to the terminating line circuit and observing the byte aligned characters being returned by that line circuit. These characters may optionally be either the "idle" (NUL) character, the "not ready" character or the data mode originating character "SYN" which indicates that the terminating subscriber has just attempted to originate a call. These characters are all being received on the TR and TT leads from the link and connector circuit, converted to binary bits by line terminator 701 and passed to lead $\overline{\text{DAC2}}$. The byte aligned characters are then passed to the digital receiver and entered into shift register 913 in the same manner as the characters from the originating line circuit were entered with the exception that bits one and eight are no longer stripped since the stripping gates 908 and 909 have been disabled as previously described.

Assume now that the "not ready" character is received. The bits of the "not ready" character are applied to character detection gates 1005. Gates 1005 provide a low condition to lead NRC.

Since the "not ready" character is a control character, the eighth bit is a 1 bit, the 8 output terminal of 8-bit shift register 913 is high, partially enabling NAND gate 917. The low condition, previously noted on lead 1004 further enables the CCS gate 917. Lead CLEAR, as described hereinafter, is normally high due to the "clearing" of flip-flop 1204 in the work timer circuit by the initializing circuit, fully enabling the CCS gate. The gate now passes the coincidence of the shift register 913 clock pulse from gate 912 and the BIT 1 clock pulse, providing a negative pulse on lead CCS which occurs once per byte for high-rate subscribers and once per five bytes for low-rate subscribers.

The CCS lead extends to the input circuit and provides the clock input for two-stage shift register 1320. The D input to register 1320 is provided by lead NRC, which lead as previously described is presently low due to the detection of the "not ready" character. The first pulse on lead CCS clocks a 0 bit into the first stage of register 1320. The next pulse on lead CCS shifts the 0 bit to the second stage and clocks another 0 bit into the first stage of the register. The two 0 bits, inverted, are applied to NAND gate 1321 to pass a low condition to lead NR.

The low on the NR lead is passed to the work timer circuit, enabling AND gate 1112 since the other lead is normally up. A positive potential is thus passed to NOR gate 1114 and the resultant negative potential is applied to lead STOP.

The negative potential on lead STOP is passed through OR gate 1115 to clear flip-flop 1110. The clearing of flip-flop 1110 precludes or terminates the ringing signal, as described hereinafter. The negative potential on the STOP lead is also passed to the output circuit (FIG. 16) to clear 8-bit shift register 1624 (to further preclude or stop the ringing signal) and is passed through NOR gate 1620 to ring flip-flop 1621 to clear the flip-flop if it had been previously set. Finally, the low potential on lead NR enables gate 1625 which applies a positive potential to the "set" input of "not ready" flip-flop 1626 and partially enables AND gate 1627.

Assume now that a code sequence, which in this case would be the "ringing" sequence, (described hereinafter) is being transmitted. The "ring" flip-flop 1621 is "set" (as described hereinafter) and, during the transmission of the code sequence, control flip-flop 1606 of recirculating shift register 1607 is "set." Under this condition flip-flop 1606 is applying from the 0 output a disabling potential to AND gate 1627. Gate 1627 is thus disabled permitting the sequence to continue. When the "not ready" character is received, however, ring flip-flop 1621 is "cleared" and "not ready" flip-flop 1626 is "set." The steering gates of digital encoding gates 1612 are accordingly modified so that the "not ready" code sequence is transmitted instead of the "ring" sequence.

In the event that the "ringing" code sequence has not yet been started, control flip-flop 1606 is "cleared" and AND gate 1627 is enabled. Gate 1627 thus passes an enabling potential to multiple NOR gate 1603 and the NOR gate, in turn, "sets" flip-flops 1605 and 1606. Accordingly, as previously described, a code sequence is initiated sending the "not ready" code sequence back to the originating line circuit in the same manner that the "nonvalid" code sequence is sent back, differing only in that input terminal 2 of the digit encoding gates are now energized to send the "not ready" digits in the call progress sequence. Thereafter the register sender sends the "idle" character, releases and returns to the initial condition in the same manner as previously described.

Assume now that, as the marker selects the addressee line, the terminating subscriber attempts to originate a call, resulting in the reception by the register sender of data mode characters which define the "off-hook" indication. These characters are received, as previously described, on lead $\overline{\text{DAC2}}$, inverted by inverter 914 in the digital receiver and passed onto lead DAC2.

Lead DAC2 extends to the D input of three-stage shift register 1324 (in the input circuit) which was previously "cleared" via OR gate 1325 by the initializing circuit. Since the characters received are data mode characters, the eighth bit of each of the successive characters is necessarily a 1 bit. The BYTE CLK BIT-1 pulse which, as previously described, appears at the termination of the eighth bit, is applied to the clock (CLK) input of three-stage shift register 1324. Accordingly, if a data mode character is received, the eighth bit, being a 1, is clocked into the first stage of three-stage shift register 1324.

Assuming that the next successive character is also a data mode character, the BYTE CLK BIT-1 pulse shifts the bit in the first stage to the second stage and shifts the eighth bit into the first stage. Similarly, if the third character is also a data mode character, the two bits in shift register 1324 are shifted to stages two and three and the eighth bit is shifted into stage one. At this time all three stages have 1 bits inserted therein. This enables output NAND gate 1326 which applies a negative condition to lead DM.

The low condition inverted on lead DM partially enables AND gate 1630 in the output circuit and partially enables AND gate 1118 in the work timer. At this time, as previously described, flip-flop 1110 is "set" or is about to be "set." Upon the "setting" of flip-flop 1110, the 0 output thereof fully enables AND gate 1118.

The output of AND gate 1118 is passed by way of OR gate 1115 to the "clear" input of ring flip-flop 1110 to "clear" the flip-flop. This precludes the sending of the ringing sequence to the terminating customer. The high output condition of AND gate 1118 is also applied to AND gate 1119. AND gate 1119 was partially enabled by the high output of gate 1106 developed when the marker advised the register sender that the terminating line was connected, which high output, as previously described, "set" flip-flop 1110. AND gate 1119 is thus fully enabled and a high potential is passed through OR gate 1120 to 1.5 microsecond monopulser 1121. The monopulser consequently fires, applying a pulse to lead BUSY LINE CPC.

In the event that the terminating line is busy as determined by the marker, the marker grounds lead LB (FIG. 5), corresponding to a similarly identified lead in FIG. 53 of the Jaeger et al patent. The ground of lead LB operates relay 5-LB in the relay circuit. Relay 5-LB, operated, applies a low potential, inverted, to AND gate 1107 in the work timer. The other input to AND gate 1107 is connected to the GATE output of sample and delay circuit 1102 and, as previously described, this circuit provides a low condition a predetermined interval of time after the marker releases. This low condition, inverted, is applied to gate 1107, fully enabling the gate. The enabling of gate 1107 provides a high condition at the output which is passed through OR gate 1120 to fire 1.5 microsecond monopulser 1121 and therefore provides a pulse to lead BUSY LINE CPC. Accordingly, it is seen that in the event that the terminating subscriber is busy or, alternatively, should originate a call before the ringing sequence is sent to him, a pulse is applied to lead BUSY LINE CPC.

The pulse on lead BUSY LINE CPC is passed to the "set" input LINE BUSY flip-flop 1637 and to multiple NOR gate 1603, both in the output circuit. LINE BUSY flip-flop 1637 is thus "set" and NOR gate 1603 "sets" control flip-flops 1605 and 1606 to initiate the generation of the call progress sequence. With LINE BUSY flip-flop 1637 "set," input terminal 4 of digit encoding gates 1612 is energized and appropriate steering gates are enabled and the call progress sequence is now generated and transmitted to the originating subscriber in the same manner as previously described with the exception that appropriate digits designating the "busy line" condition are inserted in the sequence due to the setting of BUSY LINE flip-flop 1637. Thereafter, as previously described, the register sender sends the "idle" character and releases.

If the ringing sequence is in progress when the terminating subscriber returned data mode characters, it is designated by ring flip-flop 1621 being "set." Gate 1630, partially enabled by the low potential on lead DM is fully enabled by flip-flop 1621. The resultant high potential output of AND gate 1630 passes through NOR gate 1634 to "clear" control flip-flop 1606. This blocks clocking for recirculating register 1607 and terminates the "ringing" call progress sequence. The high potential output of gate 1630 is also passed through OR gate 1631, to "set" flip-flop 1632. The setting of this flip-flop partially enables NAND gate 1640 and applies a high potential to the D input of 8-bit shift register 1633. The other input to NAND gate 1640 is connected to the BYTE CLK BIT-1 lead and, when this clock pulse is applied to the gate, a negative pulse is passed to lead UBD. This negative pulse is passed through NOR gate 1620 to clear ring flip-flop 1621 and in addition, "sets" control flip-flop 1641 for 8-bit shift register 1633.

The setting of control flip-flop 1641 partially enables AND gate 1642. AND gate 1642 passes the coincidence of the BIT 8 pulse and the 5 clock pulse. The resultant output pulse toggles flip-flop 1632 from the "set" condition to the "clear" condition and simultaneously clocks a 1 bit provided by the flip-flop 1632 into the first stage of 8-bit shift register 1633.

Previous to the clearing of the flip-flop 1632, the negative pulse on lead UBD was passed to the correspondingly identified input terminal of character encoding gates 1502 in the digital transmitter. The character encoding gates encode the information bits of the unblind (UBD) character on 6-bit latch 1503, which, in turn, passes the bits to 8-bit shift register 1504. Accordingly, the character unblind (UBD) is recognized by the originating line circuit as an instruction to become transparent, as previously described. Thereafter, as previously described, the input flip-flop 1632 is "cleared" and gate 1640 is disabled.

The next coincidence of the 5 pulse and the BIT 8 pulse is again passed by AND gate 1642 to clock the 1 bit from the first stage of 8-bit shift register 1633 into the second stage. The 1 bit in the second stage is applied to output terminal 2 to enable REV gate 1643. The BYTE CLK BIT 1 pulse is thereupon passed through gate 1643 to lead REV.

Lead REV extends to a correspondingly identified input terminal of character encoding gates 1502 resulting in the generation and transmission of the code character REV (following character UBD). This has the effect of instructing the terminating line circuit to reverse the transmission leads in order to communicate with the originating line circuit, as previously described in the description of the line circuit.

On successive coincidence of the 5 pulse and the BIT 8 pulse, the 1 bit in 8-bit shift register 1633 is advanced through the several stages until it reaches stage five. At this point control flip-flop 1641 is toggled to the "clear" condition and NUL gate 1645 is enabled. The clearing of control flip-flop 1641 disables clocking gate 1645 and the enabling of NAND gate 1642 passes the BYTE CLK BIT 1 pulse to lead NUL.

The negative pulse on lead NUL extends to flip-flop 1505 in the digital transmitter "setting" the flip-flop. The setting of flip-flop 1505 in turn "sets" flip-flop 1506. Flip-flop 1506, maintained "set" by flip-flop 1505, blocks the output of 8-bit shift register 1504 and thus precludes the transmission of characters to lead $\overline{\text{DACO2}}$, which lead constitutes the output of the digital transmitter. In addition, the negative pulse on lead NUL is passed through OR gate 705 to enable AND 706 gate. The AND gate enabled passes a positive pulse through OR gate 707 to lead RLS. The high condition on lead RLS, as previously described, passes through NOR gate 1203 to "set" flip-flop 1204, resulting in the operation of relay 12-RLS and the register sender is therefore released.

Returning now to the situation where the marker has identified the terminating subscriber and assume now that the terminating subscriber is idle, sending back "idle" characters. The marker operates relay 5-NOP as previously described, and this enables AND gate 1106 and, subsequently, after a predetermined interval, divide-by-256 counter 1103 toggles flip-flop 1110 to the "set" condition as previously described. The setting of flip-flop 1110 applies a high potential to lead RING and fires 1.5 microsecond monopulser 1124. The monopulser pulse is thereby passed through AND gate 1125 to lead BEL.

Lead BEL extends to the correspondingly identified input terminal of character encoding gates 1502 which thereupon applies the information bits of the "BEL" character to 6-bit latch 1503. The BEL character is thereby inserted in 8-bit shift register 1504 and passed out by the digital transmitter to be sent to the terminating subscriber as a ringing signal. The high potential on the lead RING is passed to the D input terminal of 8-bit shift register 1624 in the output circuit which register was previously cleared by the initializing circuit providing a "clearing" potential via gate 1114 and lead STOP. Shift pulses for the register are supplied by gate 1647 operated by the coincidence of the 5 pulse and the BYTE CLK BIT 1 pulse. The clock pulse output of gate 1647 therefor shifts a 1 bit into the first stage of register 1624. After five byte intervals, (or 25 byte intervals for subrate subscribers) the first five stages of shift register have 1 bits inserted therein applying a high condition from output terminal 0.5 to 0.5 microsecond monopulser 1648. Monopulser 1648 thus fires, setting ring flip-flop 1621 and passing a pulse through multiple input OR gate 1603 to initiate a call progress sequence, as previously described. With ring flip-flop 1621 set, input terminal 1 of digital encoding gates 1612 is energized whereby the steering gates are appropriately enabled to send back to the originating subscriber two digits in the call progess code which indicate that the terminating subscriber is being rung.

The addressee station may answer the call while it is receiving the BEL signal or as an answer to the BEL signal. In either event, as previously described, the terminating line circuit proceeds to send data mode characters and these characters are received on lead $\overline{\text{DAC2}}$ and counted by shift register 1324. After three data mode characters are received, shift register 1324 applies an energizing signal to lead DM by way of gate 1326, as previously described. Since the "ring" call progress sequence is being generated, ring flip-flop 1621 is set and the energization of lead DM enables gate 1630. As previously described, the enabling of gate 1630 clears flip-flop 1606 to terminate the generation of the call progress sequence. The output of gate 1630 is also passed through OR gate 1631 to initiate the generation of the unblind and reverse codes, as previously described. Accordingly, if the call is answered while the terminating line circuit is receiving the BEL signal or while the ring call progress sequence is being sent, the register sender terminates the generation of the call progress code, sends the unblind and reverse signals and disconnects.

Assume now that eight "ring" call progress code sequences have been returned to the originating subscriber without the terminating subscriber answering. As previously described, the sequences are counted by counter 1616,. After a count of eight is achieved, the output of counter 1616 goes high to toggle flip-flop 1606 to the "clear" condition to terminate the generation of the sequence. The output also operates 0.5 microsecond monopulser 1618. With the ring flip-flop 1621 "set," AND gate 1650 is enabled to pass the monopulser pulse. This pulse is passed through OR gate 1631, "setting" flip-flop 1632. The "setting" of flip-flop 1632 begins the unblind-reverse sequence whereby the register sender sends the unblind sequence to the originating line circuit and the reverse sequence to the terminating line circuit and releases from the connection, permitting the subscribers to communicate when the terminating subscriber answers.

Assume now that the call is to be placed through a trunk circuit to, for example, a distant office. After the marker is summoned, the digit class, horizontal group and link, and the line or trunk identification of the originator is passed to the marker in the same manner as previously described for the local call. After the register sender has sent all that information to the marker, the marker identifies the outgoing trunk through which the call is to be placed. If the trunk is available, the marker grounds appropriate ones of leads RCO through RC7 (FIG. .6) operating the route control relays (not shown, but similarly arranged in block 604 as the class relays) and the relays lock up by way of the break contacts of relay 5-RCY and 5-2ND TRY and the make contacts of relay 5-ON. And, in addition, the marker grounds lead OP (FIG. 5) to operate relay 5-OP which locks via break contacts of relays 5-RCY and 5-2ND TRY and make contacts of relay 5-ON. (Leads RCO through RC7 correspond to leads BO through B7 in FIG. 62 of the Jaeger et al patent. It is noted that lead OP corresponds to lead MF2 and DP2 in FIG. 69 of the Jaeger et al patent.) The marker, however, invariably grounds lead OP whereas in the Jaeger patent the marker grounds one or the other of leads MF2 or DP2 in accordance with whether the trunk requires multifrequency or digit pulsing.

As noted above, relay 5-OP is now operated. This extends ground to AND gate 1105 in the work timer.

Lead TLT is normally high and leads TRK SEL is normally low. Under these conditions, gate 1105 is enabled. A predetermined interval after the marker releases and coincident with the application of the BIT 1 pulse, sample and delay circuit 1102 passes a negative pulse to gate 1105, as previously described. This pulse is applied to lead TKO, firing 1.5 microsecond monopulser 1128. The firing of 1.5 microsecond monopulser 1128 passes a pulse to lead ENQ1 which is connected to multiple OR gate 1207. This clears the 19 stages of timer counter 1206. This prepares the work timer to time for trunk failures as described hereinafter.

The monopulser pulse on lead ENQ1 is also passed by way of OR gate 1513 to input terminal ENQ of character encoding gates 1502 in the digital transmitter. The code character ENQ is therefore loaded into 8-bit shift register 1504 and transmitted to the line circuit and the local trunk circuit. At this time, as previously described hereinafter, the line circuit is ignoring the ENQ character; the trunk circuit recognizes the ENQ character; goes "off hook"; and repeats the ENQ character to the downstream office via the trunk. The downstream trunk circuit recognizes the ENQ character; goes off hook and requests a marker to attach a register sender. When the register sender is attached, it recognizes the ENQ character from the upstream office and returns a CSA character indicating addressing may proceed, as described hereinafter.

Returning now to the application of the negative pulse to lead ENQ1. This pulse inverted by inverter 1701 is passed through loading gate 1702 since the gate is normally enabled by a high potential applied thereto. The gate pulse sets the "mode" input to the final 24 stages of 32-bit shift register 1703 in the digit store (FIGS. 17 and 18) enabling the register to accept the parallel input. The pulse form inverter 1701 also sets the first eight stages of 32-bit shift register 1703 and sets the stages of 8-bit shift register 1710 to similarly accept the parallel input.

Return now to the firing of 1.5 microsecond monopulser 1128 in the work timer. This monopulser fires succeeding 0.5 microsecond monopulser 1129. The latter monopulser applies a negative pulse to lead LOAD which "sets" flip-flop 1215 providng a high potential to lead OUT TRK. At the same time the negative LOAD pulse, inverted, by inverter 1708 is passed to the CLKP input terminal of 8-bit shift register 1710 and the corresponding input of 32-bit shift register 1703.

The parallel inputs to the stages of shift register 1710 are identified as terminals 1 through 8. At this time terminal 8 has a high potential applied thereto and the other stages have permanently applied high and low potentials to define the bits of the character ETB. The first eight stages of 32-bit shift register 1703 includes five parallel inputs extending to contacts of the route control relays to apply the bits of the route control number to these eight stages, the contacts of the relays being shown in block 1704. Similarly, contacts of the class digit relays generally shown by blocks 1705, 1706, and 1707 and arranged in a similar manner to the contacts in the route control relays are applied in parallel to the first 24 stages of 32-bit shift register 1703. Accordingly, the negative load pulse loads the character "ETB" into 8-bit shift register 1710, loads the route control digit into the first 8 stages of 32-bit shift register 1703 and loads the corresponding digits set up by the class relays into the final twenty-four stages. The register sender now pauses until it receives the "CSA" character from the downstream register sender.

Assume now that the character "CSA" is received within a predetermined interval of time, that is before the work timer times out, as described hereinafter. The character is received by the digital receiver and detected by character detection gates 1005. At this time the potential on lead OUT TRK is high as previously described. This partially enables NAND gate 1024 in the digital receiver. Since the CSA character is being received, output terminal CSAc of code detection gates 1005 fully enables gate 1024 passing a negative pulse to lead CSAC.

The lead CSAC is connected to the D input of flip-flop 1515 in the digital receiver. The toggle input of flip-flop 1515 is connected to lead CCS. As previously described, lead CCS is pulsed once per byte during the control mode. Flip-flop 1515 is therefore toggled by the CCS pulse to the "clear" condition. A positive transition is therefore obtained from the 0 output of flip-flop 1515 and pased via OR gate 1516 to the toggle input of flip-flop 1517 which was previously cleared by the initializing potential on lead ON passed through OR gate 1518. At this time flip-flop 1519 is "set," having originally been "set" by the initializing circuit. The 1 ouput of flip-flop 1519 is connected to the D input of flip-flop 1517 and this high potential enables flip-flop 1517 to be toggled to the "set" condition.

The setting of flip-flop 1517 clamps its own toggle input via OR gate 1516, applies a high potential to the D input of flip-flop 1520 and partially enables clock gate 1521. Upon the coincidence of the 5 pulse and the BIT1 clock. Gate 1522 is enabled to toggle flip-flop 1520. Flip-flop 1520 is thus toggled to the "set" condition, partially enabling clock gate 1524 and applying a high potential to the D input of flip-flop 1523. The next coincidence of the 5 pulse and the BIT 1 clock enables gate 1522 to toggle flip-flop 1523 to the "set" condition. The toggling of this flip-flop places the register sender in the "out-pulsing" mode, placing a high potential on lead OUT and a low potential on lead $\overline{\text{OUT}}$. The low potential on lead $\overline{\text{OUT}}$ together with the coincidence of a low potential from the 5 lead is applied to NOR gate 1525 to produce a high potential which fully enables clock gates 1521 and 1524. These gates thereupon pass the BIT CLK pulse to leads OUT CLK1 and OUT CLK2, respectively.

The high potential on lead OUT enables output gate 1803 of shift register 1703 and enables output gate 1804 of 8-bit shift register 1710, all in the digit store. This extends the output of shift register 1703 over lead 1715, through enabled gate 1803 and over lead 1716 to the D input of shift register 1710 and extends the output of shift register 1710 over lead 1717, through enabled gate 1804 and OR gate 1802 to the D input of 56-bit shift register 1901. The output of 56-bit shift register 1901 is connected to lead DS which extends to the D input of 32-bit shift register 1703. Consequently there is now formed a 96-stage recirculating shift register consisting of 8-bit shift register 1710, 56-bit shift register 1901 and the 32-bit shift register 1703.

The five outputs defining the digit in the final eight stages of 32-bit shift register 1703 are applied in parallel to the 2-out-of-5 ASCII gates 1720. These gates are conventional conversion gates which convert the 2-out-of-5 code character derived from the final eight stages of 32-bit shift register 1703 to the first four bits of the corresponding ACSII character and apply the four bits to four output leads. These four bits are applied in parallel via leads 1721 to steering logic 1806 and to the block check generation logic generally indicated by block 1807. At the same time the five parallel outputs defining digits in the final eight stages of 32-bit shift register 1703 are scanned by ETB detector circuit 1722. The four output leads of the block check generation logic 1807 are applied to steering logic 1806.

Block check generation logic 1807, in general, sums corresponding bits of successive bytes with the exception that bits 3 and 4 are summed. The summing is provided by flip-flops 1809 to 1811, all previously "cleared" by the initializing potential applied through OR gate 1808. Bit 1 and 2 ouputs of 2-out-of-5 to ASCII gates 1720 are directly applied to both the J and K inputs of flip-flops 1809 and 1810, respectively. Bit 3 and bit 4 outputs are applied through OR gate 1812 to the J-K inputs of flip-flop 1811. The 0 outputs of the three flip-flops are connected, in parallel, to inputs 51, 52 and 53 of steering logic 1806. Input 54 of steering logic 1806 is permanently connected to a high potential. The toggle input of each of flip-flops 1809 to 1811 is connected to the output of clocking monopulser 1814.

Monopulser 1814 is driven by the output of AND gate 1815 which provides a pulse derived from the coincidence of the BIT 1 clock and the 5 pulse when the output of ETB detector 1722 is low and the potential on lead OUT is high. As previously described, in the out mode, the potential on lead OUT is high. In addition, we have previously described the insertion of the ETB character into 8-bit shift register 1710 in the digit store. Since the "ETB" character is not in the final stage of 32-bit shift register 1703, the output of ETB detector 1722 is low, applying a low potential inverted, via lead 1723 to gate 1815, enabling the gate to fire monopulser 1814. Accordingly, toggle pulses are applied to flip-flops 1809 to 1811 in block check generation logic 1807.

The low potential output of ETB detector 1722 is also applied via lead 1723 to the D input of flip-flop 1816. The flip-flop is toggled by the BYTE CLK BIT 1 pulse. The pulse therefore normally toggles flip-flop 1816 to the "clear" condition and, in this condition, steering gates in steering logic 1806 extend the four parallel leads from 2-out-of-5 to ASCII gates 1720 (that are directly applied to steering logic 1806) to parallel inputs of 8-stage shift register 1817. In addition, flip-flop 1816 enables output gate 1818 of shift register 1817, connecting the shift register output through gate 1818 and through OR gate 1819 to lead ADD OUT. Parallel load pulses for the parallel inputs of shift register 1817 are derived from monopulser 1814, which loads the four parallel inputs from the steering logic into stages 2 to 5 of the shift register. The first stage input is derived from a high potential, inverted for high gate subscribers and through make contacts of relay 5-SRATE to ground for substrate subscribers. Stages 6 and 7 are connected to ground and stage 8 is connected to a high potential; thereby inserting the appropriate bits for the ASCII number digit.

The serial connections for 32-bit shift register 1703, 56-bit shift register 1901 and 8-bit shift register 1710, together with the initial steering of the converted output of 32-bit shift register 1703 to 8-stage output register 1817, is now complete with the output of register 1817 connected to lead ADD OUT. Clocking for these registers is provided by lead OUT CLK 1 which is applied via OR gate 1725 to the serial clock input of 32-bit shift register 1703 and 8-bit shift register 1710 and separately applied via OR gate 1902 to the clock input of 56-bit shift register 1901 and is provided by lead OUT CLK 2 via AND gate 1821, now enabled by the high potential on lead $\overline{\text{OUT}}$, and passed to the serial clock input of 8-bit shift register 1817. Provision of these clocking pulses is described below.

It was previously described that flip-flops 1517 and 1520 in the digital transmitter together with flip-flop 1523 were all "set" when the register sender went to the "out" mode. With flip-flops 1517 and 1520 "set," gates 1521 and 1524 are partially enabled. The "setting" of flip-flop 1523 places a low potential on one input of NOR gate 1525. This enables the gating therethrough of the pulse on the 5 lead. The output of NOR gate 1525 is connected to gates 1521 and 1524 and the gates are thus maintained enabled for the high-rate subscriber and enabled for 1-out-of-5 bytes for the subrate subscriber (since NOR gate 1525 is following the potential on the 5 lead). Accordingly, when enabled as described, gates 1521 and 1524 pass therethrough the BIT 1 clock pulses to leads OUT CLK 1 and OUT CLK 2 and these clock pulses are passed to the clock inputs of shift registers 1901, 1817, 1703 and 1710, as previously described.

The digits stored in the various shift registers are now being shifted therethrough, converted to ASCII and passed on to lead ADD-OUT. At the same time, flip-flops 1809 and 1811 are toggled by the BIT 1 pulses to sum the corresponding ones of successive bytes. Lead ADD-OUT is connected to the digital transmitter and supplied one input to AND gate 1528. Gate 1528 is partially enabled by lead OUT which presently has a high potential applied thereto, as previously described. The other input to gate 1528 is connected to the O output terminal of flip-flop 1530. The D input of flip-flop 1530 is connected to lead 5 and the toggle input is connected to lead BIT 1. Flip-flop 1530 is thus toggled to the "clear" condition and maintained there for high-rate subscribers and toggled to the "set" condition for 4-out-of-5 bytes for subrate subscribers. Accordingly, gate 1528 is maintained enabled for high-rate subscribers and is enabled for 1-out-of-5 bytes for subrate subscribers.

The output of the gate 1528 is applied through OR gate 1529 to the D output of 8-bit shift register 1504 in the digital transmitter. At this time, monopulser 1508 is disabled to preclude the parallel loading of the bits from 6-bit latch 1503. Disabling of monopulser 1508 is provided by the blocking of gate 1532 by the low potential on lead $\overline{\text{OUT}}$. This blocks the application of the BIT 1 pulse through gate 1532 and OR gate 1533 to monopulser 1508. The data on lead ADD OUT is therefore applied to the D input of 8-bit shift register 1504, shifted through by the BIT 1 clock applied to input terminal CLS and passed on to lead $\overline{\text{DAC02}}$ for application to line driver 702 and by way of leads RR and RT to the link and connector circuit and then on to the downstream register sender.

It is recalled that gate 1528 is enabled for 1-out-of-5 bytes for the subrate subscriber. For the other bytes flip-flop 1530 is "set," thus disabling gate 1528. The 1 output terminal of flip-flop 1530 is connected to an input of recirculating gate 1531. The recirculating gate is therefore partially enabled for 4-out-of-5 bytes. The other input is provided by lead OUT to fully enable gate 1531 for 4-out-of-5 bytes. At this time the output of 8-bit shift register is passed through recirculating gate 1531 and OR gate 1529 back to the D input of shift register 1504. Thus, for the subrate subscriber, an ASCII byte is inserted in 8-bit shift register 1504 during one byte interval and is shifted through and recirculated back into the input of the shift register for the other 4-byte intervals; the five repeated bytes all being passed on to the downstream register.

The bytes (or the repeated bytes) continue to shift through the shift registers until the "ETB" character is shifted into the final stage of 32-bit shift register 1703. This character is detected by ETB detector 1722 which applies a high potential to its output lead 1723. This high potential inverted disables gate 1815 precluding the loading of the next character into shift register 1817. This load pulse, as previously described, also provides the toggle inputs for flip-flops 1809 to 1811 in block check generation logic 1807, thus inhibiting further computation of the block check character. The high output potential of ETB detector 1722 is also passed to the D input of flip-flop 1816. The BYTE CLK BIT 1 pulse toggles flip-flop 1816 to the "set" condition, disabling output gate 1818 of shift register 1817 and enabling those steering gates in steering logic 1806 which connect input terminals S1 through S4, including the outputs of flip-flops 1809 to 1811 in block check generation logic 1807 to the parallel inputs of shift register 1817. At the same time the flip-flop 1816 enables output gate 1820 for 32-bit shift register 1703, directly applying the output of this latter shift register to lead ADD OUT. As a consequence, the "ETB" ASCII character is directly applied from the final stage of 32-bit shift register 1703 to the digital transmitter and then passed on to the downstream register sender.

As the "ETB" character is transmitted, the ETB detector 1722 output goes down. This re-enables gate 1815 permitting the BIT 1 pulse to toggle the monopulser 1814, loading the block check number developed by the summing action of flip-flop 1809 to 1811 into shift register 1817. The next BYTE CLK BIT 1 pulse now toggles flip-flop 1816 to the "clear" state, re-enabling output gate 1818 of output shift register 1817, disabling output gate 1820 of 32-bit shift register 1703, and restoring steering logic 1806 to connect the outputs of 2-out-of-5 to ASCII gates 1720 to shift register 1817. The block check number in output shift register 1817 is now shifted out to lead ADD OUT and sent to the downstream register sender, as previously described.

It is noted that the block check number in output shift register 1817 is clocked out while, at the same time, clocking has terminated for the several shift registers in series, such as 32-bit register 1703. This is provided by continuing the OUT CLK 2 pulses while terminating the OUT CLK 1 pulses. When the character prior to the block check number, which, as previously described, is the "ETB" character, is passed to 8-bit shift register 1504 in the digital transmitter, its presence is detected by ETB detector 1535. The detector output goes low and this low potential "clears" flip-flop 1536, the flip-flop being previously "set" by the initializing circuit via OR gate 1537. At the same time the low potential inverted is passed through OR gate 1518 to the "clear" input of flip-flop 1517. This flip-flop is "cleared," disabling OUT CLK 1 gate 1521. Flip-flop 1517 also applies a low potential to the D input flip-flop 1520. Accordingly, one byte later, the BIT 1 pulse toggles the flip-flop 1520 to the "clear" condition. At this time, the block check number has just been transmitted to the digital transmitter and the clearing of the flip-flop 1520 disables OUT CLK 2 gate 1524. The clearing of flip-flop 1520 now applies a low potential to the D input of flip-flop 1523. The BIT 1 pulse for the next succeeding byte "clears" this flip-flop and this terminates the "output" mode of the register sender. The register sender now looks for a response from the downstream register sender. Finally, the clearing of flip-flop 1536 partially enables the gate 1540.

Assume now that the downstream register sender has received the class digits, the route digits, seven address digits, the "ETB" character, and the block check digit and, further assume that the downstream register sender calculated a block check digit based on the receive digits, as described hereinafter, and found that its calculated digit agreed with the received block check digit. In this event, the downstream register sender returns an "ACK" character followed by "CSA" characters. The "ACK" character is received by line terminator 701 in the interface circuit and the character is then passed by way of lead $\overline{DAC2}$ to 8-bit shift register 913 in the digital receiver, as previously described. The "ACK" character is then recognized by character detection gates 1005 and a negative pulse is applied to lead ACKC.

Lead ACKC is connected to gate 1540 in the digital transmitter. This gate, as previously described, is partially enabled by the flip-flop 1536 and as a consequence is now fully enabled by the reception of the "ACK" character. With the gate enabled, the clock pulse on lead CCS is passed therethrough to "clear" flip-flop 1519. The clearance of flip-flop 1519 fires 1.5 microsecond monopulser. This passes a negative pulse to lead UR.

The pulse on lead UR is passed, inverted, through OR gate 1631 in the output circuit to the "set" input of flip-flop 1632. With flip-flop 1632 "set," UBD gate 1640 is enabled, a high potential is applied to the D input of 8-bit shift register 1633 and the unblind-reverse code sequence is generated and transmitted by the register sender in the same manner as previously described. At the conclusion of the transmission of this sequence, the register sender releases. This terminates the action of the register sender for the successful completion of a line-to-trunk call.

Assume now that, after the local register sender has outpulsed to the downstream register sender, a character other than "ACK" or "CSA" is received back. As described hereinafter, this may occur if there is a hit in the transmission of the outpulsed digits and the downstream register sender has determined that is calculated block check digit does not agree with the receive block check digit wherein it returns, for example, an "NAK" character. Alternatively, this may occur if there is a bit in the character returned by the downstream register sender.

It is recalled that when the register sender was sending the "off-hook" charcters "ENQ" to the downstream register sender and the downstream register sender returned "CSA" characters, the detection of the "CSA" character by the register sender applied a low potential to the D input of flip-flop 1515 in the digital transmitter. The toggling of flip-flop 1515 by the CCS pulse "clears" the flip-flop and the resultant output pulse of flip-flop 1515 toggles flip-flop 1517 to the "set" condition, as previously described. This, in turn, controls the sequential "setting" of flip-flops 1520 and 1523. In addition, at this time the high potential output of flip-flop 1517 clamps its toggle input. In addition, the positive transition of the output of flip-flop 1517 toggles flip-flop 1542. Flip-flop 1542, which was previously placed in the clear condition by the initializing circuit potential applied via OR gate 1544 is now toggled to the "set" condition. When the "ETB" character is transmitted, flip-flop 1517 is "cleared," as previously described. This condition is maintained so long as "CSA" characters are received from the downstream register sender.

Assume now that a character other than "ACK" or "CSA" is received from the downstream trunk. In the absence of the reception of the character "ACK," flip-flop 1519 is maintained "set" and a high potential is maintained on the D input of flip-flop 1517. Since the received character is not the "CSA" character, the potential on lead CSAC goes high. Flip-flop 1515 is therefore toggled by the CCS pulse back to the "set" condition. The potential on lead CSAC returns low in response to the succeeding "CSA" character from the downstream trunk. Flip-flop 1515 is toggled back to the "clear" condition. A positive transition is ORed to the toggle input of flip-flop 1517 which is again toggled to the "set" condition. The resultant positive transition output of flip-flop 1517 toggles flip-flop 1542 to the "clear" condition. This partially enables NAND gate 1545 and also toggles flip-flop 1543 to the "set" condition. With flip-flop 1543, in the "set" condition, gate 1545 is fully enabled. Gate 1545 thereupon applies a negative condition to lead BAD TRK, which condition is passed, inverted through OR gate 1518 to "clear" flip-flop 1517.

Lead BAD TRK is passed through OR gate 1218 to the input of 5 microsecond monopulser 1219 in the work timer and is also passed through NOR gate 1220 to the "clear" input of flip-flop 1215, "clearing" flip-flop 1215 and thereby removing the high potential on lead OUT TRK. This takes the register sender out of the "out trunk" mode.

The toggling of 5 microsecond monopulser 1219 passes a negative pulse to lead SI. Lead SI extends to the SI input terminal of character encoding gates 1502 in the digital transmitter. The character encoding gates thereupon apply the information bits of the switch interrupt character SI to 6-bit latch 1503 which, in turn, inserts the character into 8-bit shift register 1504. Since flip-flop 1523 has been "cleared," gate 1532 is again enabled to pass the BIT 1 pulse to toggle monopulser 1508, permitting the parallel loading of shift register 1504. The SI character is therefore clocked out and transmitted to the link and connector circuit. This, as previously described, instructs the terminating trunk in the local office to disconnect.

The negative pulse on lead SI, inverted, is also applied through OR gate 1537 to the "set" input of flip-flop 1536. The consequent setting of flip-flop 1536 disables the ACK gate 1540, precluding subsequent action in response to the detection of the "ACK" character. The negative pulse on lead SI also clears the block check generation logic. More specifically, the negative pulse on lead SI, inverted, is passed through NOR gate 1544 to the "clear" inputs of flip-flops 1542 and 1543, returning these flip-flops to the "clear" condition.

The firing of 5 microsecond monopulser 1219 fires, in turn, 175 millisecond monopulser 1222 in the work timer. With flip-flop 1225 normally "cleared" by the initializing circuit, the firing of 175 millisecond monopulser 1222 enables NAND gate 1224 which operates, in turn, relay 12-SI. Relay 12-SI operated operates relay 5-2ND TRY. Relay 5-2ND TRY operated breaks the locking path for relay 5-OP and relay 5-DR and this releases the route control relays (block 604). This removes the route information provided by the previous marker.

When 175 millisecond monopulser 1222 times out, relay 12-SI is released and the negative transition of the monopulser output potential, inverted, toggles flip-flop 1225 to the "set" condition. The "setting" of flip-flop 1225 and the termination of the 175 millisecond monopulser operation enables NAND gate 1226. A low potential is thereupon applied to the lead REORDER.

The low potential on lead REORDER is inverted and passed through OR gate 1417 to 70 millisecond monopulser 1418 in the input circuit. 70 millisecond monopulser 1417, when fired, operates relay 14-DMR and this in turn operates relay 5-DMST. The operation of relay 5-DMST initiates the operation of requesting another marker in the same manner, as previously described, for the operation of requesting the previous marker.

At this time it is noted that the output of 32-bit shift register 1703 in the digit store, in addition to its several previously described output connections, is also connected to recirculating gate 1803. In the "output" mode of the register sender, a high potential is applied to lead OUT enabling recirculating gate 1803. The output of the last stage of 32-bit shift register 1703 is therefore passed over lead 1715, through enabled recirculating gate 1803 and over lead 1716 to the D input of 8-bit register 1710. Accordingly, when the route control, class and address digits and the character "ETB" were sent to the downstream register sender, they were simultaneously recirculated back to the input of 8-bit shift register 1710 and thereby recirculated back to their initial positions in the stages of 56-bit shift register 1901 and 32-bit shift registers 1703. Thus, at the time that the response character, if any, is received from the downstream shift register, the several digits are in their original position in the 56 and 32-bit shift registers. Accordingly, when the new marker is obtained, the original address digits are present on the appropriate leads extending to the marker. Accordingly, at this time the register sender is awaiting the marker and upon the marker becoming available, the previously described terminating phase is again repeated.

Should a second failure occur, 175 millisecond monopulser 1222 is again fired. With the flip-flop 1225 now "set," gate 1223 is enabled, firing 0.5 microsecond monopulser 1227. A pulse is passed through NOR gate 1228 to lead to CPC. This sets the time-out flip-flop 1654 in the output circuit and is also passed through multi-input NOR gate 1603 to "set" control flip-flops 1605 and 1606. As previously described, this initiates a call progress code sequence which, since time-out flip-flop 1654 is now "set" enabling, via input terminal 6 of digit encoding gates 1612, appropriate digit encoding gates, results in the "time-out" code sequence followed by the "IDLE" character and the release of the register sender.

Assume now that after the digits are sent to the marker the marker finds that all the trunks to the remote office are busy. In that event, the marker returns a signal on lead TB (FIG. 5) by way of the decoder marker connector circuit. This operates relay 5-TB in the relay interface and relay 5-TB locks up by way of the break contacts of relays 5-RCY and 5-2ND TRY and make contacts of relay 5-ON. At this time, the marker releases, grounding lead RL thereby operating and locking up relay 5-DR, as previously described. Relay 5-DR operated applies ground to sample and delay circuit 1102 in the work timer. As previously described, the application of this ground initiates the generation of a delay period and at the termination of the delay period and coincident with the BIT 1 pulse, sample and delay circuit 1102 provides at its output a negative condition. This negative condition partially enables AND gate 1108. At this time the gate 1108 is fully enabled by ground, inverted, provided via make contacts of relay 5-TB. Gate 1108, enabled, fires 1.5 microsecond monopulser 1132. A negative pulse is thereby applied to lead B.T. CPC. The pulse on lead B.T. CPC, inverted, "sets" the trunk busy flip-flop 1656 in the output circuit and, in addition, is passed through multi-input NOR gate 1603 to control flip-flops 1605 and 1606. Accordingly, a call progress code sequence is generated and with trunk busy flip-flop 1656 "set," applying an enabling potential to input terminal 3 of digit encoding gates 1612, the appropriate digits are inserted in the sequence, and the "trunk busy" call progress code sequence is returned to the originator. Thereafter, as previously described, the register sender releases.

In the event that the marker, after receiving the digits, cannot complete the call for some reason other than a busy line or trunk, it applies a signal to lead TBL (FIG. 5) and thereafter releases, applying a signal to lead RL. The application of the signal to lead TBL operates relay 5-TBL in the relay interface and relay 5-TBL locks to the locking path also utilized by relay 5-TB. The signal on lead RL operates and locks relay 5-DR, as previously described. The operation of relay 5-DR applies ground to sample and delay circuit 1102 which in turn generates a low condition at the output thereof after a predetermined delay period. The low condition partially enables gate 1104. At the same time the application of ground, inverted, to the other input of gate 1104 by relay 5-TBL operated fully enables the gate. The enabling of the gate fires 1.5 microsecond monopulser 1134 and the pulse generated thereby is passed over lead 1135 and through NOR gate 1201 to lead INVALID CPC. The pulse on lead INVALID CPC is passed to the output circuit, as previously described, operating invalid flip-flop 1604 and is passed through multi-input NOR gate 1603 to "set" control flip-flops 1605 and 1606. The invalid call progress code sequence is thereby generated and returned to the originator and the register sender releases, in the same manner as previously described.

It is recalled that when a marker received the digits from the register sender on a trunk call and connected the register sender to a trunk, the "ENQ" characters are sent by the register sender to this downstream trunk and when the downstream register sender is seized it normally returns "CSA" code characters. If, however, the downstream trunk is simultaneously attempting to originate a call on the same trunk the return characters would be the "ENQ" code character. This is called a "glare" condition where two register senders attempt to initiate calls over opposite ends of the same trunk at the same time. In this case, the "ENQ" code characters coming from the downstream register sender are received by the digital receiver, as previously described, and applied to character detection gates 1005. Upon the detection of the "ENQ" character, character detection gates 1005 energize output lead ENQC. Since the register sender is presently in the "out-trunk" mode, a high potential is applied to lead OUT TRUNK, as previously described, partially enabling NAND gate 1026. The energization of lead ENQC by the detection gates fully enables gate 1026 which passes a low potential to lead ENQ O.T.

Lead ENQ O.T. is connected to the D input of flip-flop 1230 in the work timer. Since the potential on the lead is now low, a CCS pulse toggles the flip-flop to the "clear" condition. A low potential is provided at the 1 output terminal of flip-flop 1230 and this low condition is passed through OR gate 1218 to 5 microsecond monopulser 1219.

As previously described with respect to the "bad trunk" condition, the operation of 5 microsecond monopulser 1219 causes the generation of switch interrupt (SI) characters to release the terminating trunk, operates the relay 12-SI to release the route control digits stored by the register sender and to release the 5-OP and 5-DR relays and initiates the recorder command to request a marker for a second attempt to complete the call, all in the same manner as previously described for a "bad trunk" condition.

Assume now that, when the register sender is connected to the downstream trunk, the remote register sender fails to return the "CSA" characters (and a "glare" condition does not exist). It is recalled that at the end of dialing, the originator sends the "ETB" character or "STX" character. As previously described, character detection gates 1005 in the digital receiver energize output lead ETBD or STXD or, as described hereinafter for an originating trunk, lead ETBC. The energization of leads ETBD or STXD enable the toggling of flip-flops 1306 or 1307 in the input circuit to the "clear" condition, as previously described. The "clearing" of one or the other of these flip-flops applies a low condition which is inverted through OR gate 1307 to lead ETB-STX. As described hereinafter, the energization of lead ETBC, with the register sender attached to an originating trunk, also results in the application of a high condition to lead ETB-STX.

The high condition on lead ETB-STX is passed through OR gate 1207 to the "clear" input of 19-stage binary counter 1206 in the work timer. This causes the counter to "clear" in preparation of initiating a timing period. In the normal course of events the marker will ground lead OP, operating relays 5-OP and thereafter "setting" flip-flop 1215, as previously described. Thereafter and within the 7-second period, the downstream register sender should return the "CSA" characters causing the register sender to go into the "out" mode whereby flip-flop 1523 in the digital transmitter is thereafter "set," applying a high condition to lead OUT. Lead OUT is connected to 5 microsecond monopulser 1208 in the work timer and the firing of the monopulser generates a pulse which is passed through OR gate 1207 to the "clear" input of 19-stage binary counter 1206, again clearing the counter. Thereafter the interaction with the downstream register sender and the release of the upstream register sender should be completed within 7 seconds and the release enables the initiating circuit to again "clear" counter 1206.

If either of the above-described 7-second intervals are exceeded, 19-stage binary counter 1206 is advanced to a count wherein it partially enables NAND gate 1232. Gate 1232 is fully enabled by the flip-flop 1215, previously "set." Gate 1232 thereupon applies a high condition, inverted through OR gate 1218 to 5 microsecond monopulser 1219. The monopulser is thereby operated in the same manner as previously described for the "bad trunk" and the "ENQ-OUT" conditions.

Another "time-out" condition may occur after the originator has dialed in the digits to the register sender and the register sender has requested a marker. This situation occurs if the marker fails to appear prior to a 7-second interval. As described above, counter 1206 is "cleared" at the end of dialing by the high condition on lead ETB-STX. The marker, failing to appear, fails to "set" flip-flop 1215 and the flip-flop stays in the "clear" condition. This partially enables NAND gate 1234. Gate 1234 is further enabled by the low condition on lead ADD-Mode, which low condition is, as previously described, applied to the lead at the end of the "address" mode. 19-stage binary counter 1206, in the absence of the return of the marker, times out, applying an enabling potential to the third input of gate 1234. The enabling of gate 1234 operates relay 12-TA and fires 0.5 microsecond monopulser 1235. The firing of monopulser 1235 generates a pulse which is passed through OR gate 1228 to lead T.O. CPC.

The application of the pulse to lead T.O. CPC "sets" time-out flip-flop 1654 in the output circuit and is passed through gate 1603, and initiates the generation of the "time-out" call progress code sequence followed by the release of the register sender in the same manner as previously described for the "second try" failure for a downstream trunk. Relay 12-TA operated operates relay 5-TA1. This completes a ground path to lead TA1 (FIG. 6) which extends by way of the decoder marker connector circuit to operate alarms in the decoder marker connector system, and corresponds to the lead shown in FIG. 59 in the R. J. Jaeger et al patent.

Assume now that a call originating in a remote office is destined for a subscriber in a local office. During the progress of the call the originator seizes a register sender and, as previously describeed, the register sender receives the address character and, with the assistance of the marker, connects to the downstream local office. Upon connection of the terminating trunk in the originating office, the register sender in the originating office sends "ENQ" characters via the terminated trunk to the originating trunk in the downstream local office. As previously described, the originating trunk in response to these characters goes "off-hook" and thereby requests a marker for connection to a register. Assuming a marker is available, it proceeds to scan for an available register sender, the availability being indicated by ground on lead RA (FIG. 5) in the relay interface of the register sender, as previously described.

Upon finding an available register sender, the marker applies ground to lead RST, operating relay 5-MC. In addition, the marker applies ground to lead 9.6, in the event that the call is originated from a subrate subscriber, this ground operating relay 5-srate. In addition, the marker inserts the link, horizontal group, and originating class digits in the appropriate relays in the relay interface, all in the same manner as previously described for a call originated by a local line. Finally, the marker applies ground to lead NDT (FIG. 5) to indicate an originating trunk call. This ground is passed through make contacts of relay 5-MC to operate relay 5-NDT and the relay locks by way of make contacts of relay 5-MC. Finally, the marker operates the crosspoints in the switch permitting the trunk circuit to pass ground from its sleeve lead through the switch to lead S in the relay interface (FIG. 6), thereby operating relay 6-LD, as previously described. This in turn, operates relay 5-SR which in turn operates relay 5-ON. The operation of relay 5-ON removes the initializing signals, as previously described.

Relay 5-NDT operated applies ground to gate 1004 in the digital receiver and the gate applies a low potential to lead 1004. The low potential on lead 1004 blocks gates 908 and 909. The clocking for 8-bit shift register 913 in the digital receiver is therefore enabled on bits 1 and 8 of each byte as it is on the other bits whereby all bits of the byte are sampled to permit register 913 to receive control mode characters. The 5 counter 906 is enabled, as previously described, for subrate subscribers and the BYTE CLK BIT 1 clocking gate 910 is therefore enabled for 1-out-of-5 bytes for the subrate subscriber and for all bytes for the high-rate subscriber in the same manner as previously described for originating line calls.

The operation of relay 5-NDT also applied ground to NAND gate 1402 in the input circuit, raising the potential on lead LINE ADD and to NAND gate 1422, partially enabling the latter gate. Since flip-flop 1405 is normally "cleared" by the initializing circuit, its 0 output terminal applies enabling potential to another input of gate 1422 and since a high potential is normally applied to lead ON, as previously described, gate 1422 is fully enabled. The gate being fully enabled applies a low condition to lead TRUNK ADD.

Upon the connection of the register sender to the trunk circuit, the register begins to receive the "ENQ" characters from the register sender in the remote originating office. The incoming "ENQ" characters are received in the digital receiver, as previously described, and clocked into 8-bit shift register 913. In this case, as described above, all of the bits of the 8-bit control, byte are clocked into the register. The character is thereupon detected by the character detection gates and a high condition is applied to output lead ENQC. This high condition partially enables NAND gate 1028. At this time the gate is also enabled by the high potential on lead $\overline{\text{TERM}}$, which potential is normally applied thereto by flip-flop 1421, in the input circuit, the flip-flop being "cleared" in the initializing condition as previously disclosed. Gate 1028 is therefore fully enabled applying a low condition to lead ENQC-$\overline{\text{TERM}}$. This low condition is passed, inverted, to the D input of flip-flop 1428 in the input circuit.

Returning now to the disabling of gate 1002, this partially enables gate 917 via lead 1004. Since we are receiving control mode characters wherein the eighth bit is invariably a 1 bit, the 8th stage of shift register 93 applies a further enabling potential to gate 917. A third input to gate 917 comprises the CLEAR lead which normally has a high potential applied thereto by flip-flop 1204 in the work timer which high potential further enables gate 917. The other two input leads to NAND gate 917 comprises the BIT 1 pulse and the $\overline{\text{INCLK}}$ clocking pulse. Accordingly, the gate passes the coincidence of these latter pulses, inverted, to lead CCS.

The CCS pulse toggles flip-flop 1428, driving the flip-flop to the "set" condition. A negative condition is thereupon passed through NOR gate 1406 to gate 1404, disabling the gate to thereby apply a blocking condition to lead IN SR CLK. This precludes the application of these clock pulses to shift register 1703, 1710 and 1901 in the digit store. In addition, the setting of flip-flop 1428 fires one microsecond monopulser 1429. The firing of the monopulser applies a negative pulse to lead CSA3.

The pulse applied to lead CSA3 is passed through OR gate 1501 to the "CSA" input of character encoding gates 1502 in the digital transmitter. The information bits of the CSA character are thereupon inserted into 6-bit latch 1503 which passes the bits in parallel to 8-bit shift register 1504. The "CSA" character is thereupon clocked out and passed back upstream to the originating register sender. The pulse on lead CSA3 also "sets" flip-flop 830 in the block check circuit. This partially enables gate 831. The register sender now awaits the reception of the address digits from the originating register sender.

In the event that digits are not received from the originating register sender within 20 seconds, 19-stage binary counter 1206 in the work timer, previously cleared during the initializing period by the low potential on lead ON and now advancing due to the removal of this low condition, reaches the appropriate count to energize the 20-second output lead. Since gate 1209 is partially enabled by the high potential on lead ADD MODE, as previously described, 5 microsecond monopulser 1210 is fired, the "invalid" call progress code sequence is returned back upstream, and the register sender releases.

Assume now that digits are received within the 20-second interval. Every time a digit is received a pulse is provided to lead SAMP, as described hereinafter, and passed through normally enabled gate 1212 and OR gate 1207 thereby clearing the 19-stage binary counter 1206. The incoming digit is received by the digital receiver and stored in 8-bit shift register 913 in the same manner as previously described. In all control mode digits the 6th and 7th bits in the byte are always 1 bits. The 6th and 7th stages of 8-bit shift register 913 are connected to the gate 916. A control mode digit therefore enables the gate, applying a high potential to lead $\overline{6\text{-}7}$. This high potential on lead $\overline{6\text{-}7}$ enables the gate 831 in the block check circuit which gate was previously enabled by the reception of the CSA character. The gate, now fully enabled, passes the CCS pulse via OR gate 816 and AND gate 817 to lead SAMP. Lead SAMP is connected to AND gate 1212, described above, to the parallel load input CLP of 8-bit shift register 812 in the block check circuit and to the clock input CLK of 10 state counter 820. The pulse on lead SAMP, as previously described, clears 19-stage binary counter 1206 in the work timer.

Bits 1 through 5 of the control mode digit in 8-bit shift register 913 are applied to correspondingly numbered leads and passed to steering gates 809 in the block check circuit. Those steering gates enabled by the high potential on lead TRUNK ADD operate to pass bits 2 through 5 to 1-out-of- 10 decoder 810. It is recalled that bits 2 through 5 (the first four bits of the ASCII character in the control mode) constitute those bits which define the digit member generated by the upstream register sender. These bits are decoded by 1-out-of-10 decoder 810, energizing 1-out-of-10 output leads which are applied in parallel to 2-out-of-5 decoding gates 811. The decoding gates convert the digit defined by the energized input lead to a 2-out-of-5 code character which is applied in parallel to five output leads that extend to stages 2 to 6 in 8-bit shift register 812. This digit is now loaded into the register by the load pulse on terminal CLP, described above, together with the loading of 0 bits in the other three stages.

Clocking for 8-bit shift register 812 is derived from lead IN SR CLK. Since digit characters are being received rather than "ENQ" characters, lead $\overline{\text{ENQC-TERM}}$ (FIG. 10) has a high potential applied and flip-flop 1428 is toggled to the "clear" condition by the CCS pulse, partially enabling gate 1404 by way of OR gate 1406. As previously described, the potential on lead ADD MODE is high further enabling gate 1404. At this time inhibit logic flip-flop 1301 is in its initialized "clear" state and output lead INH of the flip-flop further enables gate 1404. Similarly, error detection logic 1302 in the input circuit is in its "initial" condition and its output lead 1304 further enables gate 1404. Accordingly, AND gate 1404 is fully enabled and the pulse on lead $\overline{\text{IN CLK}}$, which pulse is derived from gate 912 in the digital receiver, is passed through gate 1404 to lead IN SR CLK.

The IN SR CLK pulse drives 8-bit shift register 812 in the block check circuit and the data inserted in the shift register is shifted through and passed to lead IN DATA which extends to gate 1801 in the digit store. Flip-flop 1523 in the output control logic is presently in the initial "clear" state applying an enabling potential via lead $\overline{\text{OUT}}$ to gate 1801. The data on lead IN DATA therefore passes through gate 1801 and OR gate 1802 to the input of 56-bit shift register 1901 in the digit store. The IN SR CLK pulse clocks 56-bit shift register 1901 and 32-bit shift register 1703 (and 8-bit shift register 1710,) as previously described. Accordingly, the address digits received from the upstream register sender (and now in byte form) are stored in the several shift registers.

At the same time that the digits are being parallel loaded into 8-bit shift register 812 in the block check circuit, the bits 2 through 5 are also checked for accuracy. Bit $\overline{2}$, inverted, is applied to the J and K inputs of flip-flop 835; bit $\overline{3}$, inverted, is applied to the J and K inputs of flip-flop 836, and bits $\overline{4}$ and $\overline{5}$ are applied through OR gate 838 to the J and K inputs of flip-flop 837. These flip-flops are toggled by the pulse on lead SAMP, which also loads the parallel inputs to 8-bit shift register 812. Thus, each time a digit is received, each of bits 2 and 3 of the digit is clocked into a correspondingly flip-flop to provide a sum to the base two of that bit for the several successive digits. In the case of bits $\overline{4}$ and $\overline{5}$, the combination of these two bits are clocked into a flip-flop and the sum is obtained for the several digits.

The 1 outputs of flip-flops 835, 836 and 837 are passed to comparison circuit 839 compares the output of each flip-flop with the bit presently appearing at the input of the flip-flop with the exception that the output of the third flip-flop is compared with the presently available 4th bit. The comparison circuit operates in a standard manner to provide a high potential to its output lead NOT EQUAL under all situations except when there is a match.

After the control mode digits are received the upstream register sender sends the "ETB" character. Character detection gates 1005 in the digital receiver detects this character applying a low condition to lead ETBC, as previously described. The low potential on lead ETBC enables gate 1328 in the input circuit. Since the gate is partially enabled by the high condition on lead TERM (flip-flop 1421 is in the initial "clear" state), gate 1328 applies a high potential to the D input of 2-bit shift register 1329. A 1 bit is thereupon clocked into the 2-bit shift register by the CCS pulse.

The output of the first stage of shift register 1329 is passed over lead 1330 and through NOR gate 1416 to the "set" input of flip-flop 1405. The flip-flop is thereby "set," disabling gates 1422 and 1404. The disabling of gate 1422 raises the potential on lead TRK ADD. The disabling of gate 1404 terminates the application of the IN SR CLK pulses to the shift registers in the digit store whereby no further digits will be clocked in and the digits now stored therein are maintained in their present stages.

In the next byte interval the CCS pulse advances the 1 bit in the first stage of register 1329 to the second stage. The 1 bit in the second stage is passed through OR gate 1307 to the D input of 8-bit shift register 1309, fires 1.5 microsecond monopulser 1310, and passes to lead ETB-STX. The pulse on lead ETB-STX "clears" 19-stage binary counter 1209 in the work timer and "clears" flip-flop 818 in the block check circuit to block further loading pulses on lead SAMP for 8-bit shift register 812 and further toggle pulses for flip-flops 835 to 837. The firing of 1.5 microsecond monopulser 1310 applies a pulse to lead EOETB. This enables the output gate 840 of comparison circuit 839. At this time the parity sum of all of the digits have been calculated by the three flip-flops 835 to 837 and the block check code character has been received (it being recalled that the CCS pulse that drove 2-bit shift register 1329 occurred in the next succeeding byte). Accordingly, the calculated bits in the flip-flops are compared with bits 2, 3 and 4 at the flip-flop inputs by comparison circuit 839 and, assuming the comparison is correct, a low output potential is generated by the comparison circuit to disable NAND gate 840, passing a low potential to lead BLOCK ERROR.

The application of the 1 bit to the D input of 8-bit shift register 1309 in the input circuit inserts a 1 bit in the first stage thereof upon the coincidence of the 5 potential and the BIT 8 pulse (as applied to gate 1312), as previously described. The register sender now generates and transmits the "ACK" code sequence in the same manner as the sequence was generated for an originating line with the exception that gate 1408 is disabled by the ground condition applied thereby by make contacts of relay 5-NDT. This blocks the application of the pulse to lead CME2, precluding the generation and transmission of the "CME" character which is the first character in the sequence for an originating line call. Accordingly, for an originating trunk call, the generated code sequence is the same with the exception that the "CME" character is eliminated. Thereafter, a marker is requested in the same manner as previously described and the register sender enters the "terminating" mode and the completion of the call proceeds in the same manner as previously described for an originating line call. The only difference in the register sender operation is that the route digit is now presented to the marker since the route digit is the fourth digit received from the upstream register sender and it is presently stored in the first eight stages of 32-bit shift register 1703. The 2-out-of-5 outputs of these stages, i.e., the stages 2 through 6 outputs of the first 8 stages of shift register 1703 is passed to route relays 17RKO to 17RK7. This passes ground, via make contacts of the relays, to appropriate ones of leads KO through K7, which leads extend by way of the decoder marker connector circuit to the marker; leads K0 through K7 corresponding to leads B0 to B7 in FIG. 62 of the R. J. Jaeger et al patent.

Assume now that there is an error in the received digits and comparison circuit 839 in the block check circuit finds a lack of comparison. Accordingly, the comparison circuit 839 applies a high potential to output lead NOT EQUAL. This signal partially enables gate 840. The block error gate is further enabled by the previously described positive pulse on lead EOETB and the ground inverted provided through make contacts of relay 5-NDT. Accordingly, the NAND gate is enabled and the EOETB pulse, inverted, is applied to lead BLOCK ERROR.

Lead BLOCK ERROR is connected, inverted, through OR gate 1333 to the "set" input of error detection logic flip-flop 1332 in the input circuit. The pulse on the lead therefore sets flip-flop 1332. The 0 output of the flip-flop applies a low condition to lead 1304. This low condition is passed, inverted, through OR gate 1412 to the NAK gate 1410 partially enabling the gate and, at the same time, disabling ACK gate 1409.

The initiation of the generation and transmission of the call progress sequence sent back to the originating register sender now proceeds in the same manner as previously described with the exception that, since ACK gate 1409 is disabled and NAK gate 1410 is enabled, the "NAK" code character is inserted in the sequence in place of the "ACK" character. In addition, upon the enabling of NAK gate 1410, flip-flop 1425 in the input is "set." The "setting" of flip-flop 1425 partially enables gate 1426 which is thereafter enabled when the 1 bit in 8-bit shift register 1309 reaches the final stage. The BYTE CLK BIT 1 pulse is thereupon passed through gate 1426, as previously described, passing a pulse to lead FAIL. This initiates the generation and transmission of the "invalid" call progress code sequence in the same manner as previously described.

The register sender in the originating office includes circuitry for assembling the digits of the called party on both line and trunk calls and for assembling the two digit call progress code sent to the originating party (whether the call progress code is generated by the register sender or by a downstream register sender). In the originating register sender relay 5-NDT is released, whether the call is to another line or to a trunk.

After the register sender accepts the digits from the originating circuit, it returns the acknowledgment call progress sequence back to the originator. At this time a pulse is applied to lead $\overline{ACK}$, as previously described. This pulse is also passed to clocking logic 1903 in the digit store and toggles flip-flop 1904 to the "set" state since a high potential is applied to the D input in the absence of the operation of relay 5-NDT (flip-flop 1904 having previously been "cleared" by the initializing potential on lead ON applied via OR gate 1905). The "setting" of flip-flop 1904 fires 0.5 microsecond monopulser 1906, passing a parallel loading pulse to input terminal CLP of 36-bit parallel load register 1907 in the digit store. The seven address digits in 56-bit shift register 1901 are thereupon loaded into the several stages of parallel load shift register 1907. At the same time the "setting" of flip-flop 1904 partially enables AND gate 1909 and passes a negative condition to lead $\overline{CNRDY}$.

The negative potential on lead $\overline{CNRDY}$ is advantageously utilized to advise an external billing collection system (not shown, but identified as billing system) that the digits of a called number are available. Conventionally, the billing system would thereupon return a signal that it is ready. This signal could be returned, for example, on lead $\overline{START}$ and passed through the now enabled gate 1909 to the D input of flip-flop 1908. The flip-flop is toggled by the coincidence of the BIT 8 pulse and the BIT CLK pulse, via gate 1910, placing flip-flop 1908 in the "set" condition. This partially enables AND gate 1912 and the gate thereafter passes therethrough the BIT CLK pulses.

The gated BIT CLK pulses are applied to the clock pulse input (CLS) of parallel load shift register 1907. The address digits stored in the shift register are thereby shifted out to lead called No. and then passed through OR gate 710 to line driver 711. The output of the line driver is passed to the billing system. The digit numbers are thereby passed on in serial form to the billing system to be processed therein in the usual manner.

The billing system, knowing the number of digit bits that it expects to receive which in this case is 36, raises the potential on lead $\overline{START}$ when it has received all these digits. This lowers the potential on input terminal D of flip-flop 1908. The flip-flop is now toggled to the "clear" condition. The positive transition of its 0 output terminal triggers 0.5 microsecond monopulser 1911. The output pulse of the monopulser is passed through OR gate 1905 to the "clear" input of flip-flop 1904. The "clearing" of this flip-flop terminates the called number request and the previous clearing of flip-flop 1908 disables gate 1912 to terminate the application of shift pulses to parallel load shift register 1907.

It is recalled that the call progress code sequence returned to the originator is generated by the register sender when the terminator is a local line and is generated by the downstream register sender when the terminator is reached by way of a trunk. Monitoring of the call progress code sequence is provided by the line driver and terminator circuit 702 in the signaling interface (FIG. 7). The line driver and terminator circuit comprises a standard line driver for passing codes from line $\overline{DAC02}$ to leads RR and RT, as previously described, together with a standard terminator circuit for passing the code signals on lines RR and RT to lead $\overline{DAC1}$. It is to be appreciated that the code signals on lines RR and RT may originate from line $\overline{DAC02}$ or, alternatively, may be received from the remote register sender by way of the link and connector circuit. Accordingly, the terminator in line driver and terminator circuit 902 monitors both the code signals generated by the local originating register sender and the code signals received from the downstream register sender. In either event, these code signals are passed to line $\overline{DAC1}$ and then to the D input of 8-bit shift register 712 in the signaling interface.

The 8-bit shift register 712 is normally maintained in the "clear" condition by a high output signal provided by input OR gate 714. One input to OR gate 714 comprises a lead connected to make contacts of relay 5-NDT and this lead is low (relay 5-NDT operated) if the register sender is in the downstream office. This low condition is applied inverted through OR gate 714. Accordingly, the "clearing" potential on this lead is removed when the register sender is local to the originating line. A further input comprises lead DR which has a high potential applied thereto until the marker has released in the terminating phase of the call. This "clearing" potential is therefore removed after the release of the marker. The third input to OR gate 714 is derived from the 1 output terminal of flip-flop 715.

Initially flip-flop 715 is in the "clear" condition due to the normal high condition on lead $\overline{START}$ which disables AND gate 716 applying a low condition to the D input of flip-flop 715. Since the flip-flop is in the the "clear" condition, it applies a low condition to the third input of OR gate 714. Accordingly, upon the release of the marker at the termination of the call-set-up and the consequent application of the low condition to lead DR, the high condition applied to the "clear" input of 8-bit shift register 712 is removed.

The clocking for 8-bit shift register 712 is provided by the coincidence of the BIT CLK pulse and the 5 potential, by way of AND gate 718 which is enabled by the normally high potential on lead ON. The call progress code sequence is, as previously described, returned to the originator after the marker release and at the same time is applied by way of lead $\overline{DAC1}$ to the D input of 8-bit shift register 712. This sequence is now clocked into the register. The eighth stage output of shift register 712 is connected to the D input of second 8-bit shift register 720 and the eighth stage output of register 720, is in turn, connected the D input of third 8-bit shift register 721.

The character in 8-bit shift register 712 is monitored by character detection gates 722. The sampling instant is determined by the BYTE CLK BIT 1 pulse passed to the SMPL input of character detection gates 722. The first character in the call progress sequence is, as previously described, the control mode "CME" character. When this character is shifted into 8-bit shift register 712 and sampled by character detection gates 722, a negative condition is applied to output lead CMEC. This "sets" flip-flops 723 and 724.

The "setting" of flip-flop 723 enables clocking gate 728 for shift registers 720 and 721. Accordingly, the clock pulse input for 8-bit shift register 712 is extended to the clocking inputs of second and third 8-bit shift registers 720 and 721. The "CME" character is therefore shifted into second 8-bit shift register 720 and on to third shift register 721 and, thereafter, the call progress digits received by shift register 712 are shifted on to the second and third shift registers.

The two digits in the call progress code sequence are immediately followed by the "ETB" character. Accordingly, when the "ETB" character is received by and stored in shift register 712, the two digits are in second and third shift registers 720 and 721. The detection of the "ETB" character by character detection gates 722 applies a pulse to output lead ETBC. This pulse is passed to the CLP input terminal of 8-bit shift register 730 and loads the four bits of the digits in the second and third shift registers into shift register 730. Thereafter, at the termination of the ETBC pulse, flip-flop 723 is toggled to the "clear" condition. Clock gate 728 for the second and third shift registers is again disabled..

As previously described, the register sender (or the downstream register sender) continues to repeat the call progress code sequence for 8 repetitions or until the customer starts sending data, whichever occurs first. Each time the start of sequence character "CME" is received, flip-flop 723 is "set." Initially the "setting" of flip-flop 723 fires retriggerable monopulser 732. At the same time the "setting" of flip-flop 724 removes a disabling clamp from input terminal CL of retriggerable monopulser 732. Thereafter, so long as the call progress sequences are continued to be received, the call progress digits are passed to 8-bit shift registers 712, 720 and 721 and are then overwritten into shift register 730 and, at the same time, retriggerable monopulser 732 is maintained in its timing condition.

Assume now that the eight call progress sequences are received and that thereafter, after a delay of 10 milliseconds, the failure of the flip-flop 723 to be again "set" permits retriggerable monopulser 732 to time out. This fires 5 microsecond monopulser 733 which "sets" flip-flop 734. The "setting" of flip-flop 734 passes an indication by way of lead $\overline{\text{CPC RDY}}$ to the billing system that the call progress digits are available.

The billing information system, when ready, returns a low condition on lead $\overline{\text{START}}$. This low condition and the high condition on lead $\overline{\text{CNRDY}}$ (flip-flop 1904 having been cleared) enables gate 716, passing a high condition to the D input of flip-flop 715. The flip-flop is thereupon toggled to the "set" condition by the coincidence of the BIT 8 pulse and the BIT CLK pulse via gate 717. The "setting" of flip-flop 715 applies a high condition, which enables output gate 731 of output shift register 730 extending the final stage output of the register through OR gate 716 to line driver 711, thereby applying the digits to leads RSBR and RSBT to send them to the billing system. At the same time the high potential output of flip-flop 715 enables clock input gate 736 for output register 730. The BIT CLK pulses are therefore passed through enabled gate 736 to shift out the two digits in output register 730 and pass them to the billing system.

After the billing information system receives the digits it returns a high potential on lead $\overline{\text{START}}$. This disables gate 716 applying a low potential to the D input of flip-flop 715 and the flip-flop is toggled back to the "clear" condition. In the "clear" condition, clocking for output shift register 730 ceases and 0.5 microsecond monopulser 738 is fired. The pulse generated by the monopulser is passed through OR gate 739 to the "clear" input of flip-flop 734. the flip-flop is thereupon "cleared," removing the "CPC ready" indication sent to the billing system.

The previously described "setting" of flip-flop 734 provides an enabling potential to gate 740. A high potential is normally applied to gate 708 in an originating register sender. Furthermore, as previously described, when it is determined that the call is a trunk call by way of a remote office, the potential on lead TKO is high. The coincidence of these high potentials fully enable gate 708 which partially enables gate 740 and disables gate 706. Accordingly, when flip-flop 734 is set, gate 740 is enabled, passing a high potential through OR gate 707 to lead RLS. This causes the register sender to release after the call progress code sequence is repeated eight times in the manner previously described. It is to be noted that when the register sender is a downstream register sender connecting to a local terminator, gate 708 is disabled, disabling gate 740 and enabling gate 706. Accordingly, the release function for this latter situation occurs, as previously described, after the call progress code sequence is generated and transmitted by the register sender without waiting for the "setting" of flip-flop 734.

In the event that a customer (especially the called subscriber) starts to send data before the eight call progress code sequences are transmitted, a data mode character will be received and, since the 8th bit is invariably a 1 bit, the first stage of 8 bit shift register 712 partially enables NAND gate 725. At this time the timing of retriggerable monopulser 732 is in progress, fully enabling gate 725. The BYTE CLK BIT 1 pulse is therefore passed through the enabled gate to "clear" flip-flop 724. This "clearing" of the flip-flop reclamps the retriggerable monopulser and toggles the flip-flop 734 to the "set" condition. The "setting" of flip-flop 734 now informs the billing system of the availability of the call progress code digits and the digits are sent thereto in the same manner as previously described.

ALthough a specific embodiment of this invention has been shown and described, it will be understood that various modifications may be made without departing from the spirit of this invention.

What is claimed is:

1. A line switching office for interconnecting data transmission channels including a plurality of intraoffice channels, an interface circuit including means for applying data signals received from each of the transmission channels to an associated one of the intraoffice channels, and switch means for interconnecting intraoffice channels;

CHARACTERIZED BY a common control circuit connectable to the intraoffice channels and including means for sending control data signals to the interface circuits by way of the intraoffice channels; and means in each interface circuit responsive to the control data signals for precluding the application of received data signals to the associated intraoffice channel.

2. A line switching office, in accordance with claim 1, wherein the precluding means includes means for applying predetermined code signals to the intraoffice channel in place of the received data signals.

3. A line switching office, in accordance with claim 1, wherein the precluding means includes means responsive to a plurality of successive ones of the control data signals for operating the precluding means.

4. A line switching office, in accordance with claim 1, wherein the common control circuit further includes means responsive to address data signals received from an originating one of the transmission channels for controlling the switch means to interconnect a first intraoffice channel associated with the originating transmission channel with a second intraoffice channel associated with a terminating transmission channel defined by the address data signals, the controlling means further including means for enabling the control data signals sending means at the termination of the reception of the address data signals whereby the application of received data signals to the first intraoffice channel is precluded during the controlling of the switch means.

5. A line switching office, in accordance with claim 4, wherein the common control circuit includes means operative after the controlling of the switch means for sending unblind data signals to the interface circuit by way of the first intraoffice channel and the interface circuit includes means responsive to the unblind data signals for disabling the precluding means.

6. A line switching office, in accordance with claim 1, wherein the applying means includes means for storing the received data signals and means for passing the output of the storing means to the associated intraoffice channel and the precluding means for blocking the output of the storing means.

7. A line switching office, in accordance with claim 6, wherein the interface circuit includes means for overwriting the received data signals in the storing means with predetermined code signals.

8. A line switching office for interconnecting data transmission channels including a plurality of intraoffice channels, an interface circuit including means for applying data signals received from each of the transmission channels to an associated one of the intraoffice channels and switch means for interconnecting intraoffice channels;

CHARACTERIZED BY a common control circuit responsive to the application of data signals to the intraoffice channels for operating the switch means and for sending code data signals to the interface circuits; and means in the interface circuit responsive to the code data signals for controlling the application of received data signals to the intraoffice channel.

9. A line switching office, in accordance with claim 8, wherein the controlling means includes means responsive to a plurality of successive ones of the code data signals for operating the controlling means.

10. A line switching office, in accordance with claim 8, wherein the common control circuit includes means for sending unblind data signals to the interface circuit after the operation of the switch means and the interface circuit includes means responsive to the unblind data signals for disabling the blocking means.

11. A line switching office, in accordance with claim 8, wherein the controlling means includes means for blocking the applying means.

12. A line switching office for interconnecting two-way data transmission channels including:

a plurality of two-way intraoffice channels, an interface circuit including means for interchanging data signals in two directions between each of the transmission channels and an associated one of the intraoffice channels, and switch means for interconnecting pairs of intraoffice channels;

CHARACTERIZED BY a common control circuit including means for sending data control signals to the interface circuits by way of the intraoffice channels; and means in each interface circuit responsive to the data control signals for controlling the interchanging of the data signals.

13. A line switching office, in accordance with claim 12, wherein the interchanging means includes means for storing incoming data signals from the transmission channel and means for applying the stored data signals to the associated intraoffice channel.

14. A line switching office, in accordance with claim 13, wherein the controlling means includes means for disabling the applying means.

15. A line switching office, in accordance with claim 13, wherein the controlling means includes means for enabling the applying means.

16. A line switching office, in accordance with claim 13, wherein the controlling means includes means for overwriting the stored data signals in the storing means with predetermined code signals.

17. A line switching office, in accordance with claim 12, wherein the interchanging means includes means for storing outgoing data signals from the intraoffice channel and means for applying the stored data signals to the transmission channel and the controlling means includes means for overwriting the stored data signals in the storing means with predetermined code signals.

18. A line switching office, in accordance with claim 12, wherein each of the interface circuits includes means for normally applying data signals to the associated intraoffice channel defining signal conditions on the transmission channel, and the common control circuit includes means effective upon the switch means interconnection and responsive to the normally applied data signals on one of the intraoffice channels in the interconnection for generating a call progress data code sequence representing the signal condition defined by the normally applied data signals and transmitting the call progress data code sequence to the other interface circuit by way of the intraoffice channel associated therewith.

19. A line switching office, in accordance with claim 18, wherein the controlling means includes means responsive to an initial data control signal in the call progress data code sequence for enabling passage of data signals on the intraoffice channel to the transmission channel whereby the call progress data code sequence is passed to the transmission channel.

20. In a line switching office for interconnecting two-way data transmission channels, a plurality of two-way intraoffice channels, an interface circuit for connecting each of the transmission channels to an associated one of the intraoffice channels, and switch means for interconnecting the intraoffice channel associated with a calling transmission channel to the intraoffice channel associated with an available called transmission channel;

CHARACTERIZED BY means in each of the interface circuits responsive to a first and second signal conditions on the transmission channel for applying data signals defining the signal condition on the transmission channel to the associated intraoffice channel, and common control means responsive to the application of data signals to the intraoffice channel interconnection for generating one of two call progress data code sequences representing the signal condition defined by the applied data signals and transmitting the call progress data code sequence to the calling transmission channel by way of the intraoffice channel associated therewith.

21. In a line switching office, in accordance with claim 20, wherein the common control means generates a first call progress data code sequence in response to applied data signals defining an idle on-hook signal condition and generates a second call progress data code sequence in response to applied data signals defining a not-ready on-hook signal condition.

22. In a line switching office in accordance with claim 20, wherein the common control means includes means for generating a call progress data code sequence in response to applied data signals defining an off-hook signal condition.

23. In a line switching office, in accordance with claim 20, wherein the common control means includes means effective upon the interconnection operation of the switch means for initiating the generation of a specific one of the call progress code sequences.

24. In a line switching office, in accordance with claim 23, wherein the common control means includes means responsive to the applied data signals for modifying the content of the specific one of the call progress code sequences to conform to the call progress code sequence representing the applied data signals.

* * * * *